(12) United States Patent
Sedeffow

(10) Patent No.: US 10,740,870 B2
(45) Date of Patent: Aug. 11, 2020

(54) CREATING A FLOOR PLAN FROM IMAGES IN SPHERICAL FORMAT

(71) Applicant: Eyespy360 Limited, London (GB)

(72) Inventor: Peter Vassilev Sedeffow, London (GB)

(73) Assignee: EYESPY360 LIMITED, London (GB)

( * ) Notice: Subject to any disclaimer, the term of this patent is extended or adjusted under 35 U.S.C. 154(b) by 120 days.

(21) Appl. No.: 16/021,530

(22) Filed: Jun. 28, 2018

(65) Prior Publication Data

US 2020/0005428 A1    Jan. 2, 2020

(51) Int. Cl.
  *G06K 9/00* (2006.01)
  *G06T 3/00* (2006.01)
  *H04N 5/232* (2006.01)
  *G06T 7/13* (2017.01)
  *G06K 9/28* (2006.01)
  *G06T 7/73* (2017.01)

(52) U.S. Cl.
  CPC .............. *G06T 3/0062* (2013.01); *G06K 9/28* (2013.01); *G06T 3/0006* (2013.01); *G06T 7/13* (2017.01); *G06T 7/73* (2017.01); *H04N 5/23238* (2013.01)

(58) Field of Classification Search
  None
  See application file for complete search history.

(56) References Cited

U.S. PATENT DOCUMENTS

| | | | | |
|---|---|---|---|---|
| 7,460,214 B2 * | 12/2008 | Schiavi | ............... | G01C 15/002 356/3.01 |
| 9,244,940 B1 * | 1/2016 | Donsbach | ............... | G06T 11/20 |
| 9,372,265 B2 * | 6/2016 | Zweigle | ............... | G09B 29/004 |
| 9,794,518 B2 * | 10/2017 | Barcala | ........... | G08B 13/19686 |
| 2009/0237396 A1 * | 9/2009 | Venezia | ................. | G06T 19/00 345/419 |
| 2013/0278755 A1 * | 10/2013 | Starns | .................... | G01C 11/02 348/135 |

(Continued)

OTHER PUBLICATIONS

Website https://web.archive.org/web/20140714141024/http://www.euclideanspace.com/maths/geometry/rotations/euler/ (Year: 2014).*

*Primary Examiner* — Hadi Akhavannik

(74) *Attorney, Agent, or Firm* — James Creighton Wray

(57) ABSTRACT

A method and apparatus are provided for creating a floor plan from a spherical image. A spherical format is created of an image obtained by a camera, wherein the spherical format has a centre that corresponds to the position from which the image was obtained by the camera, and wherein a first surface represented in the image had a first orientation and was at a first distance from the camera when the image was obtained. A plurality of selected points are obtained in the spherical format, each defined by spherical coordinates consisting of a yaw angle and a pitch angle defining a line from the centre. A plane is identified that has the first orientation and that is at the first distance from the centre of the sphere. For each of the selected points, a location in a Cartesian coordinate system is identified where the line from the centre of the sphere to the selected point intersects with the first plane, two of the axes of the Cartesian coordinate system being parallel to the first plane. A floor plan is rendered using the locations, which represents the positions of the selected points on the first surface.

21 Claims, 48 Drawing Sheets

(56) References Cited

U.S. PATENT DOCUMENTS

2015/0116691 A1* 4/2015 Likholyot ............... G01S 17/89
                                                     356/4.01
2016/0285416 A1* 9/2016 Tiwari .................... H02S 50/15
2017/0219710 A1* 8/2017 Schmidt ................. G01C 15/00
2018/0286121 A1* 10/2018 Sedeffow ................ G06T 15/04

* cited by examiner

3110 — x = D * cos (YAW)

3111 — y = D * sin (-YAW)

3112 — $D = \dfrac{H}{\tan(\text{abs}(PITCH))} = H * \tan(90° - \text{abs}(PITCH))$

CREATING A FLOOR PLAN FROM IMAGES IN SPHERICAL FORMAT

CROSS REFERENCE TO RELATED APPLICATIONS

This application represents the first application for a patent directed towards the invention and the subject matter.

BACKGROUND OF THE INVENTION

The present invention relates to a method of producing output image data representing a Cartesian two-dimensional floor plan from spherical input data of a room with a floor and walls.

The present applicant has commercially exploited a system for displaying a virtual map, used predominantly for providing immersive and interactive images of the interiors of rooms within houses and flats etc. Projections of images are generated and indications of a first position in a first image are obtained along with an indication of a second position within a second image. Within each rendered image, an element is present corresponding to the position of the other image such that, when operating within an immersive environment, it is possible to traverse from room to room.

In the implementation, original image data is recorded as omnidirectional input image data and sophisticated processing techniques are performed, as detailed herein, to provide the immersive environment. However, the image when viewed in a spherical format provides no information regarding the physical space mapped by the image, as all points are represented as on the internal surface of a notional sphere, and having an equal distance from the central viewing point.

The applicant has therefore identified a requirement for automatically extracting locations within the spherical image in order to create a floor plan of the imaged space.

BRIEF SUMMARY OF THE INVENTION

According to a first aspect of the invention, there is provided a method of creating a floor plan from a spherical image, comprising the steps of, at a processor: creating a spherical format of an image obtained by a camera, wherein said spherical format has a centre that corresponds to the position from which said image was obtained by the camera, and wherein a first surface represented in said image had a first orientation and was at a first distance from the camera when the image was obtained; obtaining a plurality of selected points in said spherical format, each defined by spherical coordinates consisting of a yaw angle and a pitch angle defining a line from said centre; obtaining said first orientation and said first distance; identifying a plane having said first orientation that is at said first distance from said centre; for each of said selected points, identifying a location in a Cartesian coordinate system where the line from the centre of said sphere to said point intersects with said first plane, wherein two of the axes of said Cartesian coordinate system are parallel to said first plane; and rendering a floor plan using said locations, said floor plan representing the positions of said selected points on said first surface.

According to a second aspect of the invention, there is provided apparatus for creating a floor plan from a spherical image, comprising a processor and a memory, wherein said processor is configured to: create a spherical format of an image obtained by a camera, wherein said spherical format has a centre that corresponds to the position from which said image was obtained by the camera, and wherein a first surface represented in said image had a first orientation and was at a first distance from the camera when the image was obtained; obtain a plurality of selected points in said spherical format, each defined by spherical coordinates consisting of a yaw angle and a pitch angle defining a line from said centre; obtain said first orientation and said first distance; identify a plane having said first orientation that is at said first distance from said centre; for each of said selected points, identify a location in a Cartesian coordinate system where the line from the centre of said sphere to said point intersects with said first plane, wherein two of the axes of said Cartesian coordinate system are parallel to said first plane; and render a floor plan using said locations, said floor plan representing the positions of said selected points on said first surface.

According to a third aspect of the invention, there is provided a non-transitory computer-readable medium with computer executable instructions stored thereon, wherein said instructions configure a processor to perform the method of: creating a spherical format of an image obtained by a camera, wherein said spherical format has a centre that corresponds to the position from which said image was obtained by the camera, and wherein a first surface represented in said image had a first orientation and was at a first distance from the camera when the image was obtained; obtaining a plurality of selected points in said spherical format, each defined by spherical coordinates consisting of a yaw angle and a pitch angle defining a line from said centre; obtaining said first orientation and said first distance; identifying a plane having said first orientation that is at said first distance from said centre; for each of said selected points, identifying a location in a Cartesian coordinate system where the line from the centre of said sphere to said point intersects with said first plane, wherein two of the axes of said Cartesian coordinate system are parallel to said first plane; and rendering a floor plan using said locations, said floor plan representing the positions of said selected points on said first surface.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art.

Components and processes distinguished by ordinal phrases such as "first" and "second" do not necessarily define an order or ranking of any sort.

DETAILED DESCRIPTION OF EMBODIMENTS OF THE INVENTION

FIG. 1

Figure 1:
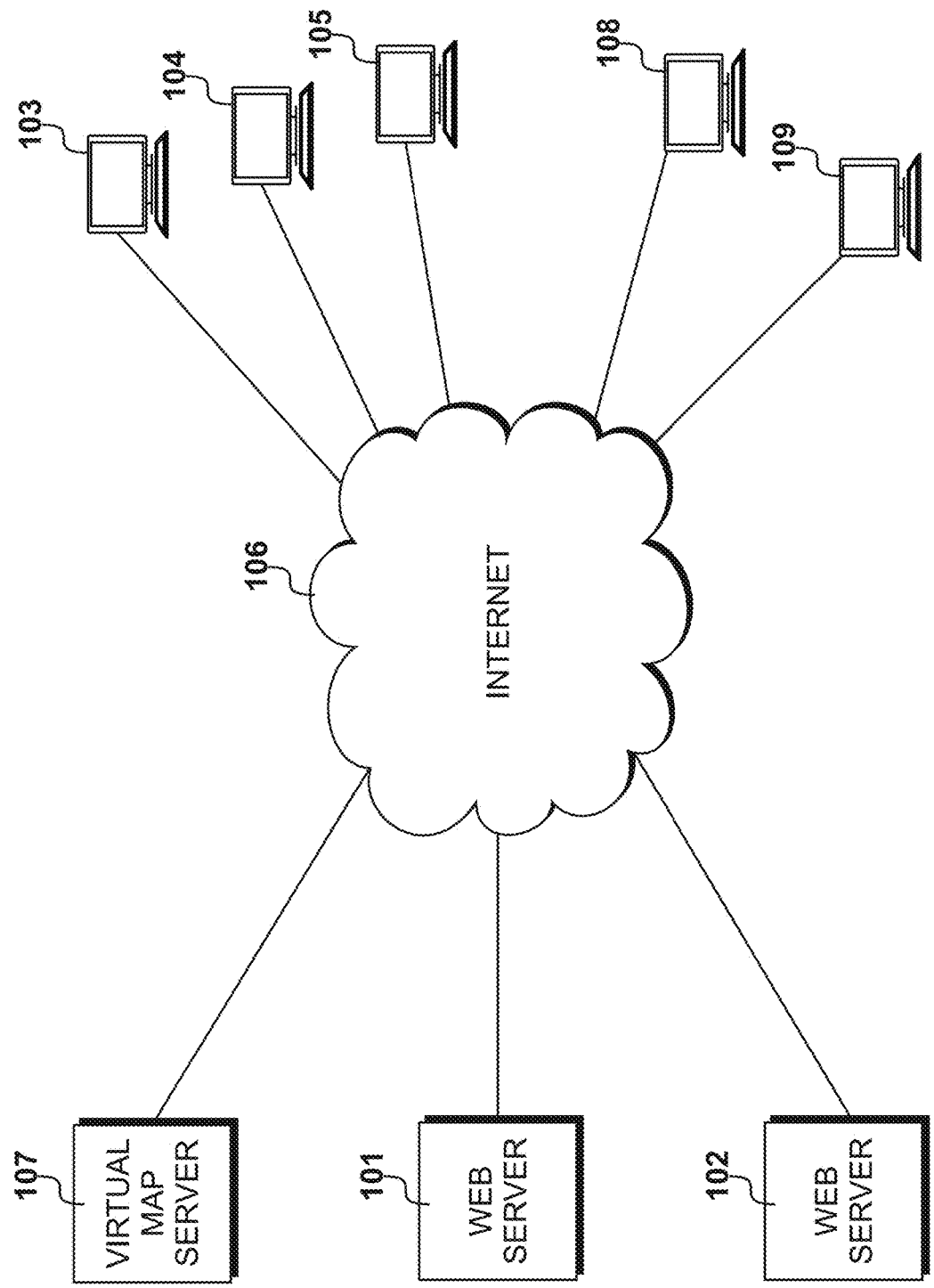
FIG. 1 shows an environment in which the invention may be used.

An environment in which aspects of embodiments described herein may be deployed is shown in FIG. 1. A first web server 101 hosts a first website, for a first entity, and a second web server 102 hosts a second website for a second entity. In accordance with proposals set by the applicant elsewhere, both said websites have at least one virtual map embedded therein. Customers 103, 104, and 105, browsing internet 106 on any computing device, such as a desktop computer, laptop, tablet, mobile phone, or any other device, view the virtual maps, therefore the embedded maps are retrieved from virtual map server 107 and returned to the browsing customers over the internet 106.

The present applicants have deployed this proposal for the purposes of providing details of houses and apartments etc, to allow prospective customers to obtain detailed information without attending a site visit, or before such a visit. The virtual maps provide an immersive experience for customers as they virtually move from room to room in a virtual environment. However, in presentations of this type, it would be useful to be able to identify the location of certain elements that can be seen within the image. An example is the generation of a floor plan by identifying the location of corners and walls of a room. The aforesaid proposal for generating a sophisticated virtual tour requires minimal skill and labour. It is therefore undesirable to then be required to instruct a draughtsman to produce the, more mundane, two dimensional images. The present invention therefore seeks a technical solution for generating Cartesian location data for elements visible in the spherical images.

Users 108 and 109 create and maintain the virtual maps by communicating over internet 106 with virtual map server 107. Again, users 108 and 109 may be using any type of computing device. The virtual maps described herein and expanded in the previous proposal can be created on anything from a smartphone to a high-powered desktop publishing computer.

For the purposes of clarity, terminology will be used consistently herein, in that users create virtual maps and floor plans; and customers access them. In the embodiment described herein, the virtual maps and floor plans are hosted on the virtual map server 107 and the relevant websites contain an embedded link. However, the virtual maps could also be hosted on the individual web servers or in some other location.

FIG. 2

Figure 2:
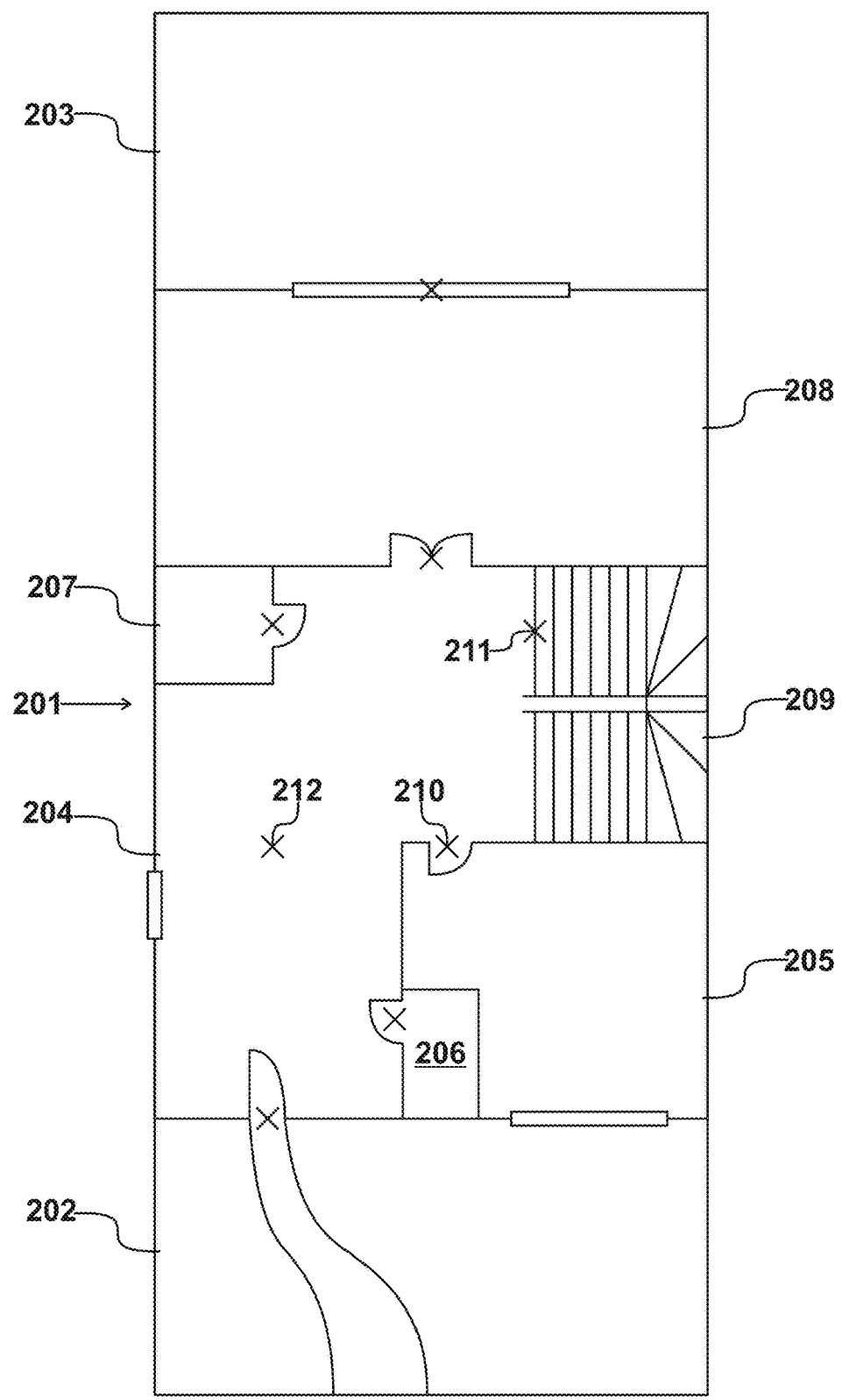
FIG. 2 shows a floor plan of a space to be mapped.

A ground floor of a house 201 for which a virtual map and a floor plan is to be created is shown in FIG. 2. The house 201 has a front garden 202, a back garden 203 and the rooms on this floor of the house include an entrance hall 204, a study 205, a cloakroom 206, a bathroom 207, and a living room 208. Doors connect each of these rooms. In addition, there is a front door to the front garden 202, while the back garden 203 is accessed by sliding doors in the living room 208. Stairs 209 lead to the first floor.

In known virtual tours, an architectural layout of the house would be combined with photographs in order to render a tour. However, the invention described herein provides a method of linking a set of panoramic photographs. A panoramic photograph is a rectangular photograph that represents a 360° view of a space. In the embodiment described herein, omnidirectional or spherical photographs are used, which also show the floor and ceiling. However, in other embodiments, basic panoramic photographs could be used.

Photographs are taken of each room to be included in the tour. In some situations, two photographs of a room may be appropriate. Thus, returning to the example in FIG. 2, one photograph is taken of each of front garden 202, back garden 203, study 205, cloakroom 206, bathroom 207 and living room 208. Two photographs are taken of entrance hall 204, because it is an L-shape.

The next stage involves establishing connection points between the photographs. Thus, for example, point 210 indicates the door from the entrance hall into the study. This point would be marked by the user both on the photograph of the study 205 and on the photograph of the entrance hall 204. All the connection points marked with a cross on this figure would be similarly defined as connections between two photographs. Point 211, which is at the bottom of the stairs, would be linked with a photograph of the landing on the first floor, should the user wish to add the first floor to the virtual tour.

The set of images and the connection point information is all that is necessary to create a three-dimensional virtual map, which can be enhanced by identifying locations in Cartesian coordinates of elements visible in the image. The images and the connection points can be rendered into a viewable tour of the house which allows users to panoramically view each room before moving into the next.

FIG. 3

Figure 3:
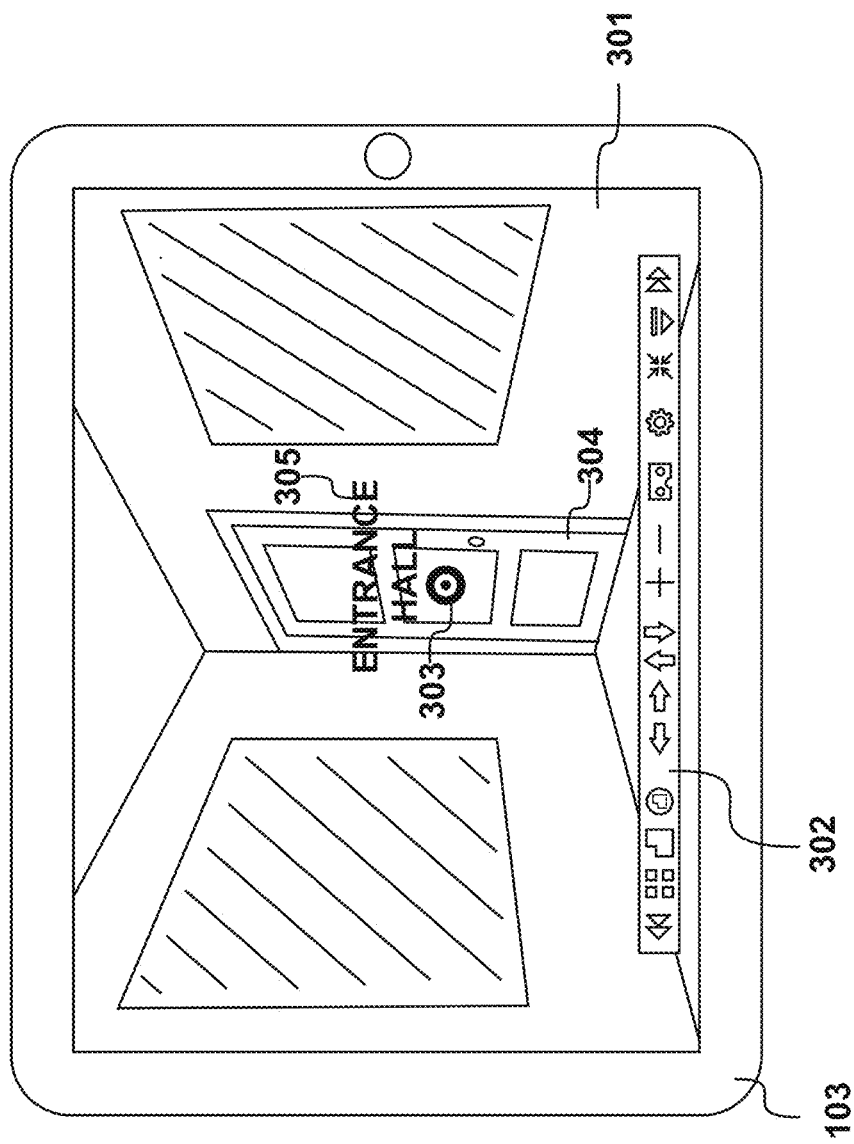
FIG. 3 is an illustration of a virtual map displayed on a tablet shown in FIG. 1.

An illustration of a virtual map or tour is shown in FIG. 3, as displayed on a tablet. This is identified as the device 103 used by a customer in FIG. 1. The interface includes image viewer 301 and toolbar 302. The image currently being displayed within image viewer 301 is of the study 205. Connection point 210 is visible as a target-shaped icon 303 on door the 304. Text 305 indicates that this is connection point marks the door to entrance hall 204.

The customer may move the panoramic image around in any way appropriate to the device being used. Thus, if the device has a touchscreen or touchpad, the image may be intuitively moved around using a finger. On a computer, the mouse may be used or the keyboard. On a handheld device, accelerometers contained within the device could be used to move the image dependent upon the movement of the device. Alternatively, arrows on the toolbar 302 may be used.

When the customer has viewed as much of this room as is required, icon 303 may be selected, in any way appropriate to the device being used, in order for a panoramic image of entrance hall 204 to be displayed. On reviewing FIG. 2, it can be seen that in this next image of the entrance hall, five icons representing connection points would be displayed, allowing the customer to choose to view the other half of the entrance hall, to move back into the study, to view the bathroom or the living room, or to go upstairs. In each case, wherever the customer selects a connection point, the image of the next room is orientated from the point of view of the corresponding connection point, i.e. as if the viewer were standing directly in front of the connection point. Thus, the customer has the experience of simply stepping through the door or other connection point. Consequently, this system of the previous proposal provides a customer with an intuitive and seamless method of moving through the displayable space.

Although doorways represent natural connection points between images, sometimes connection points may be in the middle of a space, such as connection point 212 that connects two images of the entrance hall 204. In a large open plan space, for example a gym or a garden, most connection points would be of this type. However, if the user wishes to make a floor plan corresponding to this virtual map, as will be described further with respect to FIGS. 38 to 48, all connection points must represent a connection in a wall and not in the interior of a space.

FIG. 4

Figure 4:
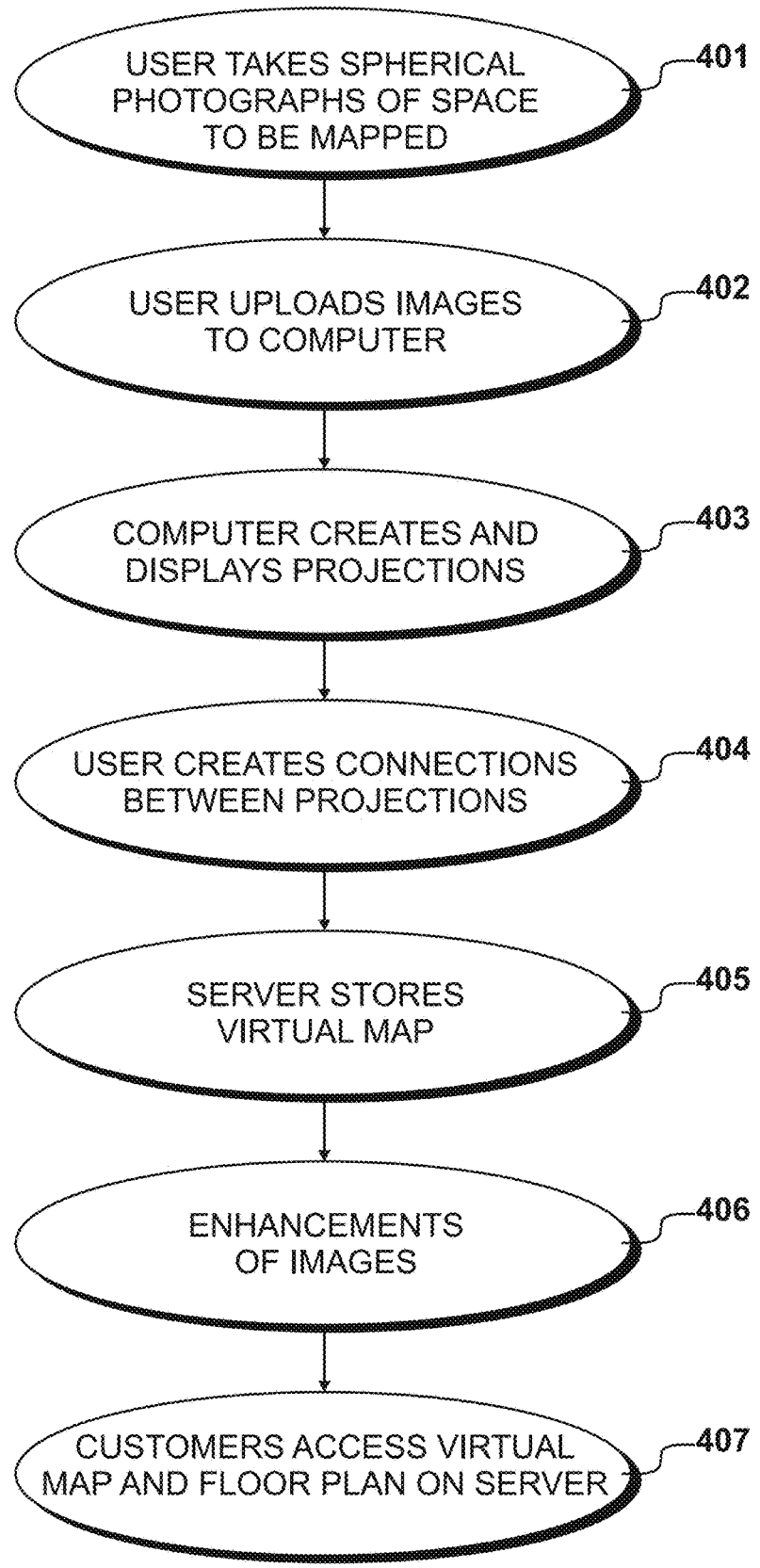
FIG. 4 details steps carried out to create and display a virtual map.

A flowchart for the workflow of the creation, enhancement and viewing of a virtual map or tour is shown in FIG. 4. At step 401 a user takes spherical photographs of a space to be mapped. As previously described, panoramic images may be used, but in the preferred embodiment spherical photographs are used that allow the customer to see every part of the space.

At step 402, the user uploads images to their computing device, and at step 403 the device creates and displays projections of these images that enable the user to create connections between them, which the user does at step 404. The images and connections together define the virtual map, which is rendered and stored at server 107 at step 405. These steps are performed in accordance with the previous proposal.

At step 406, the virtual map may be enhanced by identifying locations in Cartesian coordinates of elements visible in said images. This enhancement may also take place if the user has not carried out steps 403 to 405 to create a virtual map, as many of the enhancement methods are suitable for use in any spherical viewer, as well as the one presently described.

At step 407 customers access the virtual map on server 107, usually via webserver 101 or 102.

FIG. 5

Figure 5:
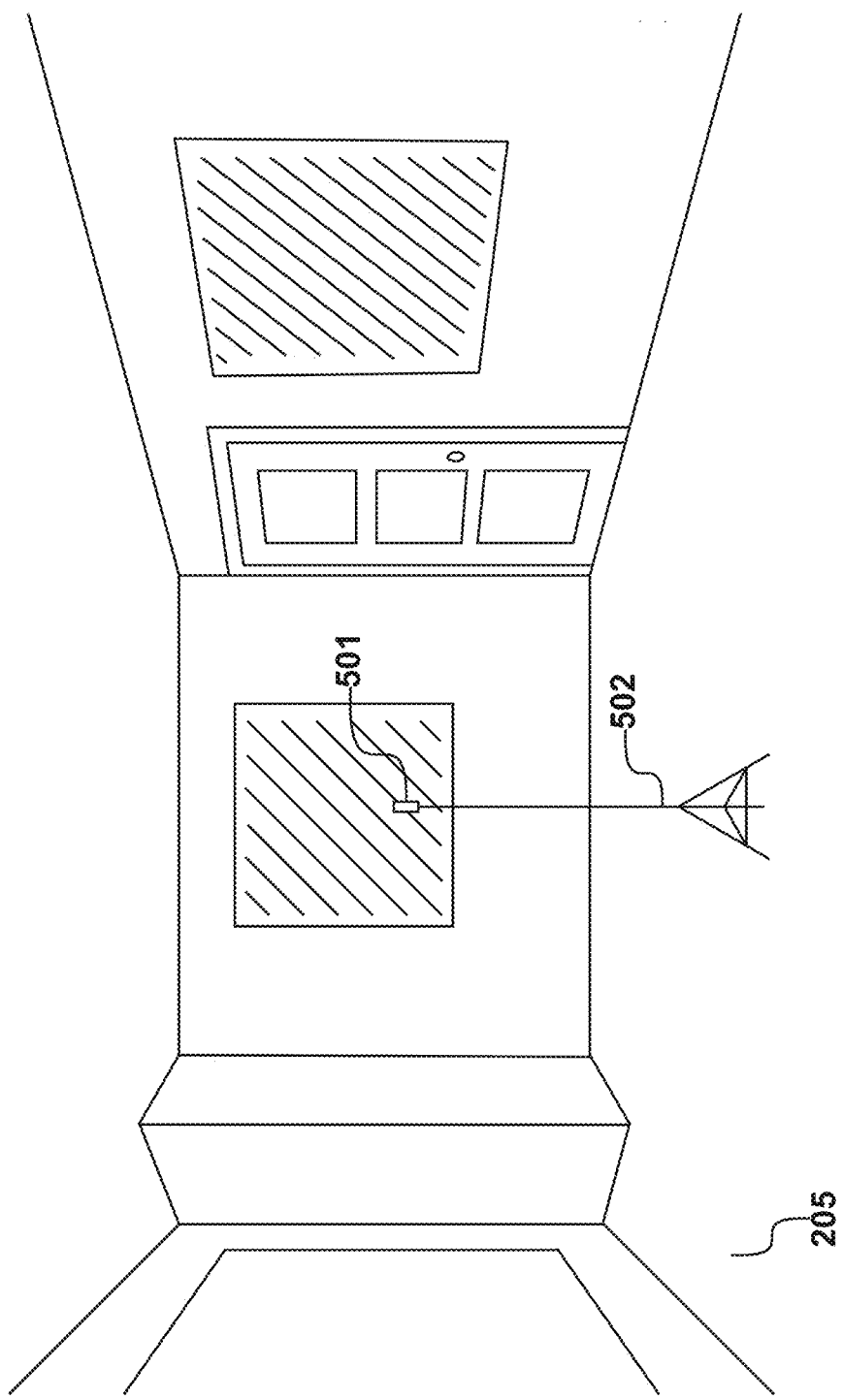
FIG. 5 illustrates a spherical camera photographing a room.

A spherical camera 501, mounted on a tripod 502, taking a spherical photograph of study 205, is shown in FIG. 5. A typical spherical camera has two cameras back-to-back, with a fisheye lens on each. However, any camera that obtains a spherical photograph can be used. In this embodiment the images are all in two dimensions but three dimensional images can be used.

FIG. 6

Figure 6:
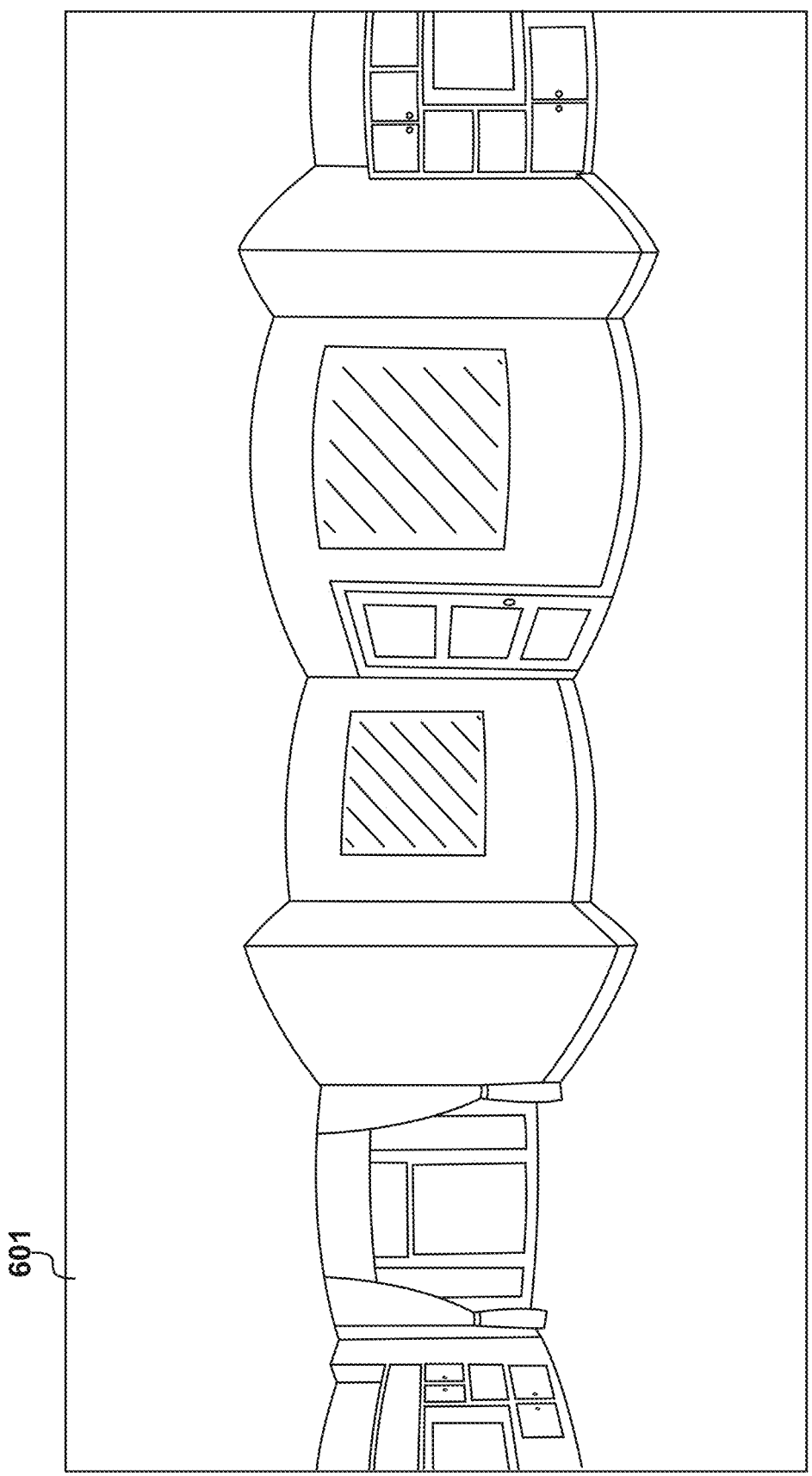
FIG. 6 illustrates a spherical photograph taken by the camera shown in FIG. 5.

An example of a spherical photograph of the study 205, taken by the spherical camera 501, is shown in FIG. 6. It is an equirectangular projection, which is the typical output of a spherical camera. The ceiling and the floor are stretched, but the walls are mainly in proportion. This is the format of the images that may be uploaded and used as the basis of the virtual map, and that may be enhanced, for example by adding a floor plan. In addition, if the camera 501 is not perfectly aligned with the room, the image can be enhanced to identify the rotational compensation that should be applied to the image.

FIG. 7

The various components of the environment shown in FIG. 1 and the steps performed will now be described. FIGS. 7 to 10 describe virtual map server 107, FIGS. 11 to 23 describe the creation of a virtual map, and FIGS. 24 to 27 describe the viewing of a virtual map.

Figure 7:
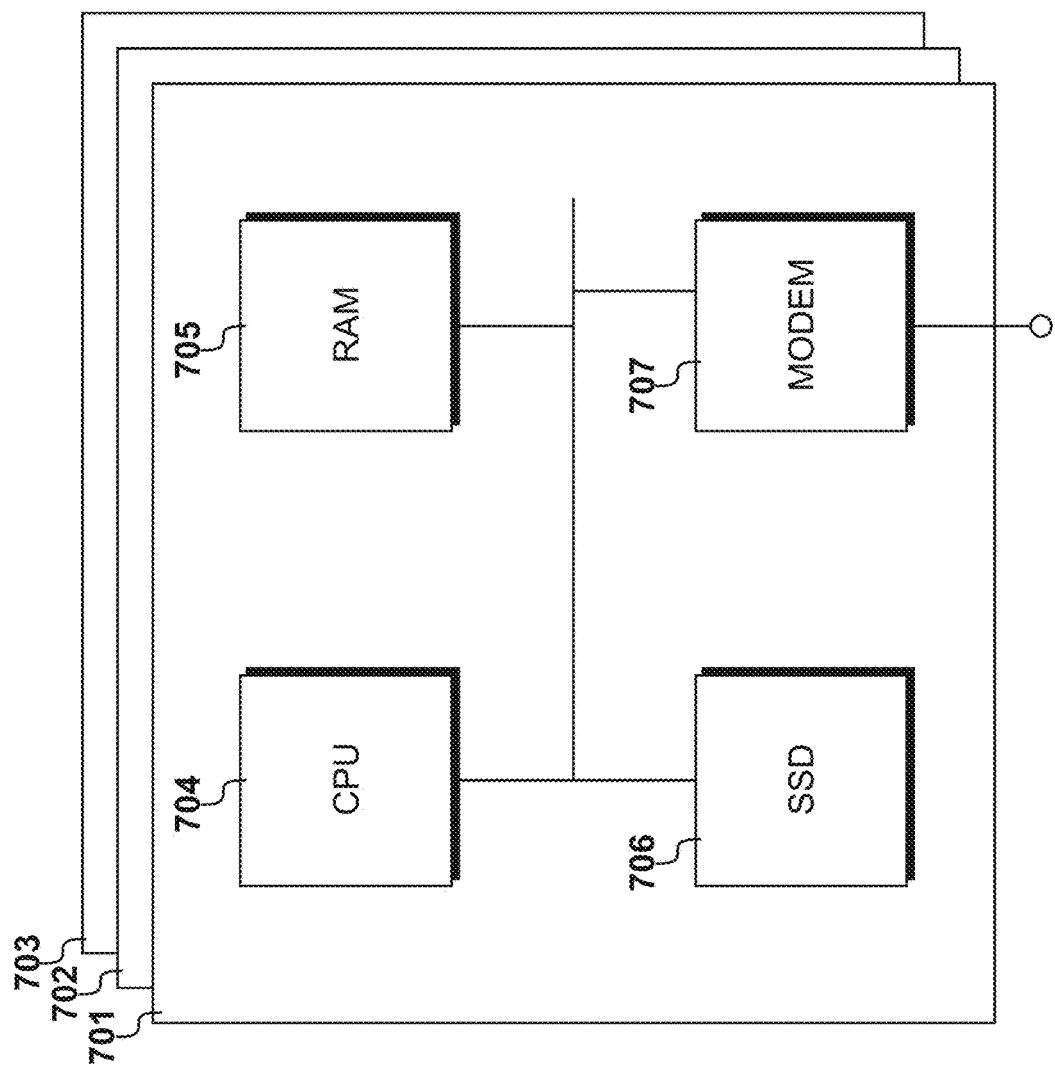
FIG. 7 is a diagram of a server shown in FIG. 1.

A block diagram of virtual map server 107 is shown in FIG. 7. It is a server farm comprising three servers 701, 701 and 703. Any suitable number of servers can be used, including a single server. In this example, server 701 includes a processor which in this example is CPU 704, processor memory provided by RAM 705, a data storage medium which in this example is SSD 706, and an interface provided by modem 707. Any suitable server architecture may be used. Using current technology, a wired connection is necessary in order to serve the data over the internet 106 but a wireless connection could be used as an alternative.

FIG. 8

Figure 8:
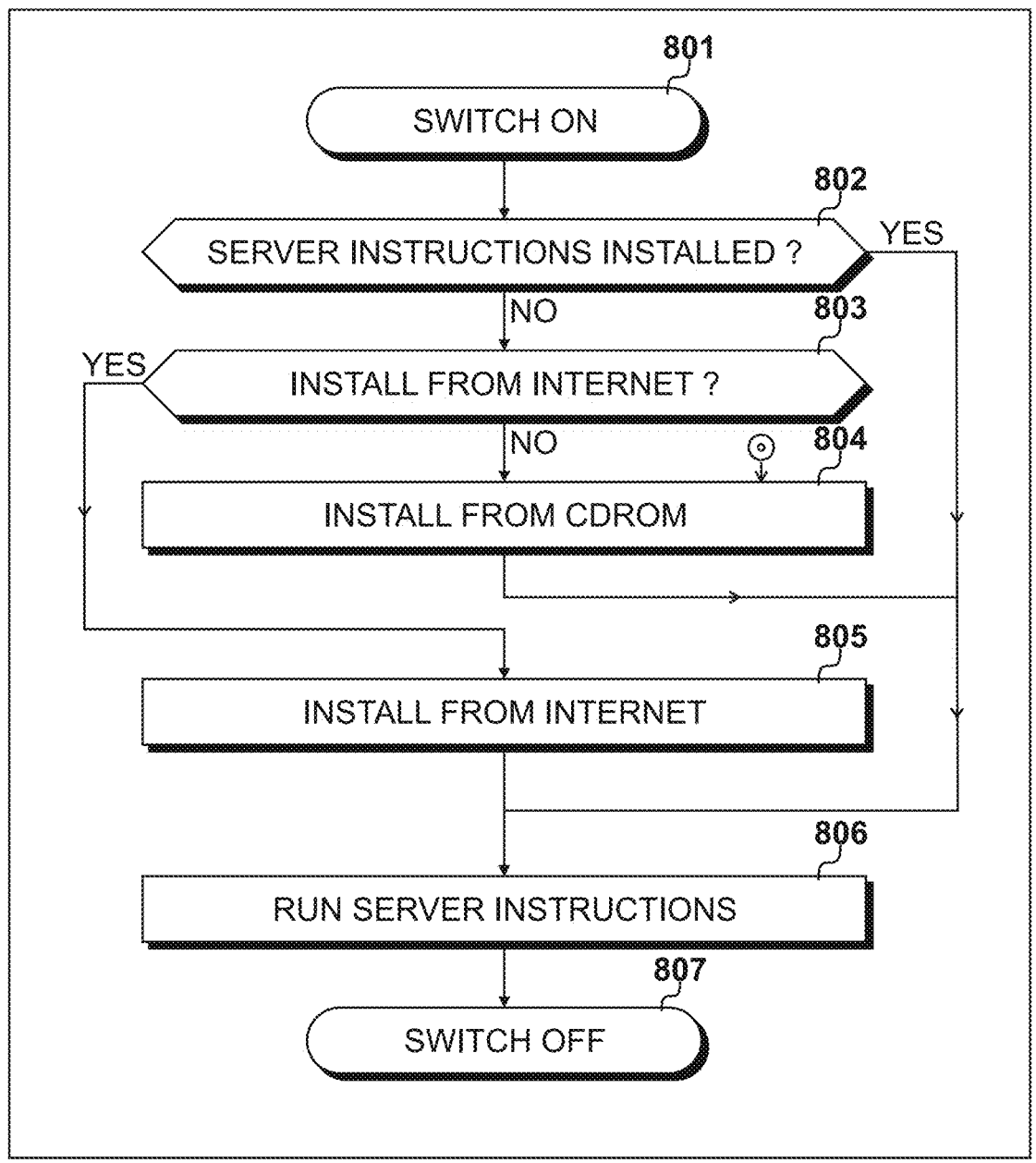
FIG. 8 shows steps carried out by a processor shown in FIG. 7.

Steps carried out by the server 107 to create, store and supply virtual maps are shown in FIG. 8. At step 801 the server is switched on and at step 802 a question is asked as to whether the necessary instructions are already installed. If this question is answered in the negative then at step 803, a further question is asked as to whether the instructions should be installed from the internet. If this question is also answered in the negative, then at step 804 instructions are installed from a portable storage medium, which could be CD-ROM 805 or some other storage such as a flash drive. If the question asked at step 803 is answered in the affirmative, then at step 805 the instructions are installed from a remote location connected via the internet 106.

Following this, and if the question asked at step 802 is answered in the affirmative, to the effect that the instructions are already installed, the server instructions are run at step 806. The server is typically left running until maintenance is required, at which point it is switched off at step 807.

FIG. 9

Figure 9:
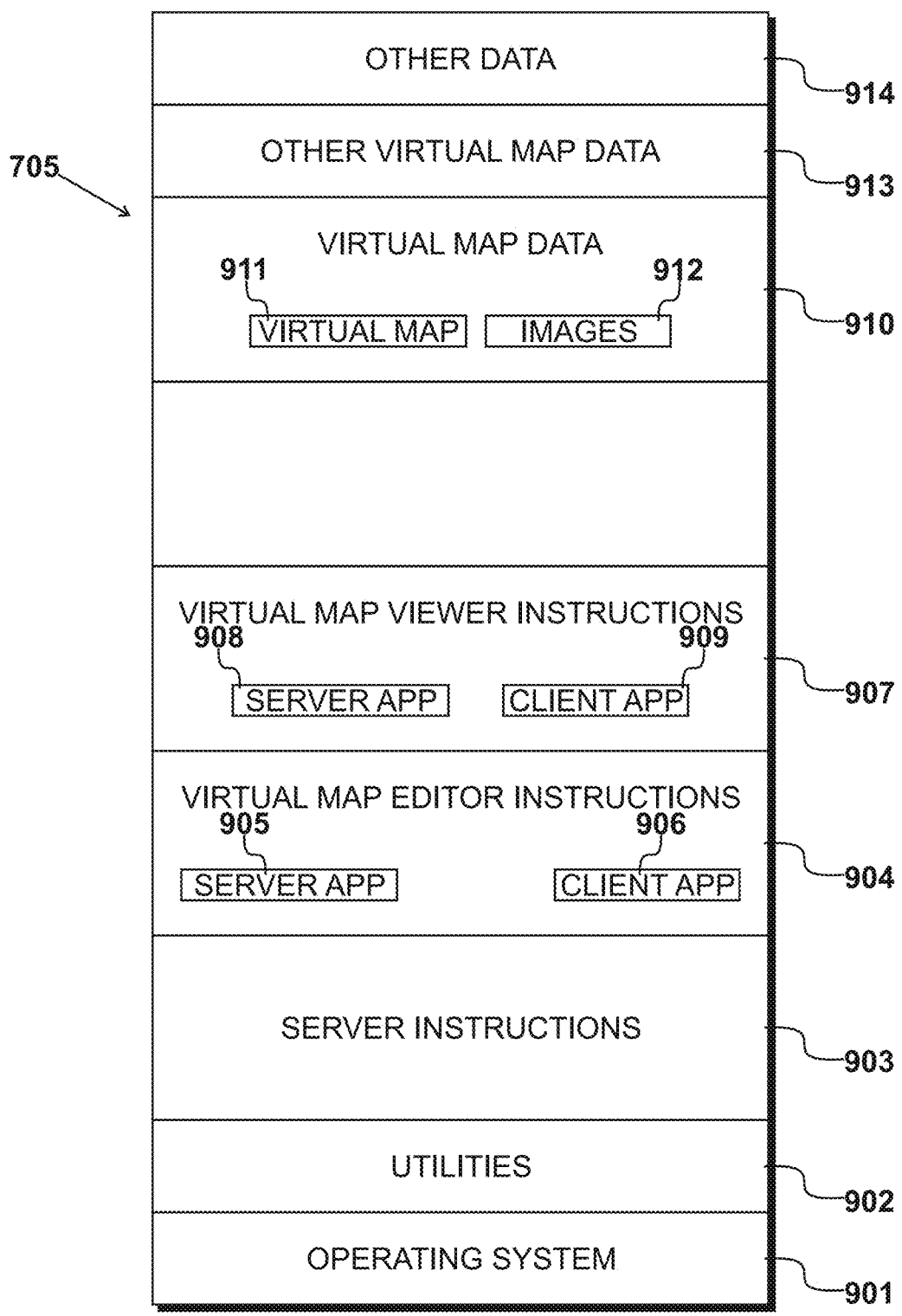
FIG. 9 shows the contents of a memory shown in FIG. 7.

The contents of memory 705, while the server 107 is running instructions at step 806, are shown in FIG. 9. At level 901 is the basic operating system, with utilities present at 902 and the server instructions at 903. The server may operate an application with a modular structure, so that it has the ability to work in conjunction with additional server-side instructions, and also to serve client-side instructions to the devices 101, 102, 103, 107 and 108.

Within virtual map editing instructions 904, there are instructions for the server-side editing application 905 that runs on the server 107, along with instructions for the client-side editing application 906 that are supplied to a requesting client. Similarly, contained within the virtual map viewer instructions 907 is the server-side viewer application 908 and the client-side viewer application 909. In both cases, the server-side application operates in a dialogue with the client-side application, so that the user or customer can perform actions seamlessly.

Stored on server memory 705 is virtual map data 910. This includes the virtual map definitions 911, comprising image and connection data, and the equirectangular images 912. A virtual map is rendered by displaying a number of images 912 in accordance with data from definitions 911. All the map data currently being accessed by users or customers is stored in map data 910. When a user is editing a virtual map, the data being created on the user's computing device is regularly synchronised with that stored at 910, so that a user can interrupt a session and pick it up later, possibly on a different device.

Additionally, all map data, including that not currently accessed, is stored within main memory 706. At 913, there is other virtual map data and at 914 there is other data used by the server.

FIG. 10

Figure 10:
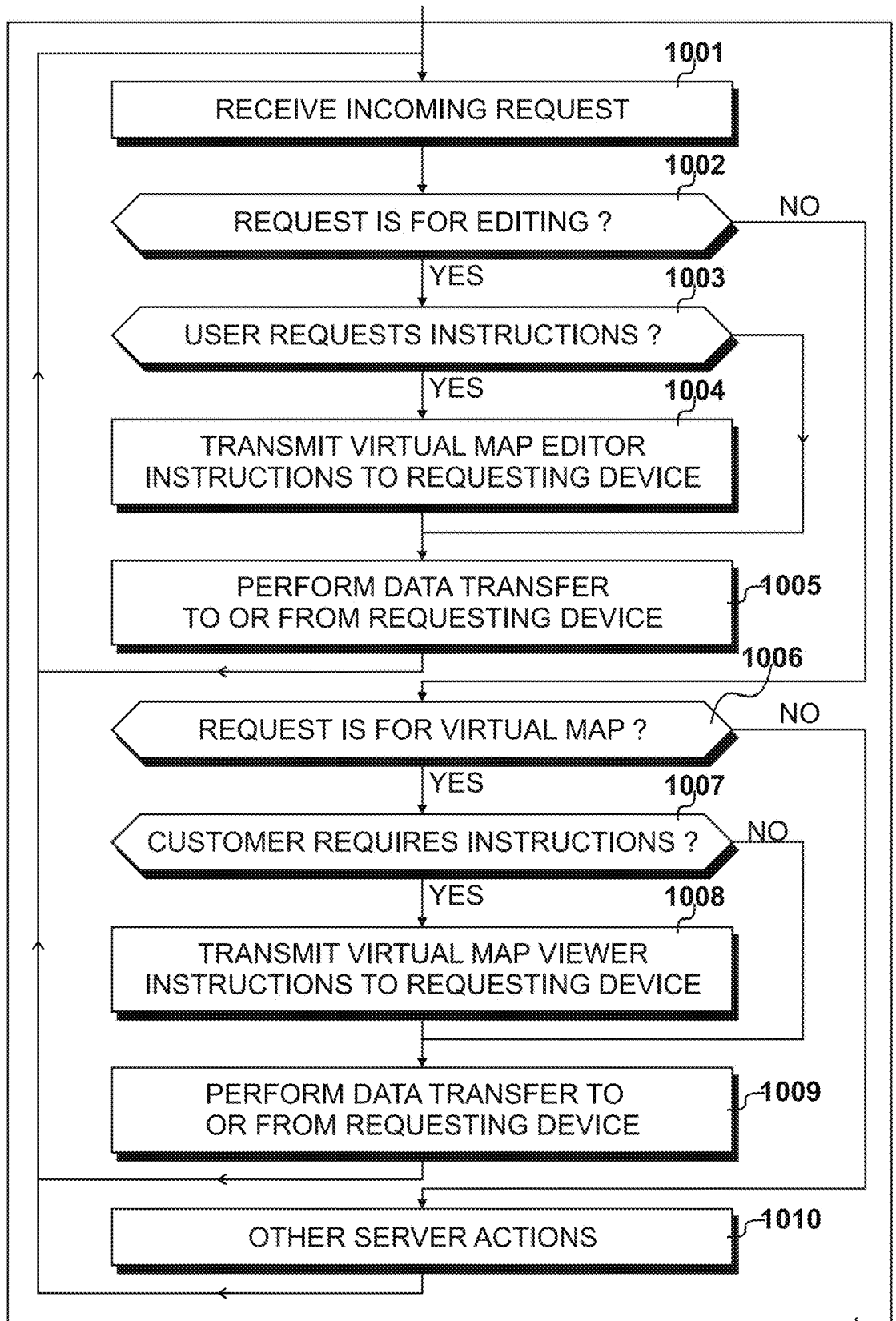
FIG. 10 details steps carried out during FIG. 8 to carry out server instructions.

Procedures 806, at which the server carries out its instructions, are shown in FIG. 10. The server 107 mainly responds to user requests to edit a virtual map and customer requests to supply a virtual map. Thus, at step 1001 a request is received. This may be received directly or, if server 701 is part of a server farm, it may be received via a traffic manager or other routing system.

At step 1002 a question is asked as to whether the request is from a user wishing to create or edit a virtual map. If this question is answered in the affirmative, a further question is asked at step 1003 as to whether the user needs to download the instructions for the client-side editing application 906. If this question is answered in the affirmative, virtual map editor instructions 906 are transmitted to the requesting device at step 1004. At this point, and if the question asked at step 1003 is answered in the negative, to the effect that the user does not require instructions, a session is created to perform data transfer to or from the requesting device. The user's side of these steps will be described further with reference to FIG. 12.

At step 1006 a question is asked as to whether the incoming request is for supply of a virtual map, and if this question is answered in the affirmative, a question is asked at step 1007 as to whether the customer needs to download the instructions for the client-side viewer application 909. If this question is answered in the affirmative, the virtual map viewer instructions are transmitted to the requesting device at step 1008. At this point, and if the question asked at step 1007 is answered in the negative, to the effect that the customer does not require instructions, a session is opened at step 1009 to perform data transfer to and from the requesting device. The customer's side of these steps will be described further with reference to FIG. 25.

If the incoming request is neither for the editing or the supply of a virtual map, other server actions may be performed at step 1010. These include HTML and CSS serving, user account login, session clean-up, and so on. Thus, this loop continues until the server processes are interrupted by an operation such as the powering down of the server.

FIG. 11

Figure 11:
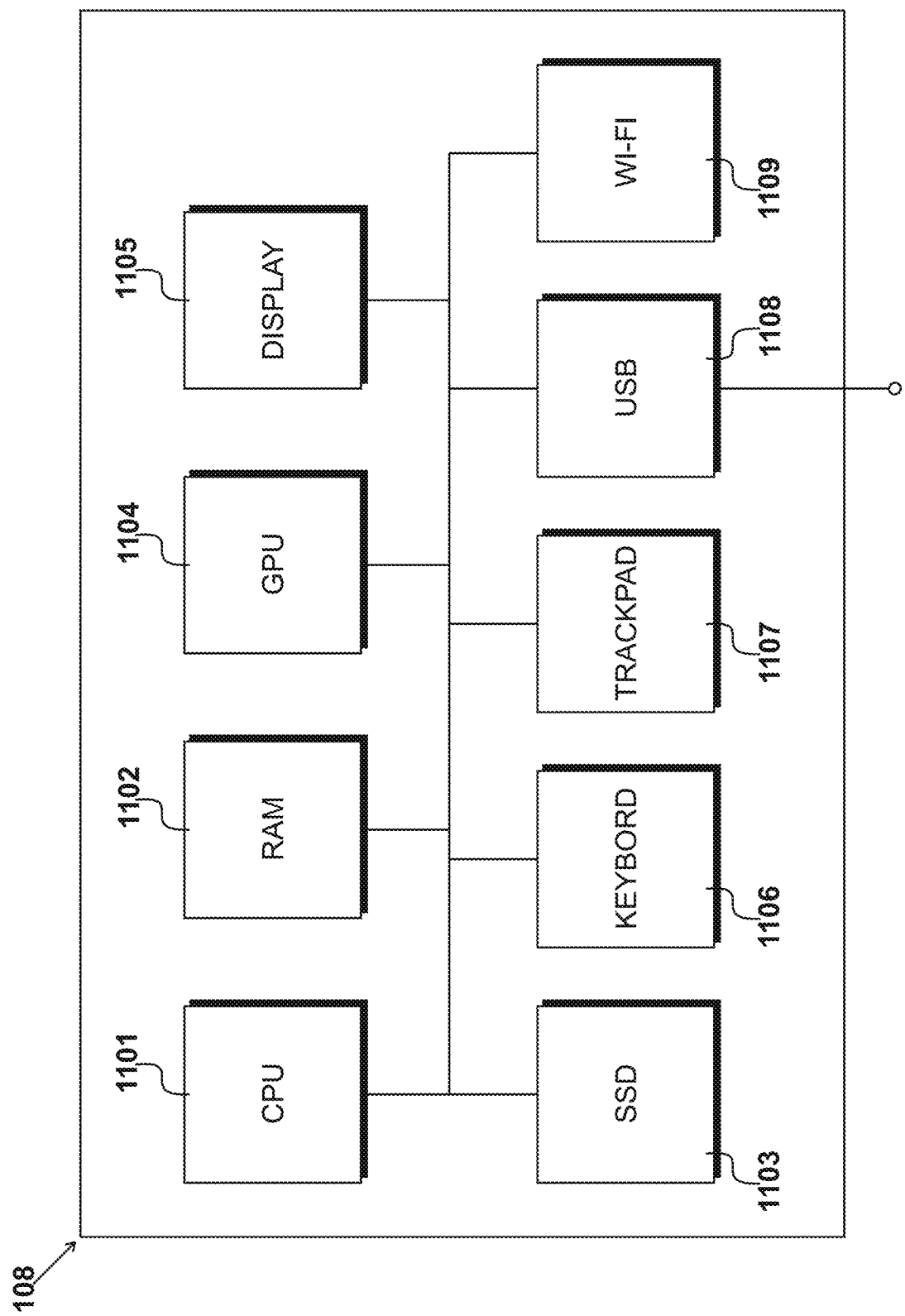
FIG. 11 is a diagram of a computer shown in FIG. 1.

An example of laptop computer 108, used to create or edit a virtual map, is shown in FIG. 11; however, any computing device that has a processor, a memory, and a display device could be used.

The laptop computer 108 includes a central processing unit (CPU) 1101 and processor random access memory (RAM) 1102. A data storage medium is provided by a solid-state drive (SSD) 1103. A graphics processing unit 1104 provides visual output data to a display 1105, while a keyboard 1106 and a trackpad 1107 provide manual input. A universal serial bus (USB) interface 1108 provides input/output from USB devices, such as the camera 501, while a Wi-Fi interface 1109 facilitates communication with networks, such as the internet 1106.

FIG. 12

Figure 12:
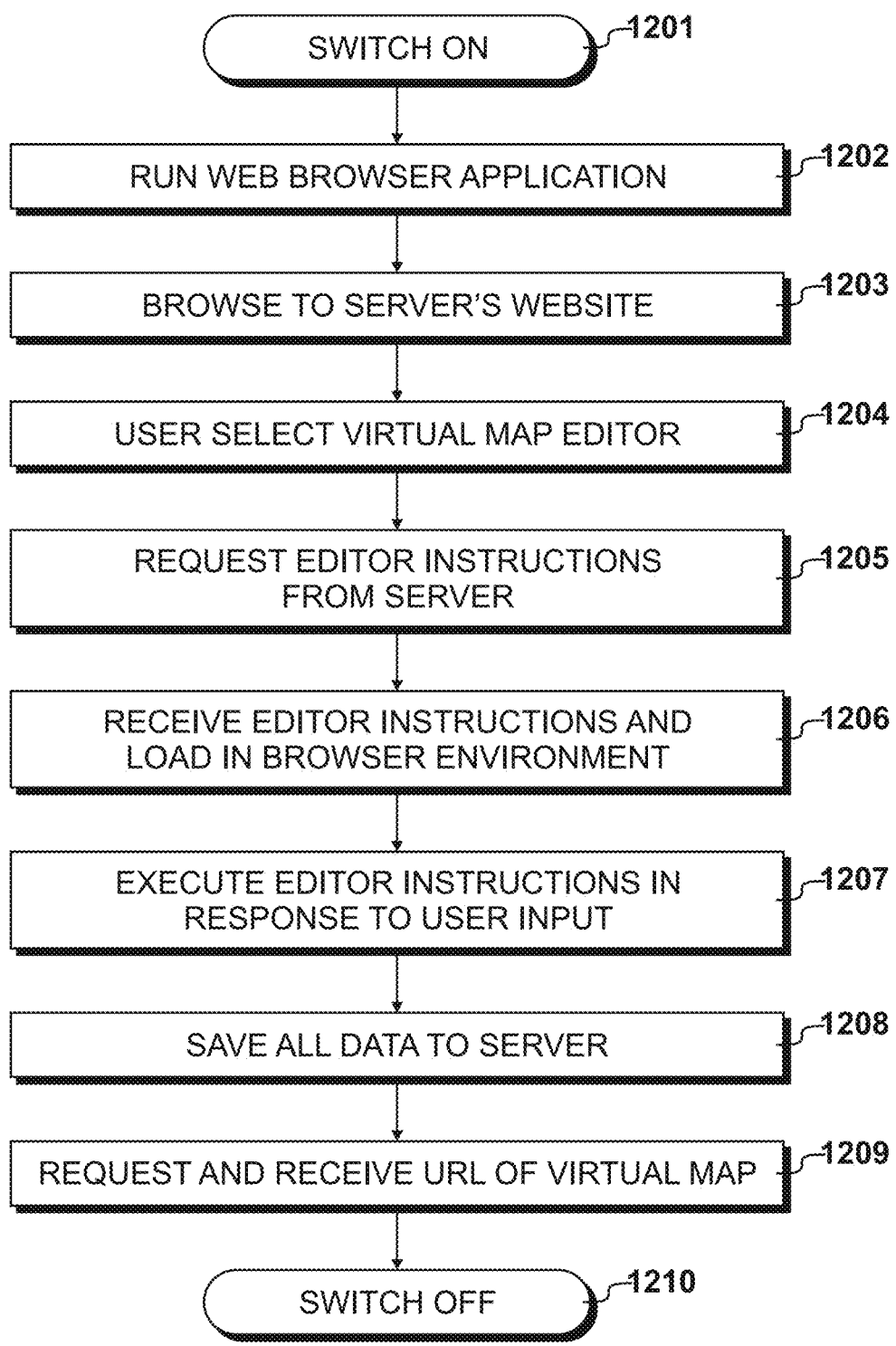
FIG. 12 shows steps carried out by a processor shown in FIG. 11 to create a virtual map.

Steps carried out by processor 1101, to facilitate the creation or editing of a virtual map, are detailed in FIG. 12. At step 1201 the laptop computer is switched on and boots up. At step 1202 a web browser application is run, and at step 1203 it browses the website of the virtual map server 107. In this embodiment, the virtual map editor is provided as an application that runs within a web browser. In other embodiments it could be a standalone application loaded onto the computing device, either via the internet 106 or from a portable storage device. However, providing the functionality using the web browser allows the virtual map editor to be used seamlessly as part of the user's browsing experience, without the user having to install an additional application.

At step 1204, while browsing the website of the server 107, the user selects the virtual map editor and at step 1205, the processor 1101 sends a request for the instructions for the editor from the server, which is processed by the server at step 1004.

At step 1206 the instructions are received from the server and the processor loads them in the browser environment. At step 1207, the editor instructions are executed in response to user input received via keyboard 1106 and trackpad 1107. This will be further described with respect to FIGS. 14 to 23.

Virtual map data is regularly synchronised with server 107 during step 1207 but at step 1208, all data may be saved in response to user selection of a SAVE function.

Following user selection of a PUBLISH function, the processor 1101 requests and receives a URL from server 107, which indicates the location at which the virtual map may be viewed. HTML code to embed the virtual map within a website is also supplied.

At this point, the user may do further work on this or another virtual map but for the purposes of this illustration, the laptop computer is switched off at step 1210.

In an embodiment, the virtual map server 107 hosts both the facility to create a virtual map and the created maps themselves. However, in other embodiments a full application for creating a virtual map could be downloaded as an application to a computing device, such that the creation of the map would not involve a server. Furthermore, a virtual map could be hosted by another server, or could be viewed on the computing device that created it, or could even be served from the web server, such as web server 101, that hosts the relevant website. The cloud environment described herein is only one example of suitable network architecture that can be used.

FIG. 13

Figure 13:
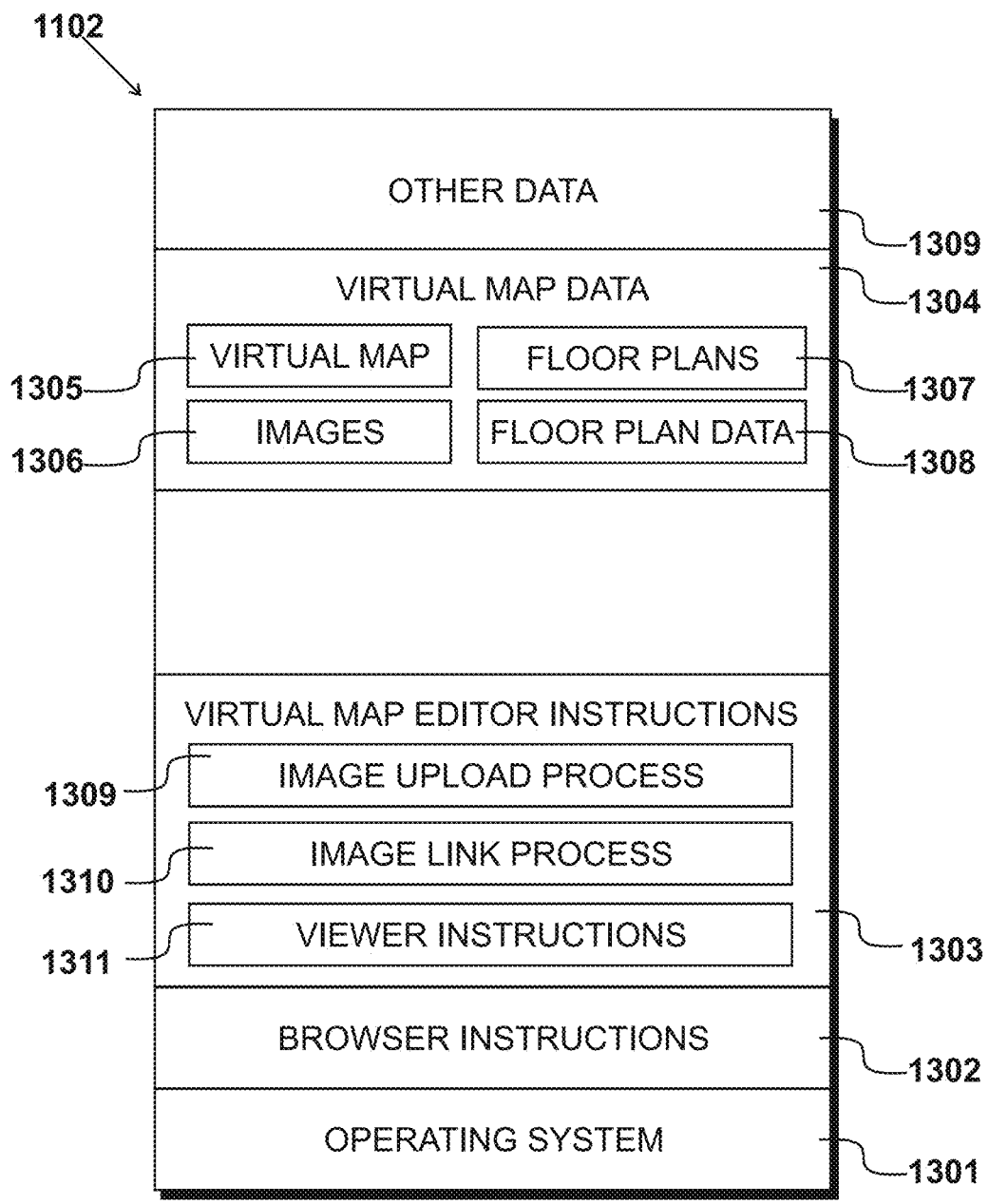
FIG. 13 shows the contents of a memory shown in FIG. 11.
Figure 28:
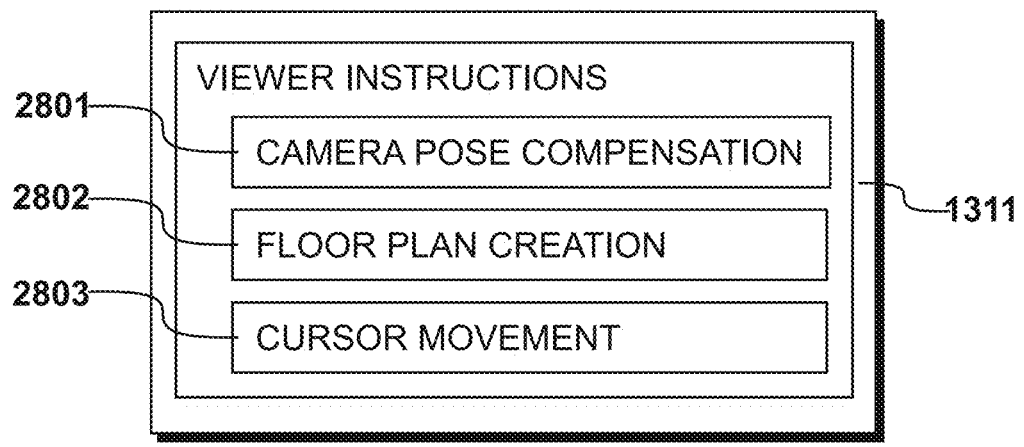
FIG. 28 details processes included in the viewer instructions shown in FIG. 13.

A diagram of the contents of RAM 1102, while the laptop computer 108 is executing the editing application, is shown in FIG. 13. At a first level is the operating system 1301, followed by browser instructions 1302. Virtual map editor instructions 1303 are the instructions 906 supplied by the server 107 to the laptop computer 108 at step 1004, and received at step 1206. Editor instructions include image upload process 1309 and image link process 1310, that enable a user to create the virtual map, and viewer instructions 1311. Instructions 1310 enable a user to view the created map and enhance it if required, and will be further detailed with reference to FIG. 28.

At location 1304, virtual map data includes virtual map definition 1305, images 1306, floor plans 1307, and floor plan data 1308. During a session, these are synchronised with the virtual map definitions 911 and images 912 in the RAM 705 of the server 107. Floor plans 1307 may be uploaded by the user, and/or may be created using floor plan data 1308 as will be described later.

Other data used by the laptop 108 during operation is at location 1309.

FIG. 14

Figure 14:
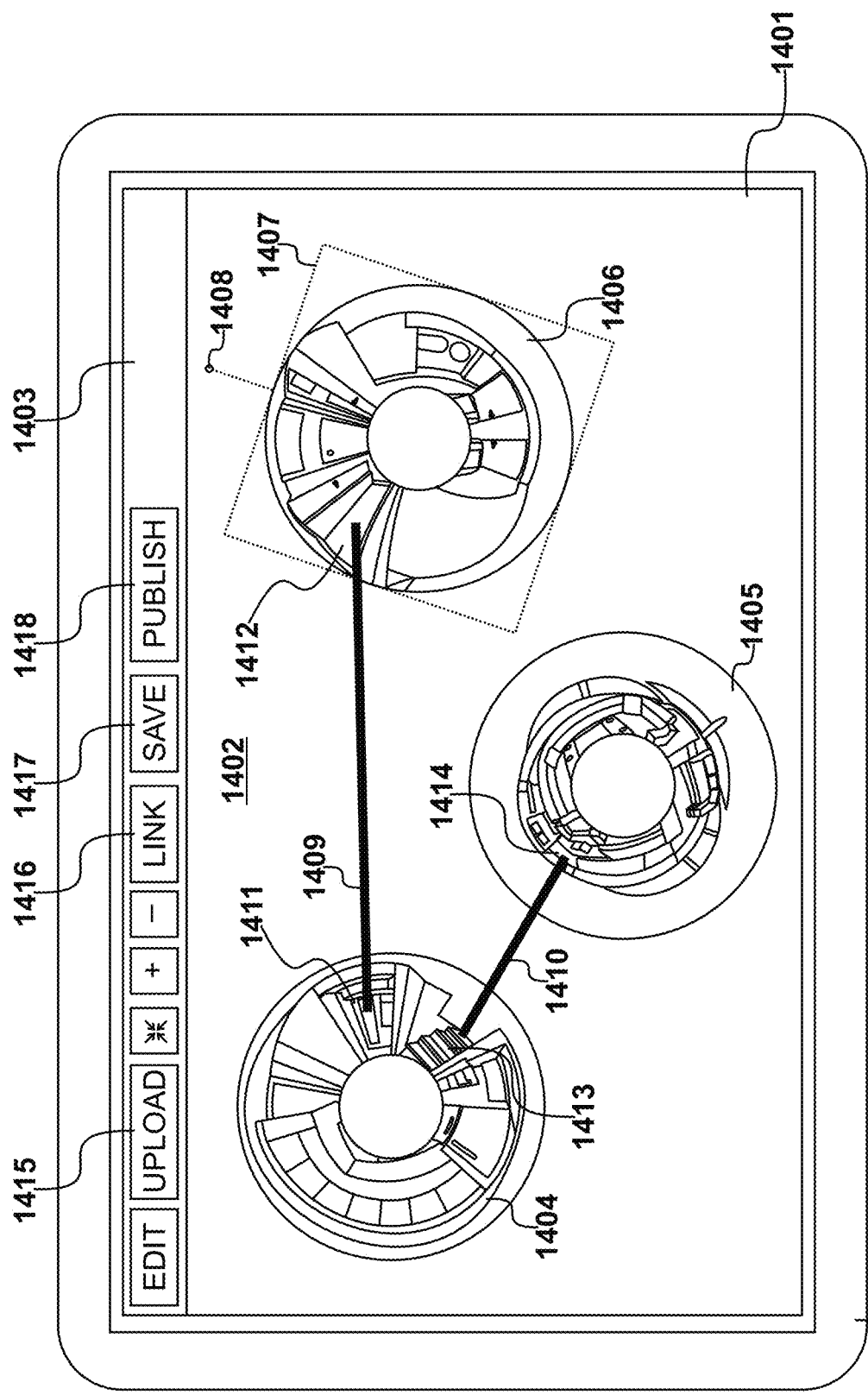
FIG. 14 illustrates an interface displayed on a display shown in FIG. 11.

An interface 1401 displayed to the user of laptop 108 on display 1105, is illustrated in FIG. 14, while the editing application is being used at step 1207. The interface 1401 includes an editing area 1402 and a toolbar 1403.

While creating a virtual map, a user uploads images taken by the spherical camera 501, and circular projections of these are displayed within the editing area 1402. In this example, three images have been uploaded, and are displayed as projections 1404, 1405 and 1406. Projection 1406 is shown with a containing square 1407 which includes a rotation point 1408. When a projection is selected, this containing square appears; enabling the user to move, size and rotate the projection in space identified within the editing area 1402.

Projections 1404, 1405 and 1406 are joined by connecting lines 1409 and 1410. These are drawn by the user to link points in the images that connect to each other. Thus, for example, line 1409 connects door 1411 in projection 1404 to door 1412 in projection 1406: these are in fact the same door viewed from different rooms. Similarly, line 1410 joins the stairwell 1413 in projection 1404 to the hatch 1414 in projection 1405, which are different views of the same linking staircase. As described with reference to FIG. 3, linking lines are drawn between any two points in different images that are different views of the same connection point. A connection point may be a doorway, a stairwell, or simply a point in space (unless a floor plan is to be created from the images).

The toolbar 1403 contains buttons that, when selected, run functions within the editing application 1303. The functions triggered by upload button 1415 and link button 1416 will be described in detail with reference to FIG. 16 and FIG. 22 respectively. Selecting the SAVE button 1417 triggers the saving of data at step 1208, and the selection of PUBLISH button 1418 triggers the publication of the virtual map at step 1209. Therefore, the interface 1401 provides the user with an intuitive way of creating links between images representing physical space.

It is not necessary for the virtual map to include every part of the space being toured. For example, if two rooms are connected by an unphotographed corridor, then images of the two rooms at either end of the corridor could still be linked, even though the rooms are not physically adjacent. However, if a floor plan is to be created, then this is not recommended as it will make it difficult to automatically orientate rooms by their connection points, as will be described with reference to FIG. 47.

FIG. 15

Figure 15:
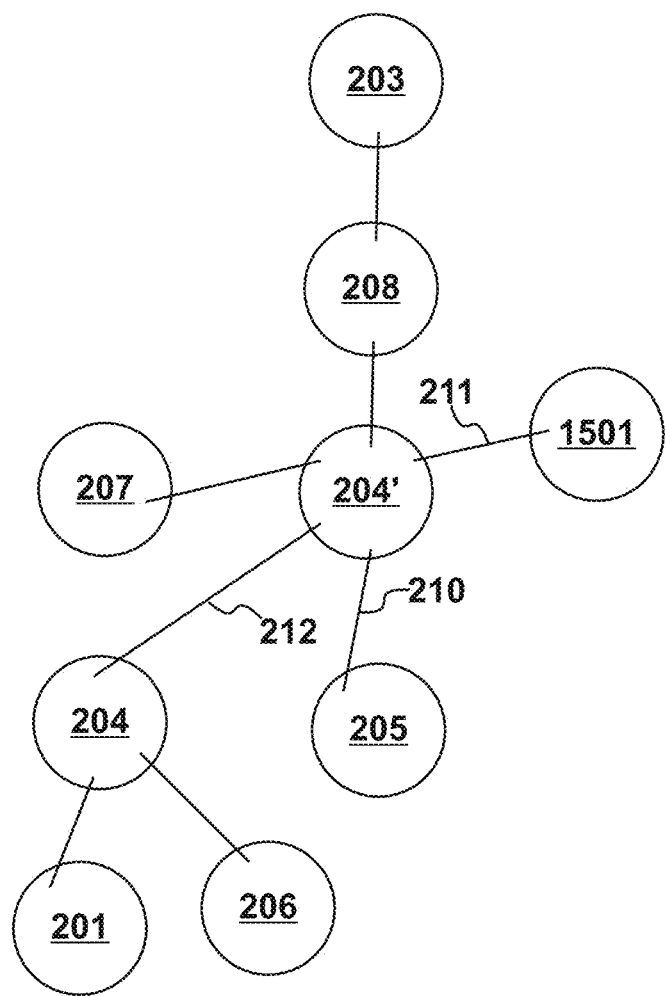
FIG. 15 is a representation of a layout of map data.

The example shown in the interface of FIG. 14 only contains three images and two linking lines. However, a typical virtual map would include many images and many connection points. A layout that could result from a user creating a virtual map of the house shown in FIG. 2, is illustrated in FIG. 15. Each circle in FIG. 15 represents a projection of an image of the room indicated, and each line represents a connection point shown by a cross on FIG. 2. A circle 1501 represents an image of the upstairs landing. Thus, a user can orientate the projections so that the connection points in each are adjacent. This means that the user can, if they wish, arrange the layout of the projections to resemble the plan of the building, in order to assist in the creation process.

In other embodiments, the interface could display the original equirectangular images or some other projection, rather than the circular projections described herein. The user could still define connections between points in the images, and the virtual map thus produced would be indistinguishable from that produced using the interface of FIG. 14. However, use of the circular projections enables the uncluttered, intuitive layout that is possible as shown in FIG. 15.

FIG. 16

Figure 16:
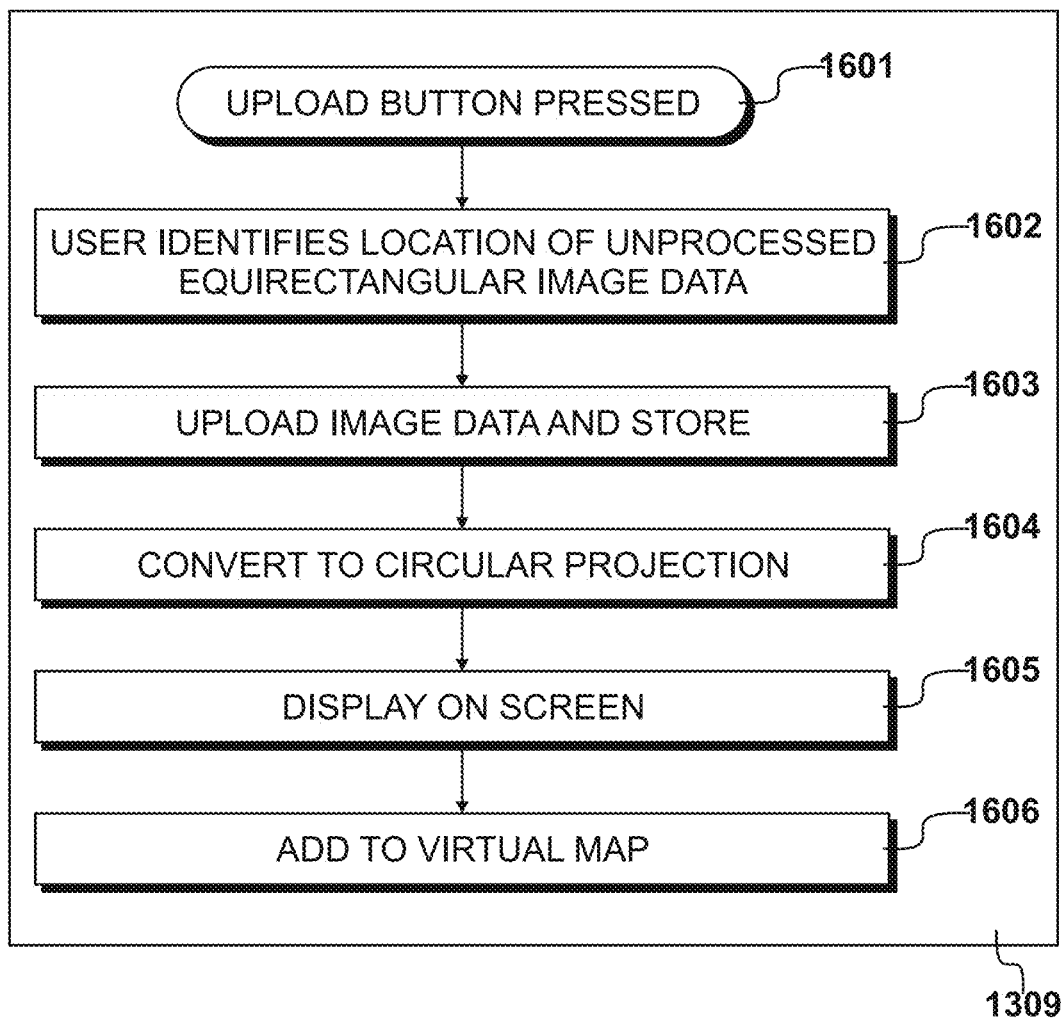
FIG. 16 details steps carried out by the processor shown in FIG. 11 to upload images.

Details of upload process 1309 are shown in FIG. 16. The upload button 1415 is selected by a user at step 1601. At step 1602, the user is invited, via a dialog box or similar, to identity the location of the unprocessed equirectangular image data to be uploaded and at step 1602, the image data is uploaded from the identified location and stored in RAM 1102 at the image store 1306. The image may be uploaded directly from the camera 501, connected via USB interface 1108, or it may have been previously stored in data storage medium 1103 or at a networked location.

Figure 18:
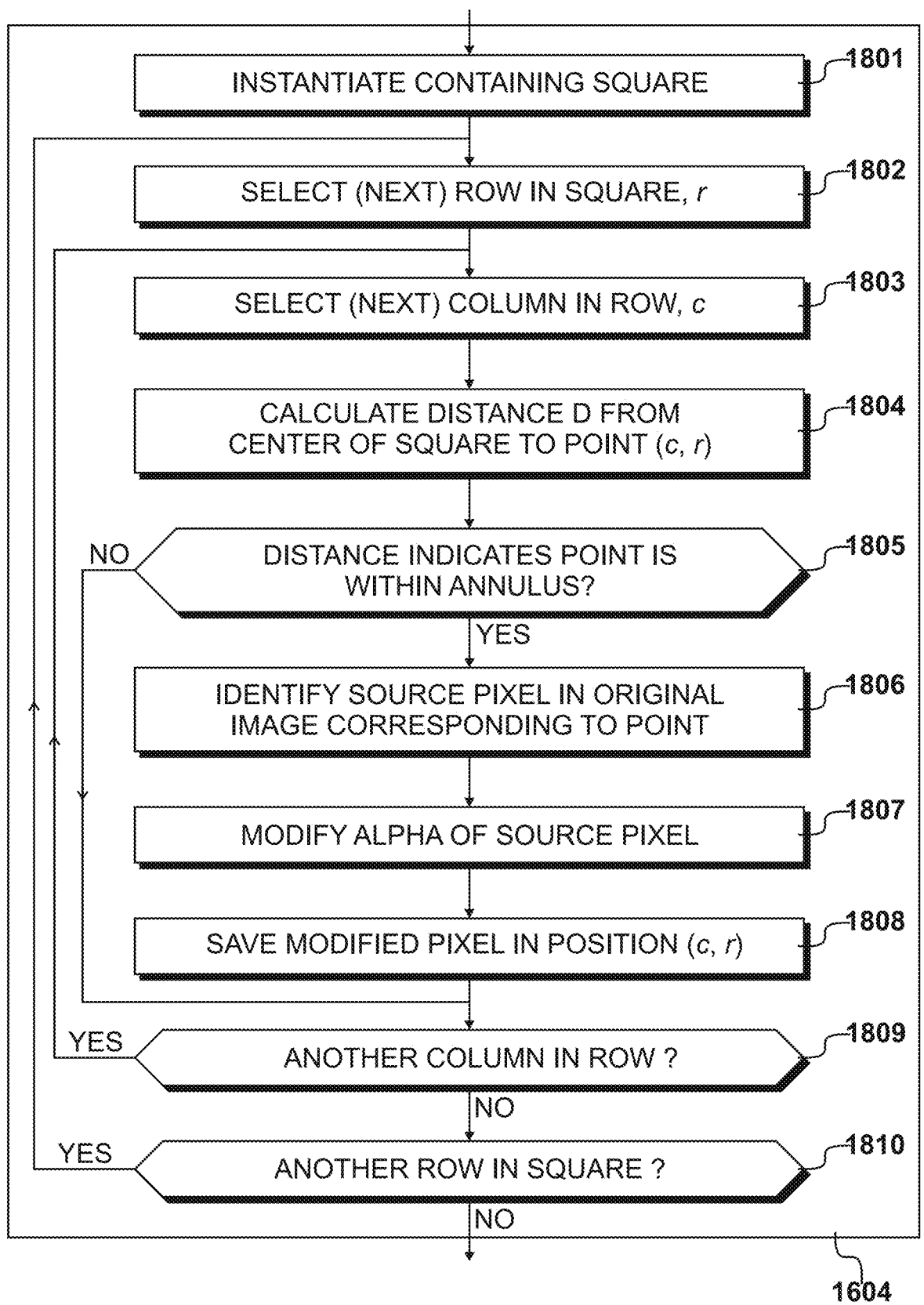
FIG. 18 details steps carried out during FIG. 16 to create the circular projection shown in FIG. 17.

At step 1604, the equirectangular image data is converted to a circular projection, described further with reference to FIG. 18, and at step 1605, this projection is displayed within the interface 1401. At step 1606 an indication that this image has been added to the map is stored in virtual map definition 1305.

If during the editing process, the user decides to delete one of the projections, the indication of the image is deleted from the virtual map definition 1305 and the original image is removed from image store 1306.

FIG. 17

Figure 17:
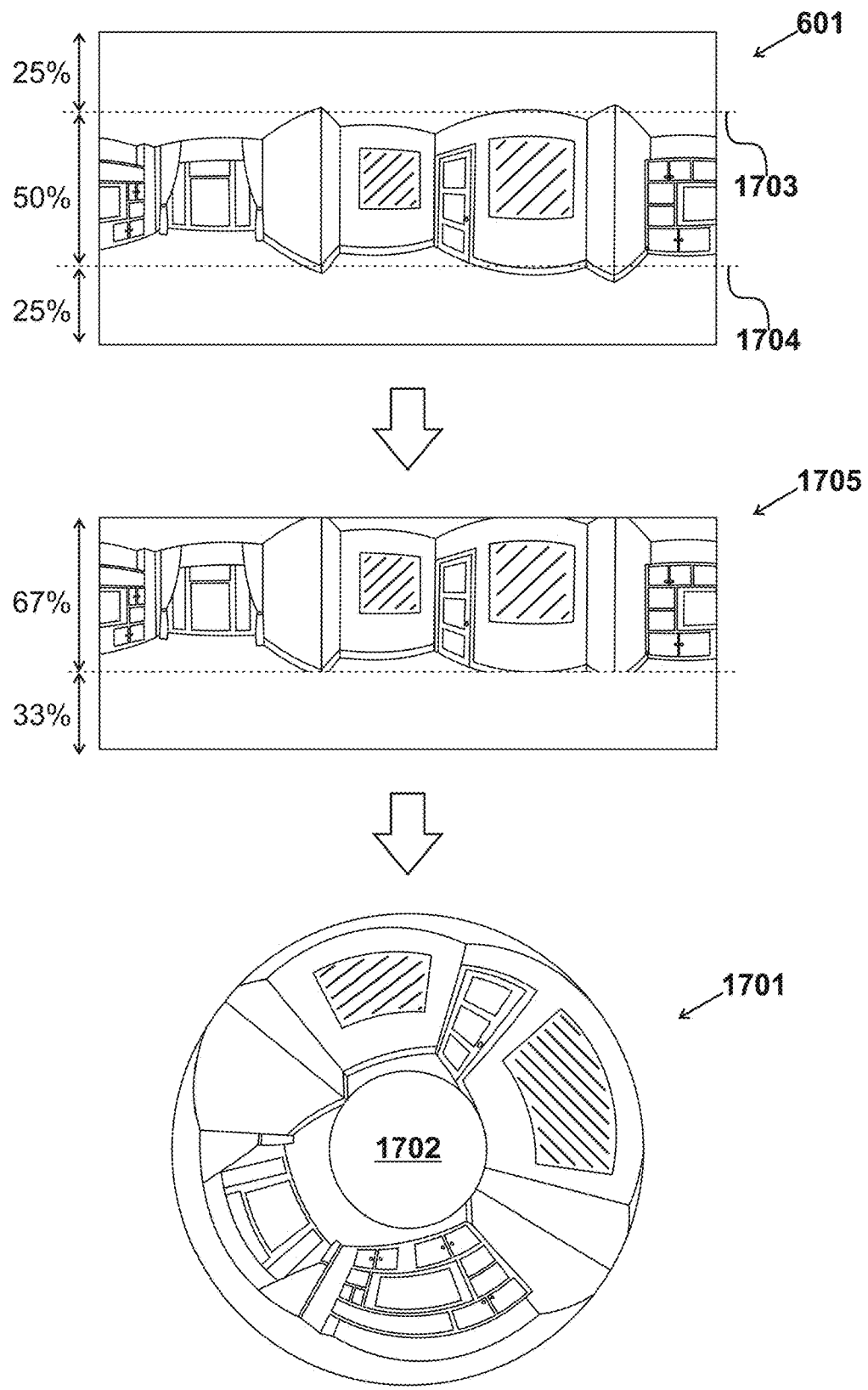
FIG. 17 illustrates the generation of a circular projection from an image.

The conversion of an equirectangular image 601 to a circular projection 1701 is shown in FIG. 17. Image 601 includes a considerable amount of space dedicated to the floor and ceiling. Since connections are generally described between points visible at wall level, it is unnecessary to display either the floor or the ceiling in the circular projection 1701. Therefore, in this embodiment, the ceiling is removed from the image before it is processed into a circular projection, while the floor is omitted during the process in order to leave a blank circle 1702, central to circular projection 1701. The floor and the ceiling could be retained in other embodiments of the invention. However, their removal creates a circular projection that is smaller and easier to use.

Returning to image 601, a first line 1703 indicates the cut-off for the ceiling and a second line 1704 indicates the cut-off for the floor. In an equirectangular projection produced by a spherical camera, both the ceiling and the floor take up approximately twenty-five per-cent of the height of the image each. Consequently, the top twenty-five per-cent of the image is removed to produce a cropped image 1705. This cropped image now has a useable area of the top sixty-seven per-cent, while the bottom third is shown as blank, because it will not be transferred to the circular projection.

Thus, the circular projection 1701 is a projection of the middle half of image 601 into an annulus (bagel or doughnut shape) wrapped around a central point.

FIG. 18

Procedures 1604 of the upload process are detailed in FIG. 18, at which the uploaded equirectangular image, for example image 601, is converted to a circular projection, for example projection 1701. Further details of this process are described with reference to FIGS. 19 to 21.

At step 1801 a containing square is instantiated. This square has a standard height and width of a set number of pixels. It is processed pixel by pixel from the top left, therefore at step 1802, the first row in the square, r, is selected, and at step 1803 the first column in that row, c, is selected. This leads to the selection of a pixel point that can be considered as point (c, r). At step 1804 the distance D from the centre of the square to this point is calculated and at step 1805 a question is asked as to whether this distance measurement indicates that the point in the square is within the annulus created by predetermined thresholds of the circular projection. In an embodiment, the outer circle of the annulus has a diameter similar to the width of the square and the inner circle has a diameter that is one third of that of the outer circle, with both circles being centred with respect to the containing square; this is described with reference to FIG. 19.

If the question asked at step 1806 is answered in the affirmative, to the effect that this point is within the annulus, then at step 1806, the source pixel in the original equirectangular image that corresponds to this point is identified. At step 1807 the alpha channel of the source pixel is modified if necessary before the pixel information is saved in the position of point (c, r).

If the question asked at step 1805 is answered in the negative, to the effect that the selected point is not within the annulus, then steps 1806 to 1808 are skipped and this point is left blank. This creates a white space within the containing square, outside the outer circle and inside the inner circle.

A question is then asked at step 1809 as to whether there is another column in the selected row. If this question is answered in the affirmative, control is returned to step 1803 and the next column is selected. If it is answered in the negative, to the effect that this row has been processed, then at step 1810, a question is asked as to whether there is another row of pixels in the containing square. If this question is answered in the affirmative, control is returned to step 1802 and the next row is selected. If it is answered in the negative, every point in the containing square has been processed and step 1604 is complete.

Thus, during step 1604, each point in the containing square is considered, such that it is either left blank or pixel data from the original equirectangular image is imported.

The process described herein considers the square on a pixel by pixel basis, but in alternative embodiments, if lower resolution is an acceptable compromise in exchange for faster processing speed, the process may, for example, average out pixel information.

The containing square thus produced is the image displayed to the user within interface 1401. When the user selects one of the circular projections, the containing square is displayed as square 1407, with a rotation point 1408.

FIG. 19

Figure 19:
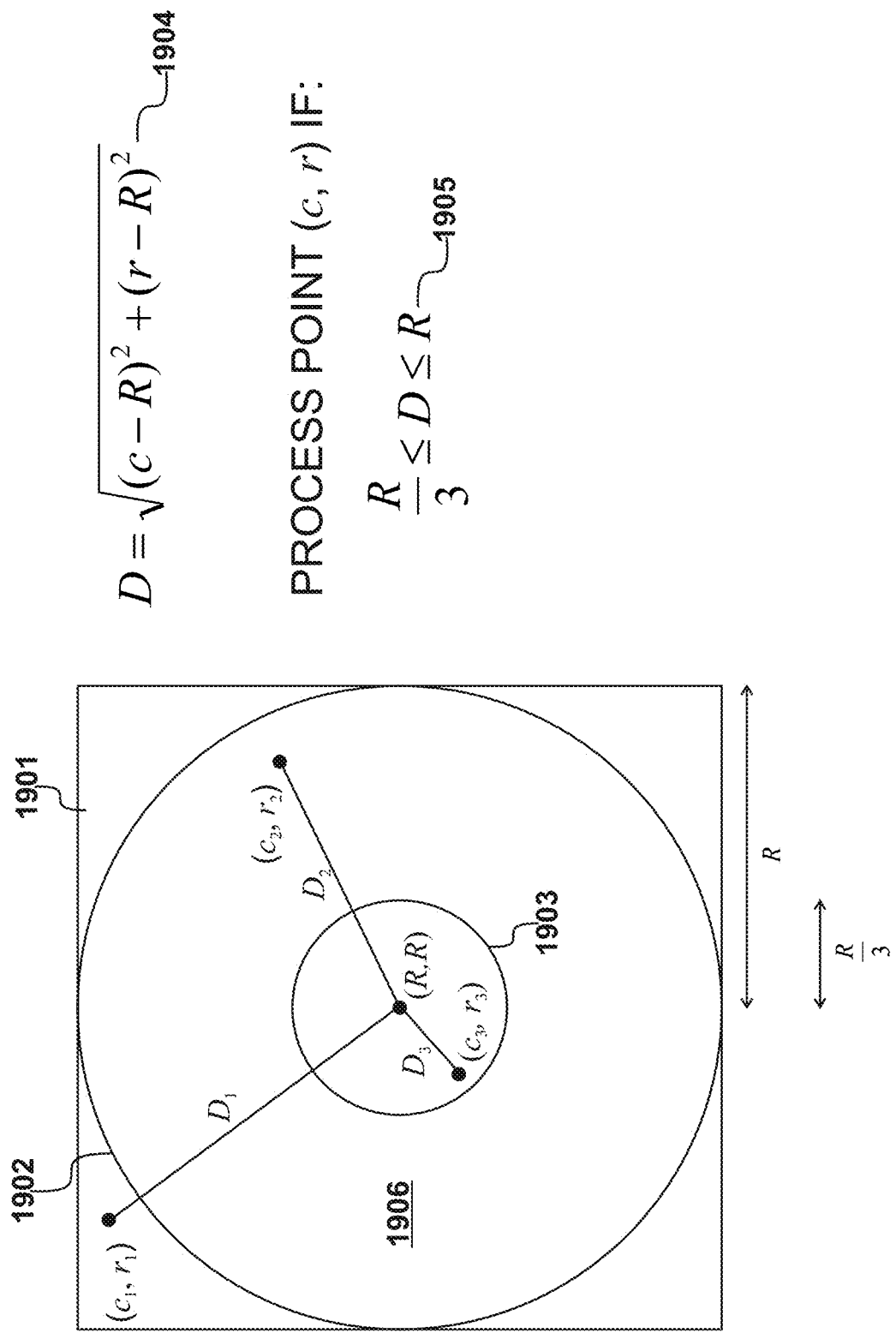
FIG. 19 illustrates calculations carried out during FIG. 18.
Figure 20:
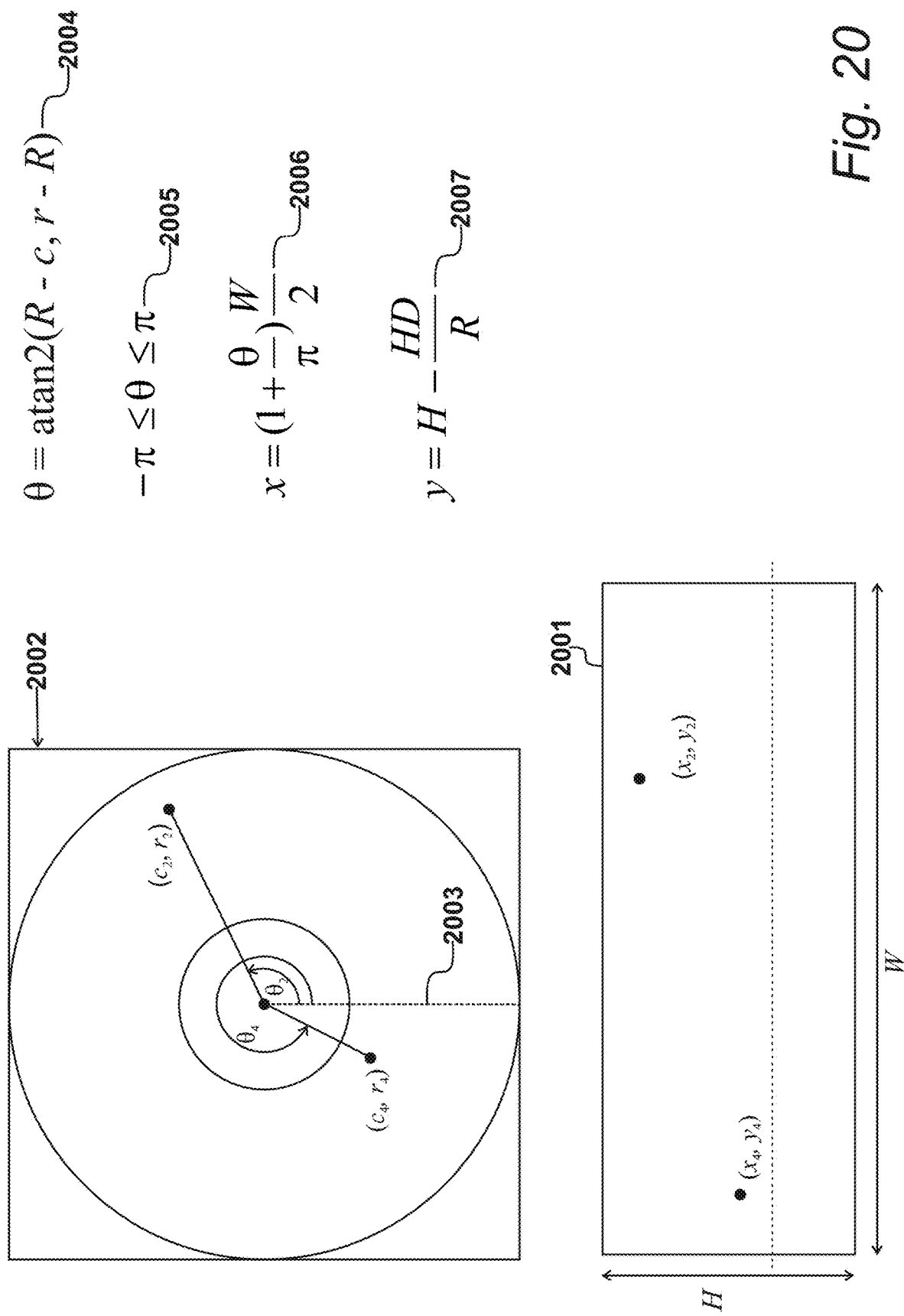
FIG. 20 illustrates further calculations carried out during FIG. 18.

FIGS. 19 and 20 show the formulae used in the steps carried out in FIG. 18. FIG. 19 shows how the distance from the centre of a containing square 1901 to a selected point (c, r) is used to determine whether the point is filled in, with pixel information from the original equirectangular image, or is left blank.

Square 1901 is instantiated with a standard width and height of 2R, where R is a predetermined number of pixels. The outer circle 1802 has a radius of R. The inner circle 1903 has a radius of R/3; thus, referring back to FIG. 17, it can be seen that the space between the two circles 1902 and 1903 will contain the top two thirds of image 1705, whereas the inner circle, rather than continuing the lower third of the image, will be left blank.

If the top left point of square 1901 is considered to be at coordinates (0, 0), the central point is at coordinates (R, R). The distance D between the central point and any given point (c, r) is therefore given by formula 1904:

$$D=\sqrt{(c-R)^2+(r-R)^2}$$

Thus, if the distance D is less than R/3 or greater than R, as shown at 1905, the point is outside the annulus, in which case the question asked at step 1805 is answered in the negative and the point is left blank. In the example shown in FIG. 19, the point $(c_1, r_1)$ is outside outer circle 1902 and will therefore have a value of D greater than R, meaning that it will be left blank. Point $(c_2, r_2)$ is within the annulus and therefore pixel information from the source image will be imported. Point $(c_3, r_3)$ has a value of D less than R/3 and is therefore inside inner circle 1803 and will be left blank.

The thresholds used in this method are dependent upon the removal of the lower one-third from the cropped rectangular image. If a smaller or greater amount is to be removed, then the threshold to decide whether a point inside the containing square is inside the annulus would be correspondingly different. In addition, this method crops the top twenty-five per-cent from the original image before generating the circular projection, but a method that removed it by use of a threshold, as the lower part is removed, would also work. In addition, in other embodiments the entire original image could be used to create the projection, particularly if it was the case that links between the floor and ceiling of adjacent rooms were required, for example to link an attic space by way of a roof hatch.

FIG. 20

FIG. 20 shows the formula used during step 1806 to identify the source pixel in the originating image. In this illustration, the original equirectangular image is shown at 2001, while the circular projection created from it is shown at 2002. In order to determine a position within the source image 2001, a point (c, r) in the containing square is converted to a point (x, y) in the source image 2001. This source image has already had the top twenty-five per-cent removed and therefore corresponds to image 1705. Using the image processing convention that the point (0, 0) is at the top left, the x coordinate therefore varies from 0 to W, where W is the width of the data in pixels, and y is the coordinate that varies from H at the bottom to 0 at the top of the image, where H is the height of the image in pixels after the top twenty-five per-cent has been removed. Thus, any point with a y coordinate larger than 2H/3 will fall within the inner circle and will not be displayed.

In order to determine an x coordinate, the angular position of the point (c, r) around the central point (R, R) is determined using formula 2004:

$$\theta = \text{atan } 2(R-c, r-R)$$

The function atan 2 (which is well known and will not be set out herein) is a discontinuous function that returns a value between $-\pi$ and $\pi$, as shown at 2005. This value corresponds to the angular distance, taken in an anti-clockwise direction, between the line 2003 and the point (c, r). Thus, looking at the example of 2002, point $(c_2, r_2)$ returns a value of θ that is smaller than the value returned by point $(c_4, r_4)$.

Line 2003 represents the join between the two edges of image 2001 when it is projected. Therefore, the formula to convert the variable θ into an x coordinate in image data 2001 is given by formula 2006:

$$x = \left(1 + \frac{\theta}{\pi}\right)\frac{W}{2}$$

The previously calculated distance D from the point (c, r) to the centre of the circle is used to identify the corresponding y coordinate in image 2001 using formula 2007:

$$y = H - \frac{HD}{R}$$

Thus, for example, the point $(c_2, r_2)$ in projection 2002 corresponds to the point $(x_2, y_2)$ in image 2001, and the pixel data from that point is imported to point $(c_2, r_2)$. Similarly, the pixel information from point $(x_4, y_4)$ is imported to point $(c_4, r_4)$ in projection 2002.

The pixel information imported is the RGB (red, green, blue) and alpha (opacity) values for the selected pixel. The alpha value may be modified before importing, as will be described further with reference to FIG. 21. Other embodiments may use other methods of creating a circular projection from an equirectangular image.

FIG. 21

Figure 21:
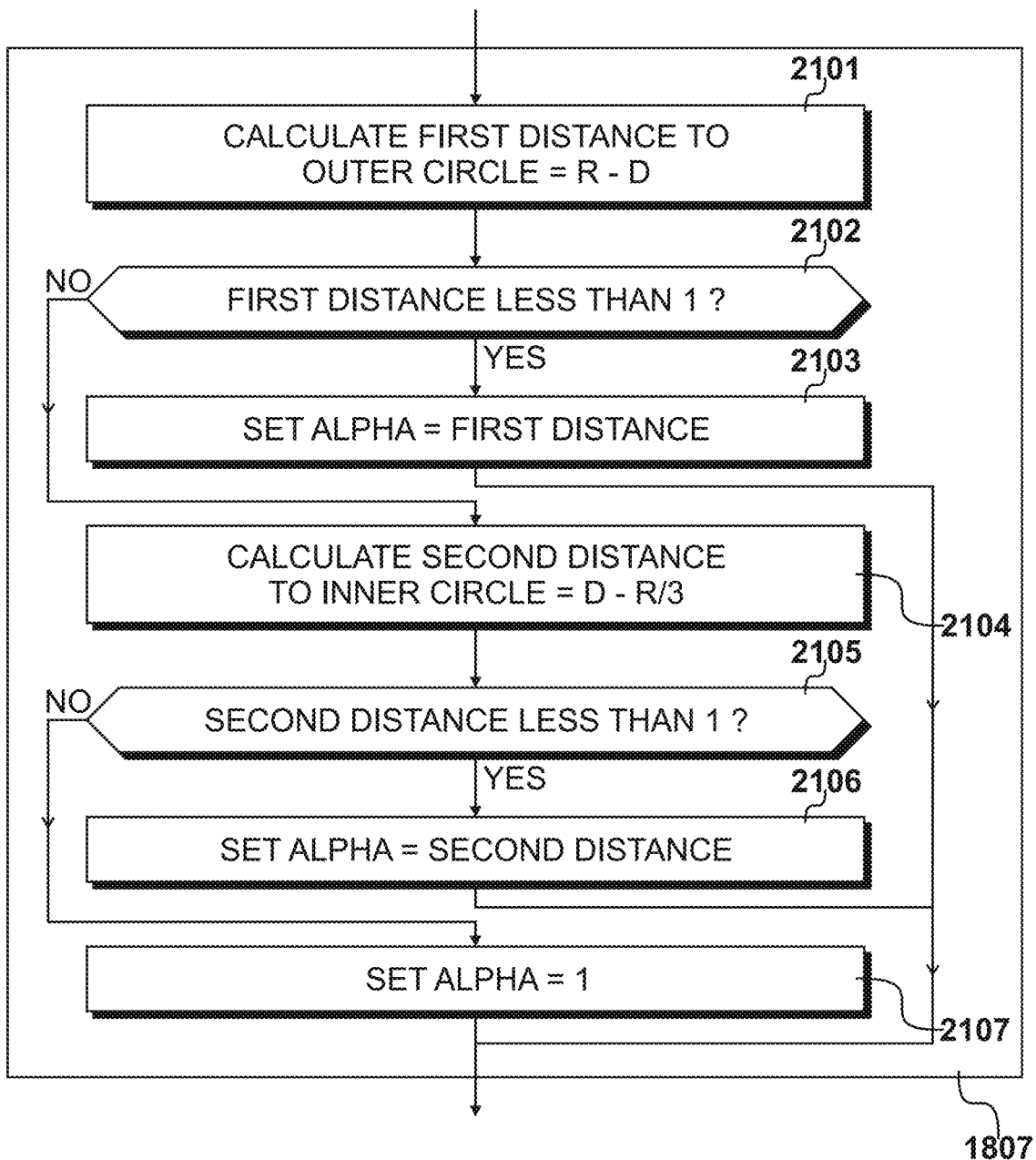
FIG. 21 details steps carried out during FIG. 18 to modify the alpha channel.

FIG. 21 details step 1807, at which the alpha channel of the source pixel is modified if it is close to the outer or the inner edge of the annulus. The value of alpha for all the pixels in the source image is assumed to be one.

At step 2101 a first distance is calculated to be the distance from the outer circle to the point under consideration. In this embodiment, this first distance is calculated as R−D. At step 2102 a question is asked as to whether this first distance is less than one, and if this question is answered in the affirmative then, at step 2103, the value for the alpha channel when the source pixel is copied is set to be this first distance.

If the question asked at step 2103 is answered in the negative, to the effect that the first distance is greater than one then, at step 2104, a second distance is calculated, which is the distance from the point under consideration to the circumference of the inner circle. In this embodiment, this is calculated as D−R/3. At step 2105 a question is asked as to whether this second distance is less than one and if this question is answered in the affirmative then, at step 2106, the value for the alpha channel when the source pixel is copied is set to be this second distance.

However, if the question asked at step 2105 is also answered in the negative then, at step 2107, the alpha is left unaltered at one. In other embodiments, if the alpha channel of all pixels in the source image was not one, then at this step, the alpha value could be either set to one or left unaltered.

These steps have the effect of reducing the alpha, and therefore the opacity, of the pixels at the very edges of the annulus. This reduces the appearance of jagged lines and corners that would otherwise be present. In other embodiments, the formulae for calculating the first and second distances could be different, leading to a wider band of reduced opacity at each edge.

Thus, at the conclusion of the steps detailed in FIG. 18, a circular projection of the original equirectangular image data has been generated and displayed on display 1105. The user can now easily create links between these projections in order to define connections between the spaces photographed in the original images.

FIG. 22

Figure 22:
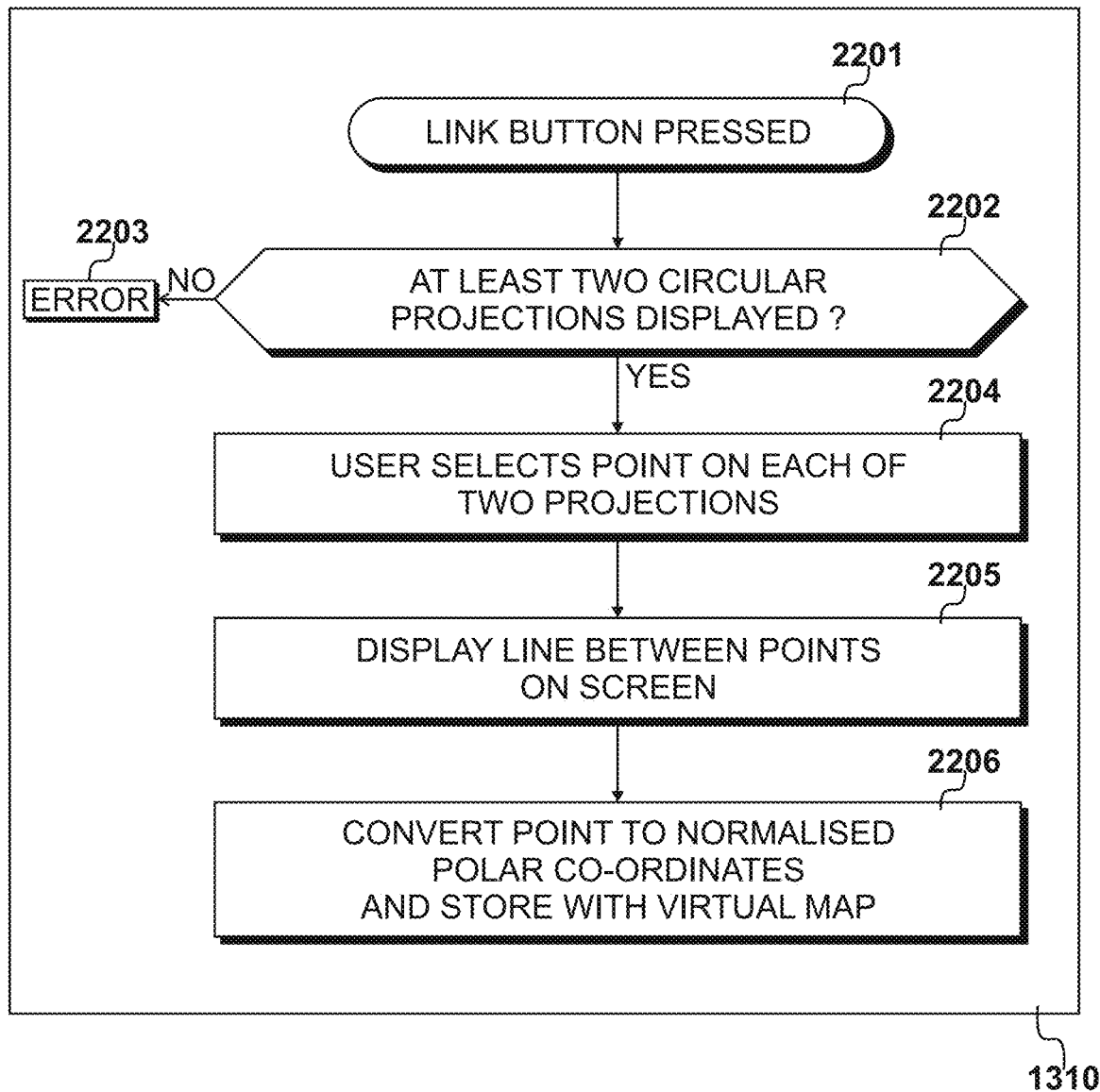
FIG. 22 details steps carried out by the processor shown in FIG. 11 to link images.

FIG. 22 details image link process 1310, initiated by a user selection of link button 1416 at step 2201.

At step 2202 a question is asked as to whether at least two circular projections are displayed, and if this question is answered in the negative then an error message is displayed at step 2203 and the process is terminated. In this embodiment, it is not possible to create a link from a projection to itself.

However, if the question is answered in the affirmative then at step 2204, the user selects a point on each of two projections and, at step 2205, a line is displayed between these two points on the display, indicating to the user that the link has been created. At step 2206 the selected points are converted to normalised polar coordinates and stored in virtual map definition 1305.

The polar coordinates stored are with reference to the circular projection. However, they are easily transformed into pitch and yaw values that can be used with reference to the equirectangular images in image store 1306, as will be described further with reference to FIG. 27.

FIG. 23

Figure 23:
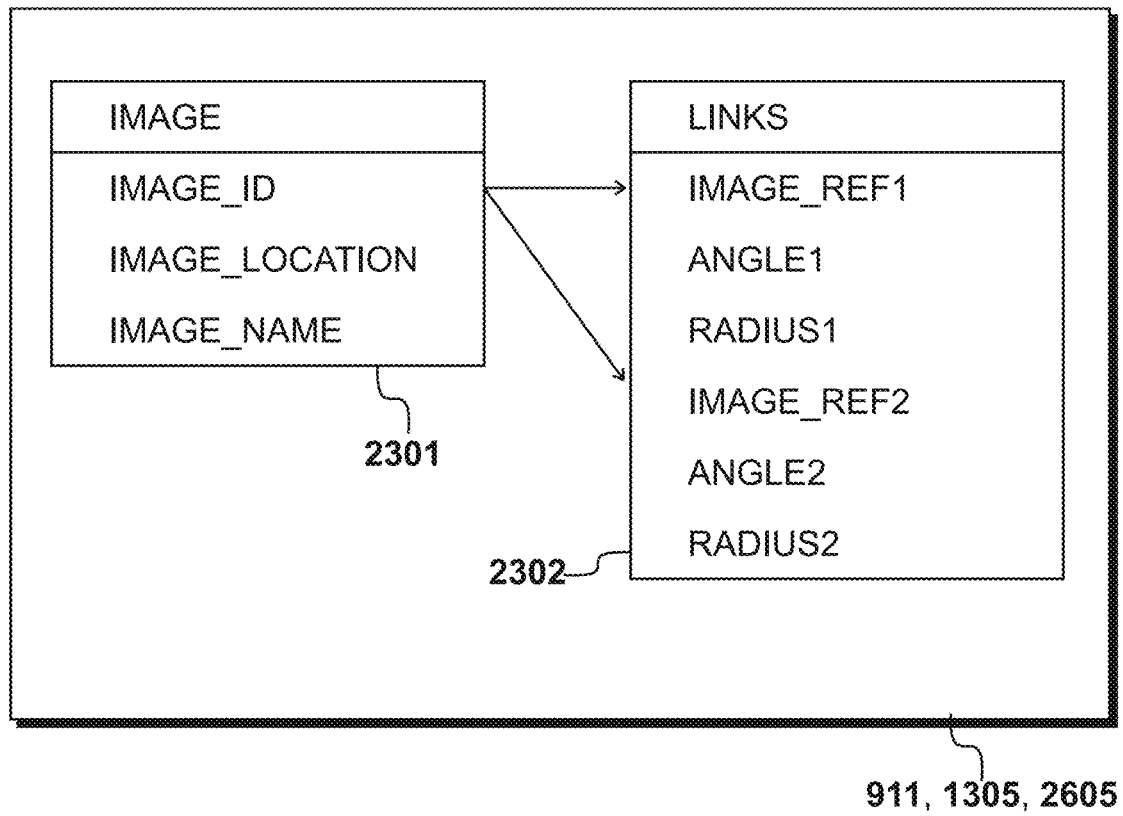
FIG. 23 illustrates a database structure that stores a virtual map definition.

FIG. 23 shows a database structure suitable for storing the virtual map data. This is the virtual map definition stored at 911 on the server 107, at 1305 on the laptop 108, and at 2605 on the tablet 103, and which is described with reference to FIG. 26.

The database contains two tables. The first, images table 2301, contains a list of images contained in the map, their locations within the image store 912, 1306 or 2606, and their alphanumeric names. The second, links table 2302, contains, in each record, references to two images from table 2301. For each image, polar co-ordinates are given as an angle and a radius.

Thus, each line in table 2302 defines a link between a point in each of two different images. Each link is displayed as a connection point in the virtual map viewer.

Within virtual map definitions 911 in the server memory 705, a plurality of database structures such as this are stored, one for each virtual map. However, each requesting device only holds one such structure in memory, for the map currently being edited or viewed.

The structure shown in FIG. 23 is an example of position data, that stores identifications of positions within images, and an indication that at least one pair of such positions is connected. The position data could take other forms in other embodiments.

FIG. 24

Figure 24:
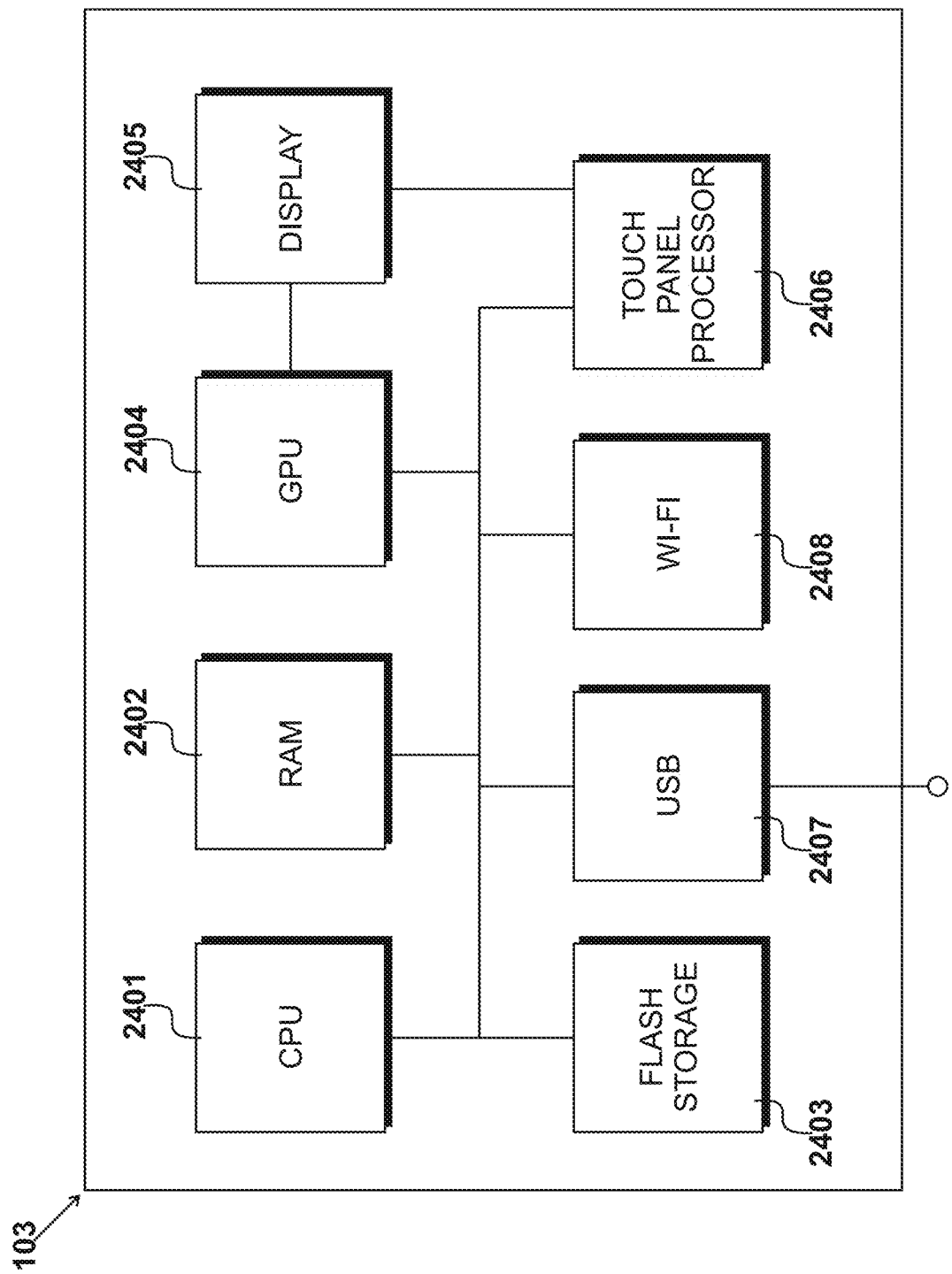
FIG. 24 is a diagram of a tablet computer shown in FIG. 1.

The process of a customer viewing a virtual map will now be described with reference to FIGS. 24 to 27. FIG. 24 is a diagrammatic representation of tablet 103 that is, in this example, used to view a virtual map. However, as previously indicated, any computing device with a processor, memory and a display can be used.

The processor in the tablet 103 is provided by CPU 2401, and processor memory by RAM 2402. A data storage medium is provided by a flash drive 2403. The tablet further includes a graphics processing unit 2404 which outputs to a display 2405. A touch panel processor 2406 receives input from display 2405. Interfaces are provided by USB interface 2407 and Wi-Fi interface 2408.

FIG. 25

Figure 25:
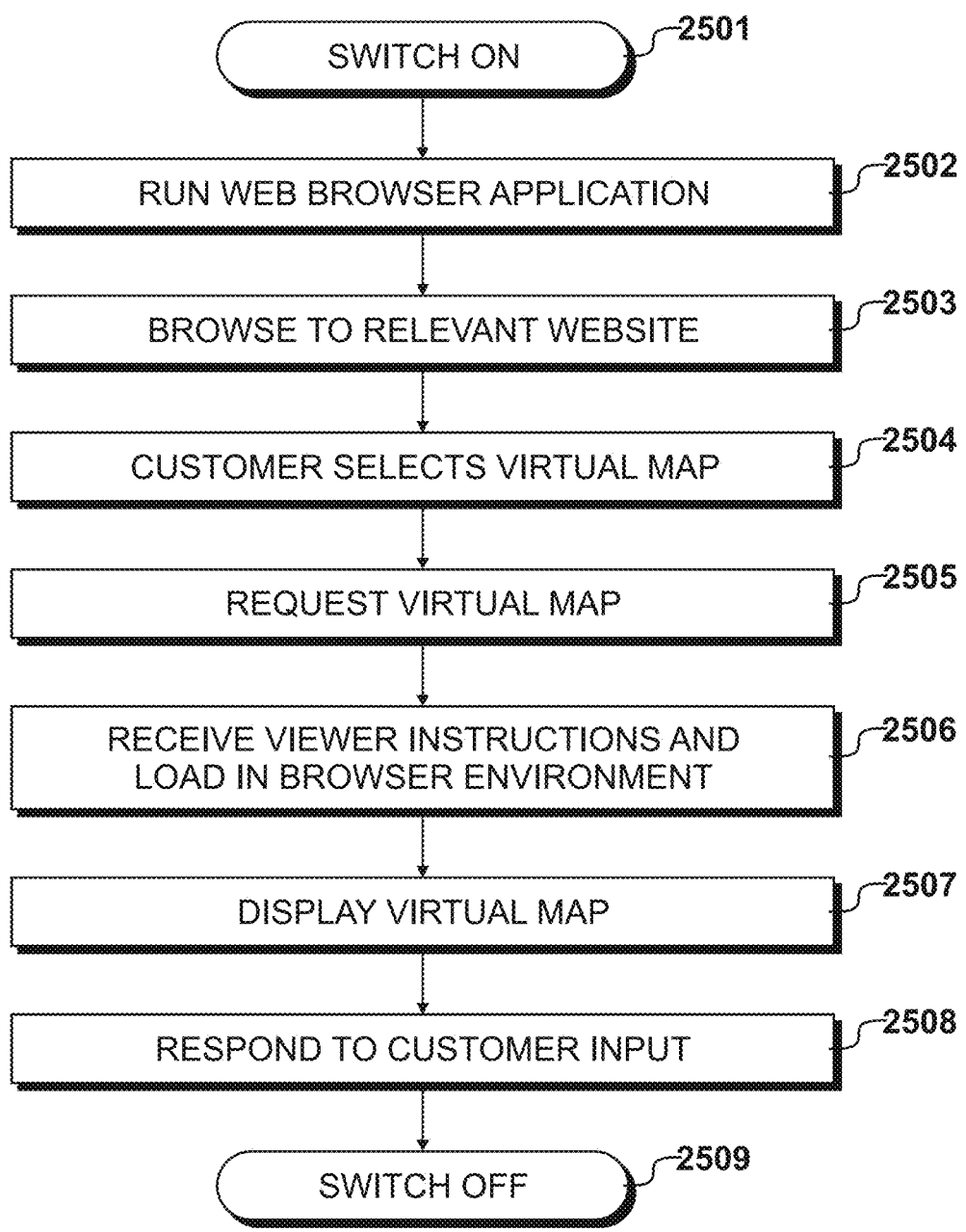
FIG. 25 shows steps carried out by a processor shown in FIG. 24 to view a virtual map.

FIG. 25 details steps carried out by processor 2401 in order to allow a customer to view a virtual map. At step 2501, tablet 103 is switched on and at step 2502 a web browser application is run. Similarly, to the editing application, the viewing application is run within a browser. This enables a customer to view a virtual map without downloading a specific application to their computing device. However, in other embodiments a specific application could be used.

At step 2503, the customer browses to a website that includes an embedded virtual map, and at step 2504 the user selects a virtual map to be viewed. This provides the browser application with a URL from which the virtual map may be loaded. This URL is located on virtual map server 107; however, as previously described, the virtual map could be hosted in any location.

When the processor requests the virtual map from map server 107, the server processes this request at step 1008 and transmits instructions 909 for the client-side viewer application. These are received at processor 2401, stored in memory, and loaded within the browser environment at step 2506.

The server then provides the virtual map at step 1009. At step 2507, the virtual map is displayed within the browser, and at step 2508, the application responds to customer input to navigate the map. When the user has finished, at step 2509, the tablet is switched off.

FIG. 26

Figure 26:
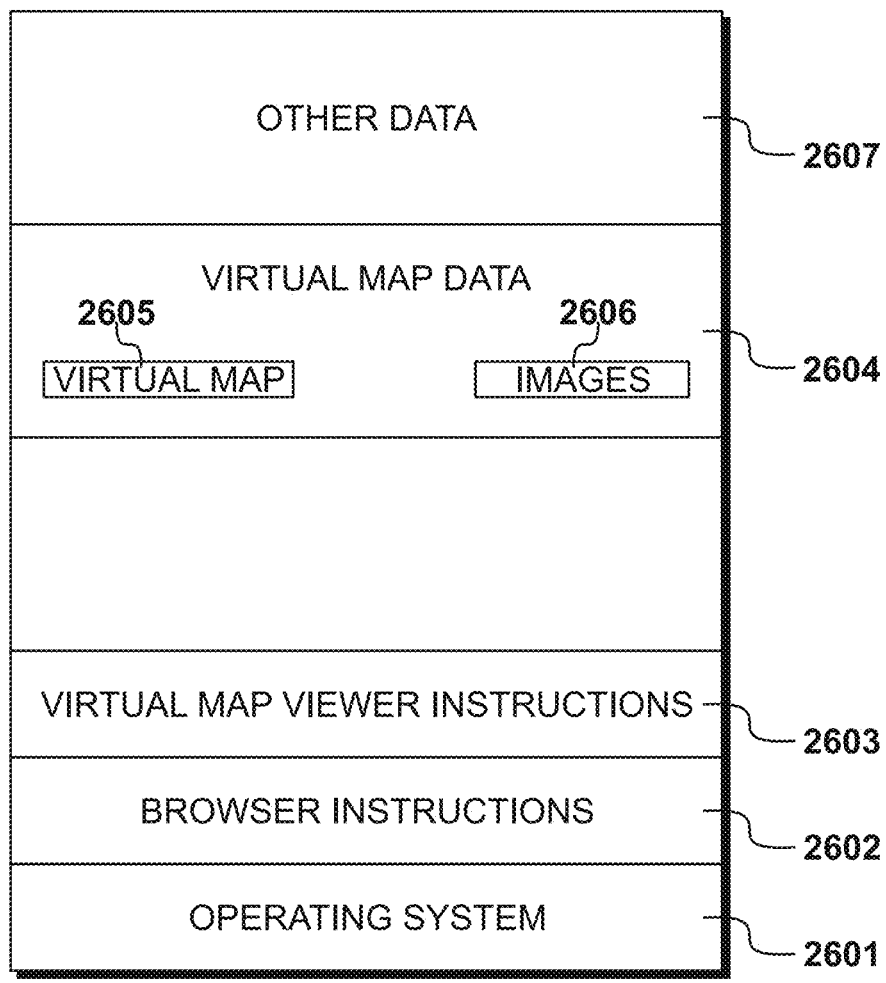
FIG. 26 shows the contents of a memory shown in FIG. 24.

FIG. 26 shows the contents of memory 2402 while processor 2401 is running the virtual map viewing application at steps 2506 and 2507.

At level 2601 is the operating system 2601, along with browser instructions 2602. At 2603 are virtual map viewer instructions. These are the instructions received from virtual map server 107 at step 2506. Virtual map data 2604 includes the virtual map definition 2605 and images 2606 received from server 107. Other data 2607 facilitates the operation of tablet 103.

FIG. 27

Figure 27:
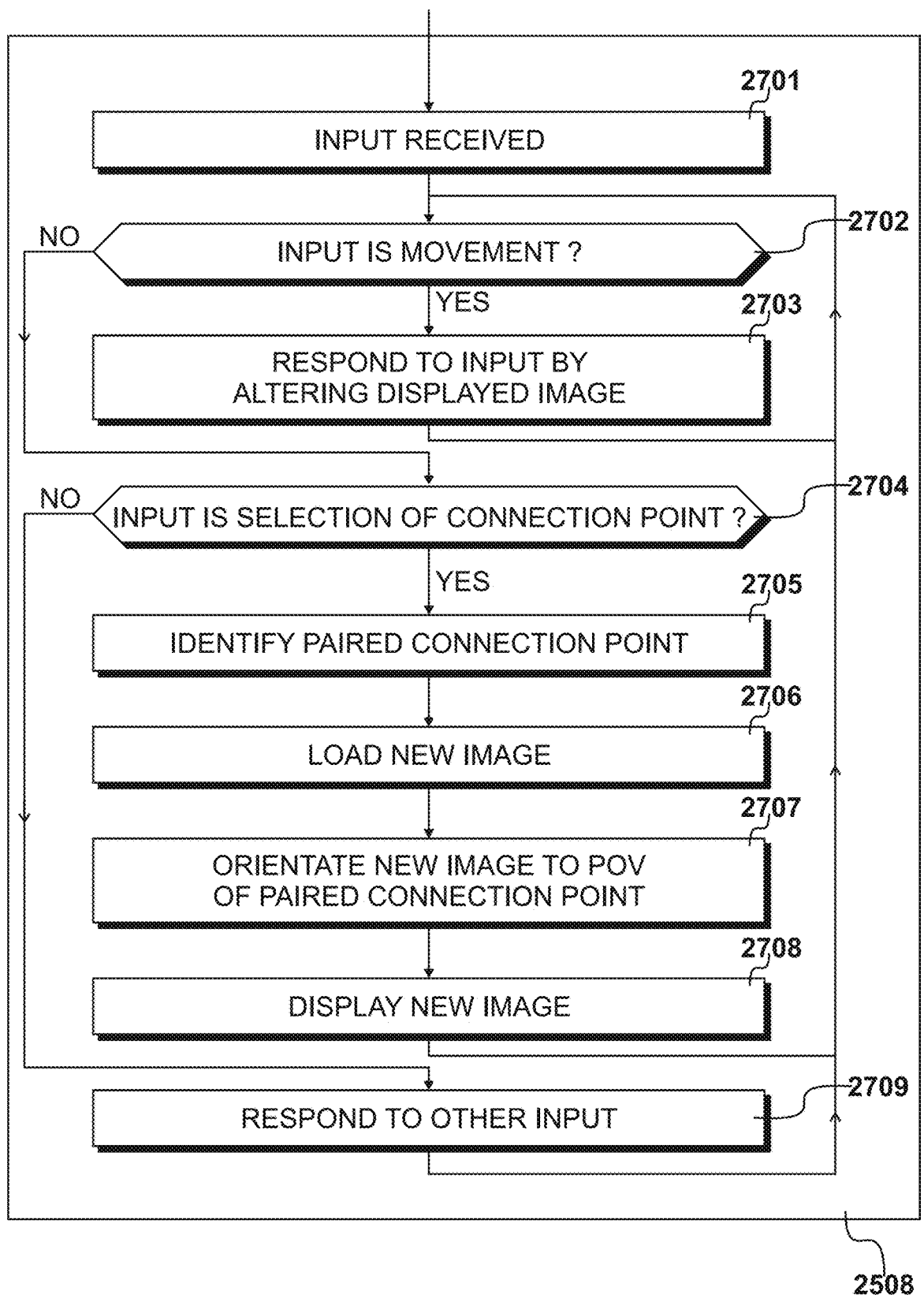
FIG. 27 details steps carried out during FIG. 25 to respond to customer input on a virtual map.

FIG. 27 details step 2508, at which processor 2401 responds to customer input while displaying the virtual map using viewer instructions 2603.

In this embodiment, viewer instructions 2603 are provided in HTML5, allowing them to be run transparently in a web browser application. Other platforms could be the widely available Flash viewer or JavaScript, but any suitable platform may be used.

The viewer loads a selected equirectangular image and displays it within a browser in a panoramic or spherical format that can be easily navigated by the customer. In addition, the viewer interrogates virtual map definition 2605 to determine whether the image contains any connection points that should be displayed. If so, the position of the connection point is obtained along with the name of the image that it leads to, and these are displayed within the image at the correct point.

Points within a panoramic viewer are usually described in spherical coordinates, including pitch and yaw, and the normalised polar co-ordinates stored in map definition 2605 can be converted as follows:

$$\text{pitch} = -90 + (135 * \text{radius})$$

$$\text{yaw} = 360 * \text{angle}$$

Thus, a display projection of the image is rendered, which includes a display element, which in this example is a connection point. This display element corresponds to a position from the position data held in links table 2302.

After displaying the first image at step 2507, customer input is received at step 2701. This may be received via any suitable method of providing input, such as a touchscreen or touch pad, mouse or keyboard input, selection of an on-screen button, tilting a mobile device, etc. In this example, the customer uses the touchscreen of tablet 103 to provide input.

At step 2702 a question is asked as to whether the input is a request for movement of the image, and if this question is answered in the affirmative then at step 2703 the request is responded to by altering the view of the displayed image at step 2703.

However, if this question is answered in the negative, then at step 2704, a further question is asked as to whether the input is a selection of a connection point, which in this embodiment is displayed as a labelled target, for example as shown in FIG. 3.

If this question is answered in the affirmative then at step 2705 virtual map definition 2605 is interrogated to identify the corresponding connection point that is linked with the selected connection point. Referring back to FIG. 23, this identifies a further image file and polar coordinates within that file. Thus at 2706 the identified image is loaded, and at step 2707 the image is orientated such that it is from the point of view of the corresponding connection point. This means that the point in the displayed panoramic image that is 180° from the connection point is substantially in the middle of the field of view, as displayed in the viewer. Thus, the connection point is "behind" the viewer in the displayed panoramic image, and the customer would need to turn the image by exactly 180° to bring the connection point to the centre of the field of view.

At step 2708, the orientated image is displayed. Thus, the customer has the virtual experience of walking through the connection point with no change of orientation.

Thus, a display projection of the next image is rendered, which also includes a display element. This display element corresponds to a position from the position data held in links table 2302.

If the question asked at step 2704 is answered in the negative then, at step 2709, other input is responded to. This could be, for example, a request to change or zoom the view, to enter a virtual reality mode where a split screen is displayed suitable for a virtual reality viewer, to display a floorplan, to enter or exit full screen mode, and so on.

FIG. 28

The foregoing description describes how images in a spherical format may be connected together in order to create a virtual map of a building. FIGS. 28 to 48 describe methods of enhancing such images in spherical format in order to provide a better user experience, and/or to extract further data from the images. These are collectively considered to be enhancements to the images. In order to carry out these enhancements, it is not necessary, except in certain situations that will be detailed, for the user to have created a virtual map as previously described. However, the enhancements are described within the context of the production of a virtual map.

Enhancements to the images in spherical format are carried out, in this embodiment, after the user has created a virtual map at step 406. However, they could be carried out at any time after a user has uploaded an image at step 402.

The enhancements are carried out by viewer instructions 1311 on the memory 1102 of laptop 108. These instructions comprise instructions identical to instructions 2603, but include further processes. These include camera pose compensation process 2801, floor plan creation process 2802, and cursor movement process 2803. These will now be described with reference to the remaining Figures.

In other embodiments, some or all of the enhancement processes could be run on virtual map server 107, particularly if they are to be applied automatically without user input.

FIG. 29

Figure 29:
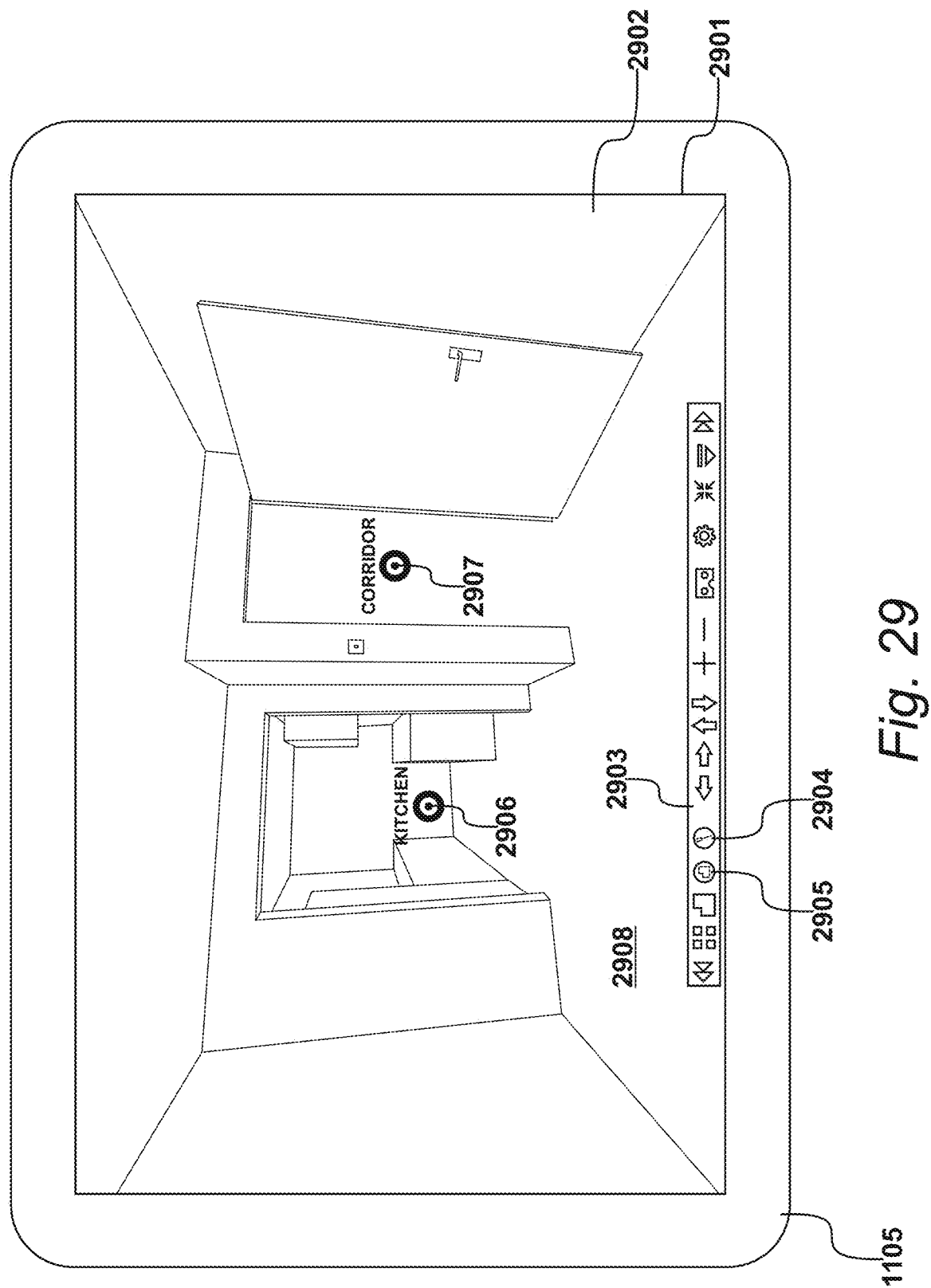
FIG. 29 shows a user interface displayed on the display shown in FIG. 11.

FIG. 29 shows a user interface 2901 displayed on display 1105 of laptop 108. Interface 2901 includes a viewing/editing area 2902, in which can be seen an image 2908 displayed in a spherical format, and a tool bar 2903.

Tool bar 2903 is similar to tool bar 302, displayed to a user viewing a virtual map. However, viewer instructions 1311, being part of the virtual map editor instructions 1303, contain additional functionality to enhance image 2908. In this embodiment, the functionality is provided by camera pose compensation button 2904 and floor plan creation button 2905, which initiate processes 2801 and 2802 respectively. Cursor movement process 2803 is initiated during floor plan creation process 2802, and causes the display of a cursor that replaces the usual cursor of the spherical viewer, as will be described further with reference to FIG. 39.

In the example shown in FIG. 29, the user has created connection points 2906 and 2907 to other rooms in the virtual map. However, both processes 2801 and 2802 may be used to enhance a single image, and therefore to use them it is not necessary that images of additional rooms have been uploaded nor that connection points have been established.

As previously described, image 2908 shown in area 2902 is in a spherical format, with the image being wrapped around the inside of a notional sphere. Therefore, as the user moves a cursor around the interface, spherical coordinates representing pitch and yaw are provided to viewer instructions 1311. These are used to allow the user to move the view point around, providing a 360° view of the room, and to allow the user to zoom in and out while maintaining the spherical format. However, the image contains no data or coordinates relating to whether particular areas of the image relate to a floor, a wall, a ceiling, etc. Each pixel is merely a point on a sphere and no further information is available. Further, each pixel is considered to be the same distance away from the centre of the notional sphere, and therefore no information is available relating to distances within the physical space shown in image 2908.

The invention as described herein provides a method of converting the spherical coordinates of a cursor point to two-dimensional Cartesian coordinates on a specific plane within the sphere. Thus, for example, if the floor is a plane of the sphere, then spherical coordinates can be converted to two-dimensional Cartesian coordinates on the floor, thus providing a floor plan of the room. This will be described further with reference to FIGS. 38 to 48.

In addition, if the camera was not perfectly vertical when image 2908 was taken, the spherical format will not be perfectly aligned with the physical space that was imaged. By transforming spherical coordinates of particular positions within the image to three-dimensional Cartesian coordinates, it is possible to estimate the orientation of the room with respect to a perfect vertical, and therefore either adjust the image so that it appears aligned on the screen, or compensate for this orientation when performing other enhancements. This will be described further with reference to FIGS. 33 to 37.

FIG. 30

Figure 30:
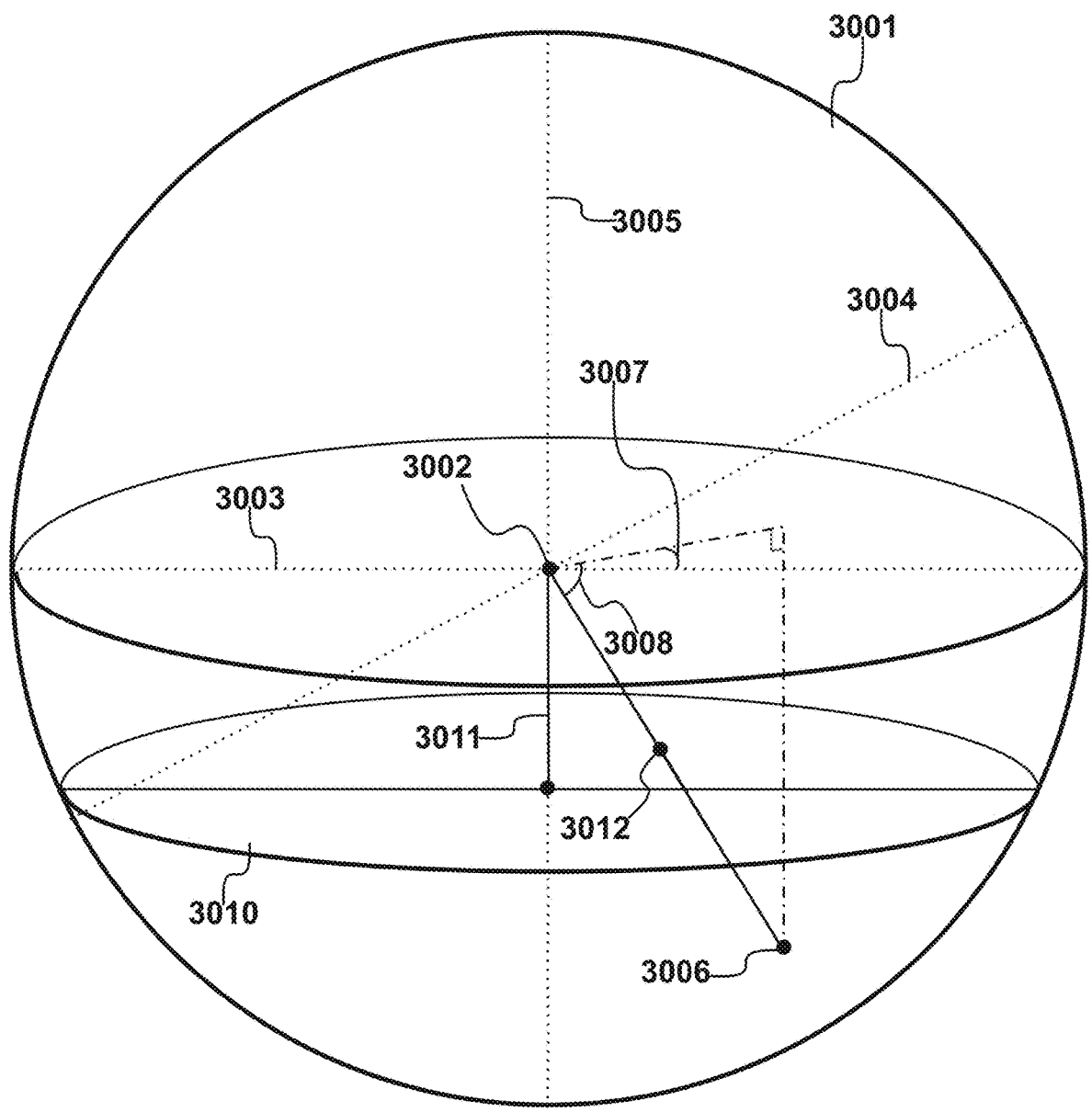
FIG. 30 illustrates a three-dimensional model, established using spherical coordinates.

The method of transforming spherical coordinates into two-dimensional Cartesian coordinates on a plane is illustrated in FIG. 30. Viewer instructions 1311 create the spherical format of an equirectangular image or other image by wrapping it around the inside of a notional sphere 3001, centred on the position 3002 of the camera when the photograph was obtained. Every point in the spherical format is defined by spherical coordinates of pitch and yaw. The sphere can be considered to have an internal three-dimensional Cartesian coordinate system, including an x-axis 3003, a y-axis 3004 and a z-axis 3005. The spherical coordinates of pitch and yaw are measured relative to the plane of sphere 3001 where z is equal to zero, i.e. the plane containing the x- and y-axes. Yaw is measured parallel to this plane from the x-axis, and pitch is measured from this plane.

Thus, a value of 0° for yaw represents the viewer looking straight ahead down the x-axis. −90° indicates looking left, 90° indicates looking right, and either 180° or −180° (depending on the configuration of the viewer instructions) indicates looking backwards. For pitch, a value of 0° indicates looking level with the camera, −90° indicates looking straight down to the bottom of the sphere, and 90° indicates looking straight up to the top of the sphere. Values of pitch outside the range of −90° to 90° are not used, as in a typical 360° viewer it is not generally necessary to turn the image upside down.

Therefore, point 3006 on the surface of sphere 3001 has a yaw angle 3007 and pitch angle 3008. In the example shown in FIG. 31, both the yaw and the pitch are negative, indicating that the viewer is looking to the left and down. This pitch and yaw value uniquely identify the point 3006, and therefore a point within image 2908. However, they provide no information as to whether the point in the image represents a position on the floor, the ceiling, or a wall. The viewer simply rotates a sphere around a central point with no information regarding the actual physical space represented by that image.

It is possible to discover the distance from the floor to the camera, at the time at which the image was obtained by the camera. It is also reasonable to assume that the floor is horizontal. Therefore, a horizontal plane 3010 can be constructed within sphere 3001, that is at a distance 3011 from the centre 3002 of the sphere. Distance 3011 represents the height of the camera from the floor. In this situation, horizontal means parallel to both the x-axis and the y-axis. By discovering the point 3012 at which the line from the centre 3002 of the sphere to point 3006 intercepts plane 3010, a position in two-dimensional Cartesian coordinates on plane 3010 can be obtained for point 3012.

These two-dimensional Cartesian coordinates represent an actual location on the floor in the physical space imaged, for a point in image 2908 having the specified spherical coordinates. For example, returning to FIG. 29, if the cursor is placed on an area of image 2908 that represents the floor, the Cartesian coordinates of that location on the floor will be calculated. If a position on the wall is selected, then the Cartesian coordinates will identify the location on the floor that would exist if the floor were extended beyond the wall. Therefore, by identifying discontinuities in the image that indicate the intersection of a wall and the floor, it is possible to calculate Cartesian coordinates for these discontinuities, and thereby produce a floorplan of the room. These discontinuities may be identified either by a user selecting corners or edges, or by an automatic process that traces edges.

In addition, identifying Cartesian coordinates of locations can be used to provide an orientation of image 2908. Walls, floors and ceilings in rooms are generally at right angles to each other, and therefore if a plurality of intersections between walls are identified and their Cartesian coordinates calculated, it is possible to identify an orientation that sets the expected right angles to be as near to 90° as possible.

In addition to a plane corresponding to the floor, a plane corresponding to the ceiling can be constructed if the height from the floor to the ceiling is known. In this case, the two-dimensional Cartesian coordinates would be with respect to the ceiling plane. This can be used instead of identifying locations on the floor, or in addition. If both planes are used, then three-dimensional Cartesian coordinates can be identified, and used to give greater accuracy to either method described above.

In addition, other methods of enhancing an image in spherical format may use this transformation from spherical coordinates to Cartesian coordinates.

FIG. 31

Figure 31:
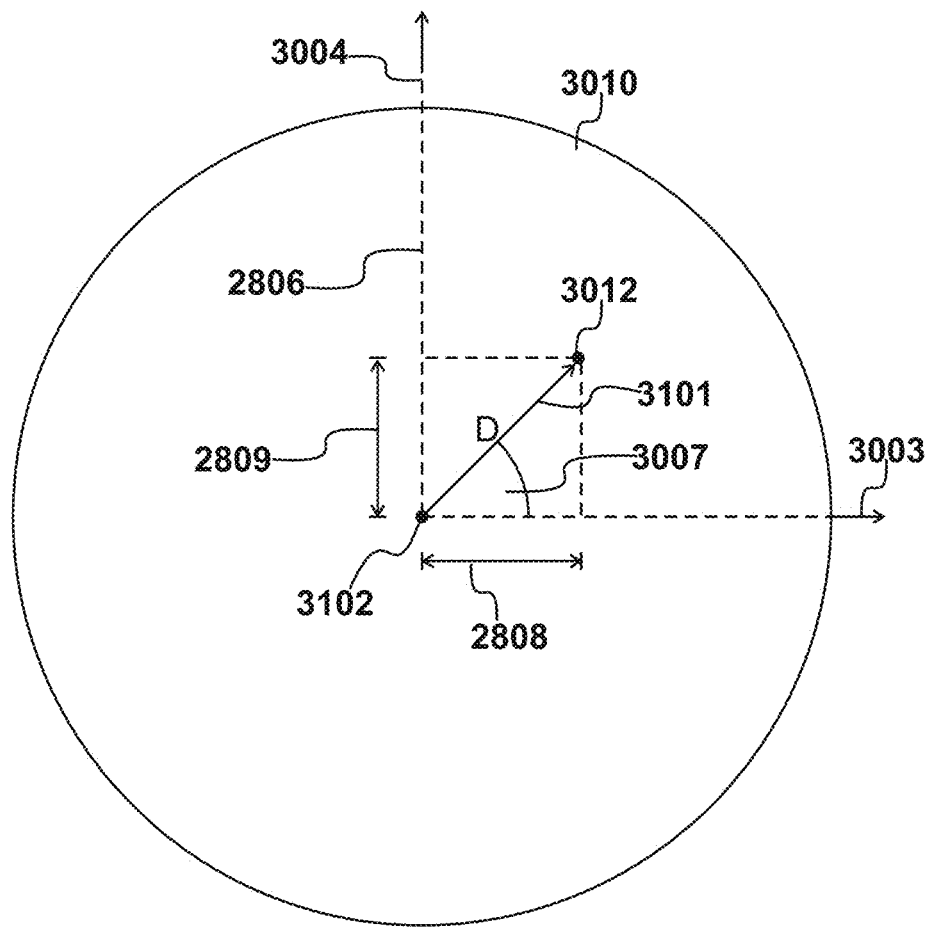
FIG. 31 shows the derivation of equations used in the method herein described.

The equations used to calculate a point location in two-dimensional Cartesian coordinates are shown in FIG. 31, along with a diagram indicating their derivation. Plane 3010 is shown as if looking at it from the top of sphere 3001, i.e. backwards down the z-axis 3005. The x-axis 3003 and the y-axis 3004 are therefore shown at right angles to each other. The two-dimensional Cartesian coordinates of point 3012 with respect to the x-axis and the y-axis can be calculated if the distance 3101 from the centre 3102 of the plane to point 3012 is known, using yaw angle 3007. The equations to calculate this are shown at 3110 and 3111 as follows: the value on the x-axis is distance 3101 multiplied by the cosine of the yaw angle 3007; the value on the y-axis is distance 3101 multiplied by the sign of the opposite of yaw angle 3007, which is to say the yaw angle multiplied by minus 1.

$$x = D*\cos(\text{YAW})$$

$$y = D*\sin(-\text{YAW})$$

Distance 3101 can be found using the pitch angle 3008 and the height 3011 of the camera from the floor, which is considered to be the distance from centre 3002 of sphere 3001 to the centre of plane 3010. Returning to FIG. 30, it can be seen that a right-angled triangle is made between the centre 3002 of the sphere, point 3012, and a corresponding point on the plane defined by the x-axis and the y-axis, with one of the angles of this triangle being pitch angle 3008.

The equation to calculate distance 3101 is shown at equation 3112, as follows: the height 3011 divided by the tangent of the absolute value of pitch angle 3008. Alternatively, it can be written as height 3011 multiplied by the tangent of the other angle in the triangle, i.e. pitch angle 3008 subtracted from 90 degrees.

$$D = H/\tan(\text{abs}(\text{PITCH}))$$

$$D = H*\tan(\text{abs}(90° - \text{PITCH}))$$

The second calculation may be preferred in a programming environment as it does not risk a division by 0.

Therefore, after the above calculations have taken place, a value on the x-axis and a value on the y-axis have been obtained, providing two-dimensional Cartesian coordinates corresponding to the location on the floor of the point in the image having spherical coordinates identified by point 3006.

Other planes can be used besides the floor. For example the ceiling may be used, as previously described, if the height of the ceiling from the floor is known. In this case, the height used in equation 3112 would be the height of the camera subtracted from the height of the ceiling. The fact that the ceiling is to be considered is identified by a positive value for the pitch.

Thus, there is provided a method of identifying a location on a surface represented in a spherical image, where the surface was at a known distance from the camera and had a known orientation when the image was obtained. Any point in the spherical format is defined by spherical coordinates consisting of a yaw angle and a pitch angle defining a line from the centre of the sphere. A plane may be identified having the orientation of the surface that is at the known distance from the camera, i.e. the centre of the sphere, and a location in a Cartesian coordinate system can be calculated on the plane at the point where it intersects with the line, thereby identifying the location of the point on the surface.

If the camera is outside, then the ground would be the surface under consideration. However, it is not necessary that the surface be horizontal. This method could be used to identify points on any surface having a known orientation and being at a known distance from the camera when the image was obtained. The Cartesian coordinates obtained would be with respect to the orientation of that plane, which could then be transformed if required into the Cartesian coordinates system of the sphere. For example, a horizontal plane could be used to represent a wall, if the distance from the wall to the camera were known. The coordinates thus obtained from identifying corners of the wall could be used to identify the height of the room. The plane not need even be horizontal or vertical but could be at any rotation to the coordinate system of the sphere. For example, if the ground were at a known slope.

Two uses of this method will now be described. First, a method of orientating an image in a spherical format is described with reference to FIGS. 32 to 37. Next, a method of obtaining a floor plan, either of a single room or of an entire building, is described with reference to FIGS. 38 to 48. Other uses for this method are envisaged.

FIG. 32

The image 2908 in spherical format shown in FIG. 29 is a projection of an image that was taken by a camera. The camera may not have been on a completely vertical tripod. In fact, it is very likely that such was the case, as floors are rarely perfectly flat and tripods are rarely perfectly vertical. The degree to which the camera deviates from vertical is known as the camera pose, and it consists of a pose-pitch angle and a pose-roll angle. If the camera is looking straight forward, then the pose-roll indicates the degree to which it is leaning to the left or right, and the pose-pitch indicates the degree to which it is leaning forwards or backwards.

Many spherical cameras have internal gyroscopes which provide the pose-roll and pose-pitch angles, and if an image was taken with one of these cameras, then these angles are stored with the image metadata. However, many cameras do not include a gyroscope. The method described herein therefore provides an estimation of these of the camera pose.

Figure 32:
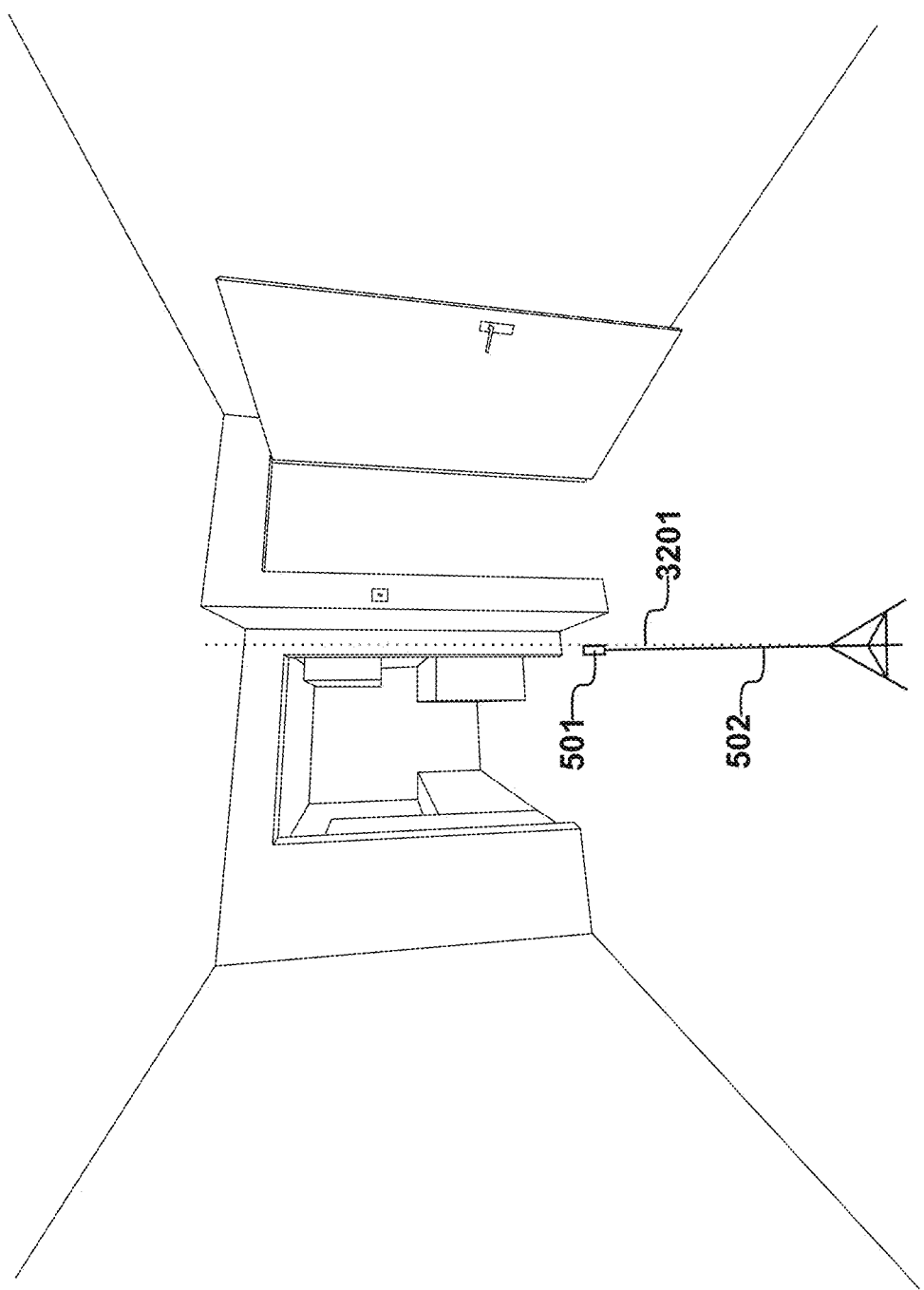
FIG. 32 illustrates a camera obtaining an image.
Figure 33:
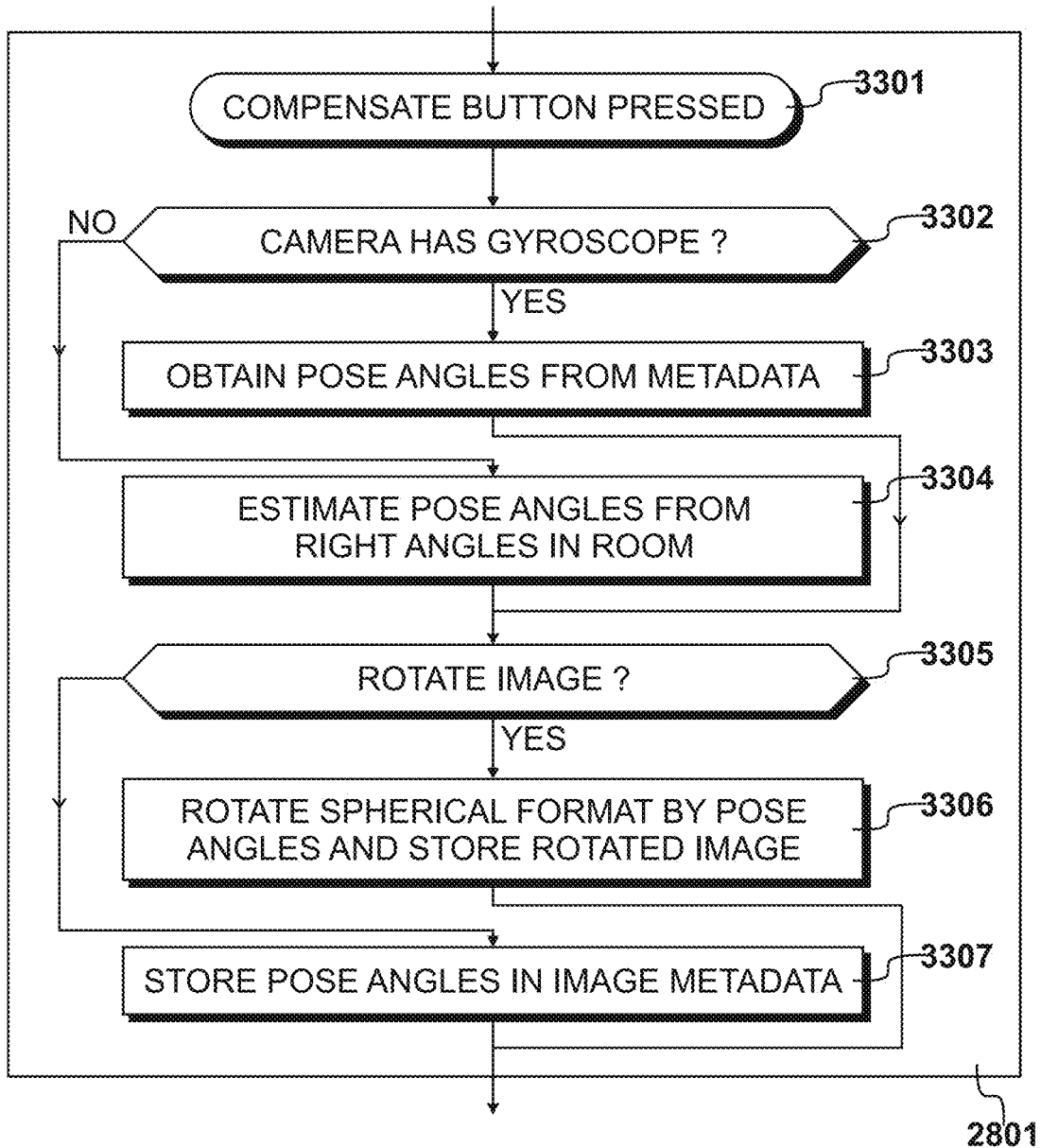
FIG. 33 details a camera pose compensation process shown in FIG. 28.

FIG. 32 is an illustration of camera 501 mounted on tripod 502, in the process of obtaining image 2908. A dotted line 3201 indicates an exactly vertical position, and it can be seen that camera 501 is deviating from that. For the purposes of viewing the image produced, it is unlikely that a user would notice the small deviation. However, in order to provide an improved experience, the creator of the virtual map may wish to ensure that all of the images are orientated to provide an exact replica of the physical space imaged.

In addition, if it is intended to use the method described with respect to FIG. 31 to create a floor plan or identify locations on surfaces for some other reason, then any slight deviation in the orientation of the image can cause errors, particularly if two planes are to be considered such as the floor and the ceiling. Therefore, if the camera pose can be compensated for, this will produce more accurate results.

FIG. 33

Camera pose compensation process 2801 is initiated by a user pressing button 2904 on tool bar 2903 at step 3301, which is now marked as selected. At step 3302 a question is asked as to whether the camera that took the image had a gyroscope. This will be answered in the positive if the metadata for the image comprises camera pose angles, and if so these are retrieved at step 3303.

However, if there are not camera pose angles in the metadata, then at step 3304 the angles are estimated by identifying right angles in the image.

In either case, the question is then asked as to whether the image should be rotated at step 3305. This is a matter of user preference. If the question is answered in the affirmative, then at step 3306 the image 2908 is adjusted by transforming all its pixels by the pitch-pose and pitch-roll angles indicated.

Alternatively, if the question asked at step 3305 is answered in the negative, then the pitch-pose and pitch-roll values are stored in the image metadata and used to modify calculations whenever required, as will be described with reference to FIGS. 37 and 44.

Camera pose compensation process 2801 could comprise part of the upload process 1309, taking place whenever a user uploads an image rather than after a virtual map has been created. The process is also independent of the use

FIG. 34

In order to estimate the pose-pitch and the pose-roll angles of camera 501 when it obtained image 2908, the method described herein exploits the fact that most angles in a room are right angles. Generally, a wall is at right angles to both the floor and the ceiling, and usually most walls are at right angles to each other. For a user viewing the spherical image of the room, it is reasonably simple to identify right angles. However, they do not appear as right angles in image 2908, either in its original panoramic format or in the spherical format of the viewer. Therefore, an automated computer system would not be able to identify right angles using any known process.

Figure 34:
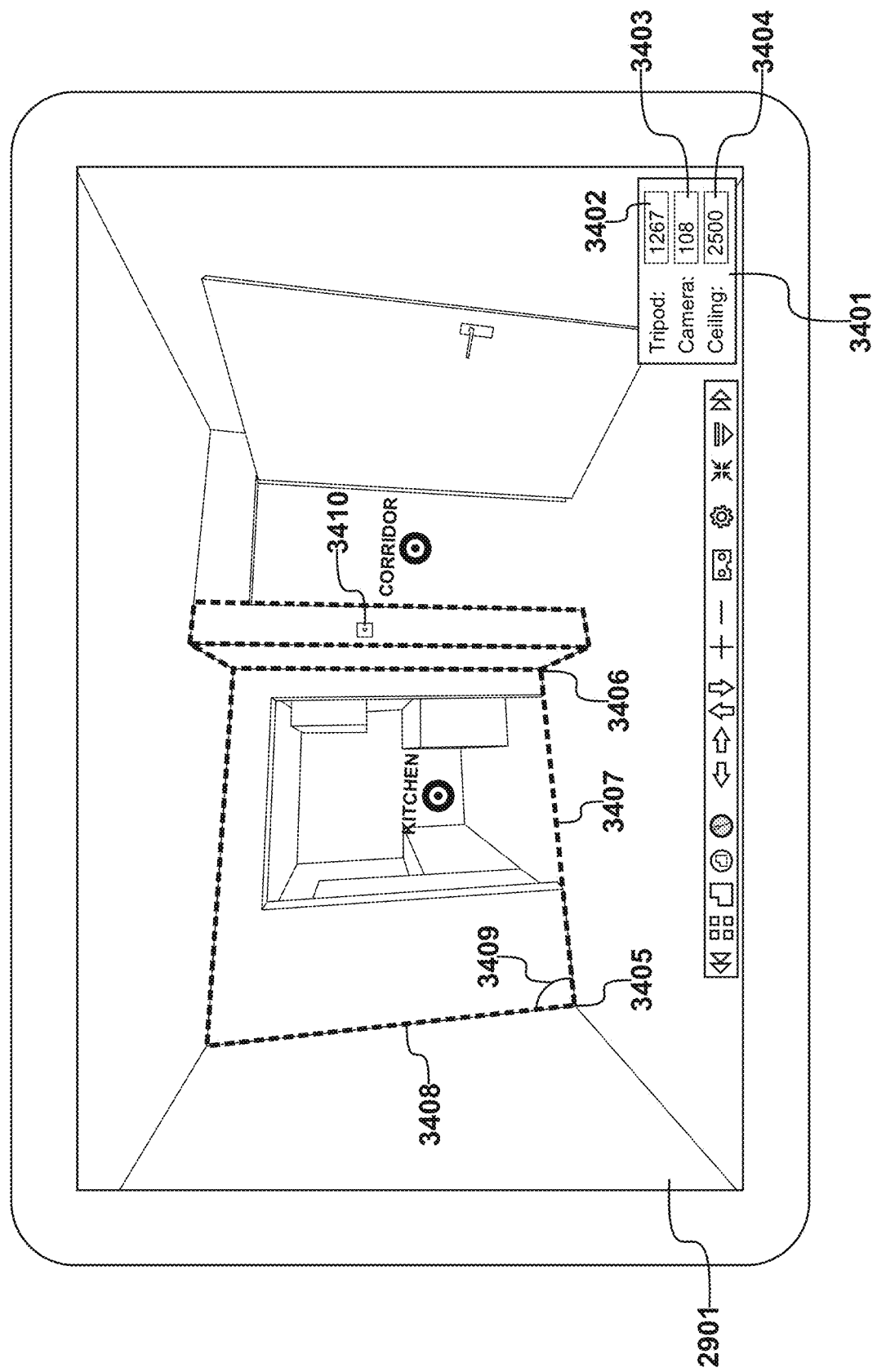
FIG. 34 shows a user interface during the steps carried out in FIG. 33.

To estimate the camera pose, the user draws edges in the image that form right angles with one another. An example of this is shown in FIG. 34, where the user has drawn rectangles, one of each of three walls, where it would be expected that the intersection of each pair of lines would be a right angle. For example, the user draws line 3407 indicating the intersection between the floor and a wall, and a line 3408 indicating the intersection between the wall and another wall. The user expects that the angle 3409 between these lines would be a right angle. 3407 is drawn between end points 3405 and 3406, Each of these lines is defined by two end points, each having spherical coordinates. For example, line 3407 is defined by endpoints 3405 and 3406. These spherical coordinates only identify points on the sphere, and therefore cannot be used to estimate the camera pose. However, by transforming each set of spherical coordinates into a set of Cartesian coordinates, the angles between each pair of intersecting lines can be estimated.

In order for the spherical coordinates to be transformed into two-dimensional Cartesian coordinates, it is necessary to know the distance from the floor to the camera. In addition, to transform them into three-dimensional Cartesian coordinates, it is also necessary to know the distance from the floor to the ceiling. Therefore, input boxes 3401 are provided within interface 2901 to allow the user to specify these measurements. In this example, the user is asked for the height 3402 of the tripod, the device height 3403, ie the distance 3403 from the tripod to the camera lens, and the height 3404 of the ceiling. Alternatively, a database of known devices could be stored and the user could select the device used. The tripod and camera heights could then be retrieved from the database.

If the height of the ceiling is not known, then it is still possible to carry out the method of estimating the camera pose. However, the user would be restricted to selecting points on the floor only. This might make the estimation less accurate as fewer points would be provided. In addition, the corners on the floor may be obscured by skirting boards, furniture etc.

If the height of the camera is not known, then it may be possible to estimate it from items in the room that are expected to be at a known height on the wall, for example light switch 3410. This will be described further with reference to FIG. 36.

FIG. 35

Figure 35:
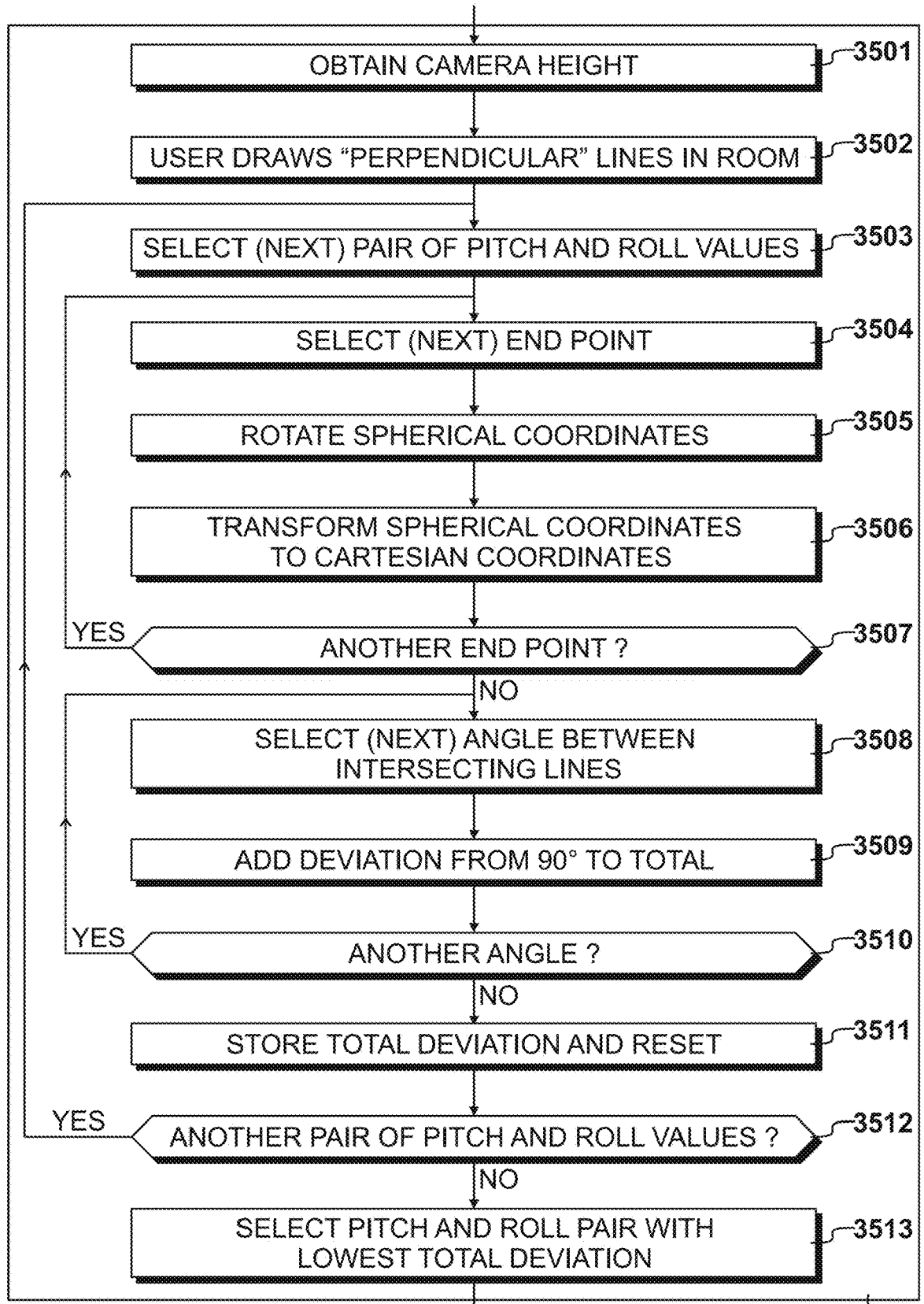
FIG. 35 details steps carried out during FIG. 33 to estimate camera pose angles.

FIG. 35 details step 3304, at which the camera pose angles are estimated. At step 3501, the height of the camera is obtained, by summing the heights of the tripod and the device given at 3402 and 3403, or by any other relevant calculation. At step 3502 the user draws 'perpendicular' lines in the room. This is by drawing lines along edges that the user is aware are at right angles to each other; however, the lines will not appear to be perpendicular in the spherical format, as can be seen in FIG. 34.

The process then iterates through a pre-determined set of pose-pitch and pose-roll values. In this example, these values are between −15° and 15°, and are iterated by 1° each time. However, in order to achieve greater accuracy a small iteration size could be used. In addition, a greater range could be used. However, 15° in any direction is considered to be the maximum deviation in an image that a user would tolerate. Outside this range, it is likely that the image would be obviously skewed and the photographer would retake it.

Therefore at step 3303, the first pair of pitch and roll values is selected. An example of the implementation of this step would be to select a roll value, then iterate through all possible values for pitch, and repeat for all the roll values, or vice versa. However, for ease of explanation in this Figure, this is not detailed.

At step 3504 a first endpoint of a line drawn by a user is selected, for example endpoint 3405, and at step 3505 the spherical coordinates of this endpoint are rotated by the current pair of pitch and roll values.

At step 3506 the rotated spherical coordinates are transformed to Cartesian coordinates, using the method described with reference to FIG. 31. This will be detailed further with reference to FIG. 36. At step 3507 a question is asked as to whether there is another endpoint in the set of points selected by the user, and if this question is answered in the affirmative control is returned to step 3504.

If all the endpoints have been transformed, then at step 3508 the first angle between intersecting lines is selected for consideration, for example angle 3409 between lines 3407 and 3408. Using the Cartesian coordinates identified for the endpoints at each iteration of step 3506, an angle in Cartesian space can be calculated between the lines. At step 3509 the absolute deviation from 90° of that angle is added to a running total, and at step 3510 a question is asked as to whether there is another angle in the set of lines. If this question is answered in the affirmative then control is returned to step 3508 and the next angle is selected.

If the question is answered in the negative, to the effect that all the angles have been considered, then the total deviation is stored for this pair of pitch and roll values, and the total is reset to zero ready for the next pair at step 3511.

Therefore, at step 3512 a question is asked as to whether there is another pair of pitch and roll values to be considered, and if this question is answered in the affirmative then control is returned to step 3503 and the next pair is considered. If the question is answered in the negative, all possible pairs of pitch and roll values have been considered and a total deviation has been stored for each one. Therefore, at 3513 the pitch and roll pair with the lowest total deviation is selected as the best estimate of the camera pose angles.

This method assumes that the angles in the room are right angles. However, if a user was aware that a room was an unusual shape and contained a number of alternative angles, then it would be possible to specify this angle and select only the relevant angles in the room. As a further alternative, the user could specify an angle for every pair of intersecting lines selected.

In an alternative embodiment, rather than the user selecting the right angles, the process could automatically select intersections between walls, floor and ceiling by identifying discontinuities of colour or texture and thereby tracing the edges. In this case, the method could be carried out automatically at server 107 whenever a user uploaded an image, thus providing an automatic reorientation of images.

FIG. 36

Figure 36:
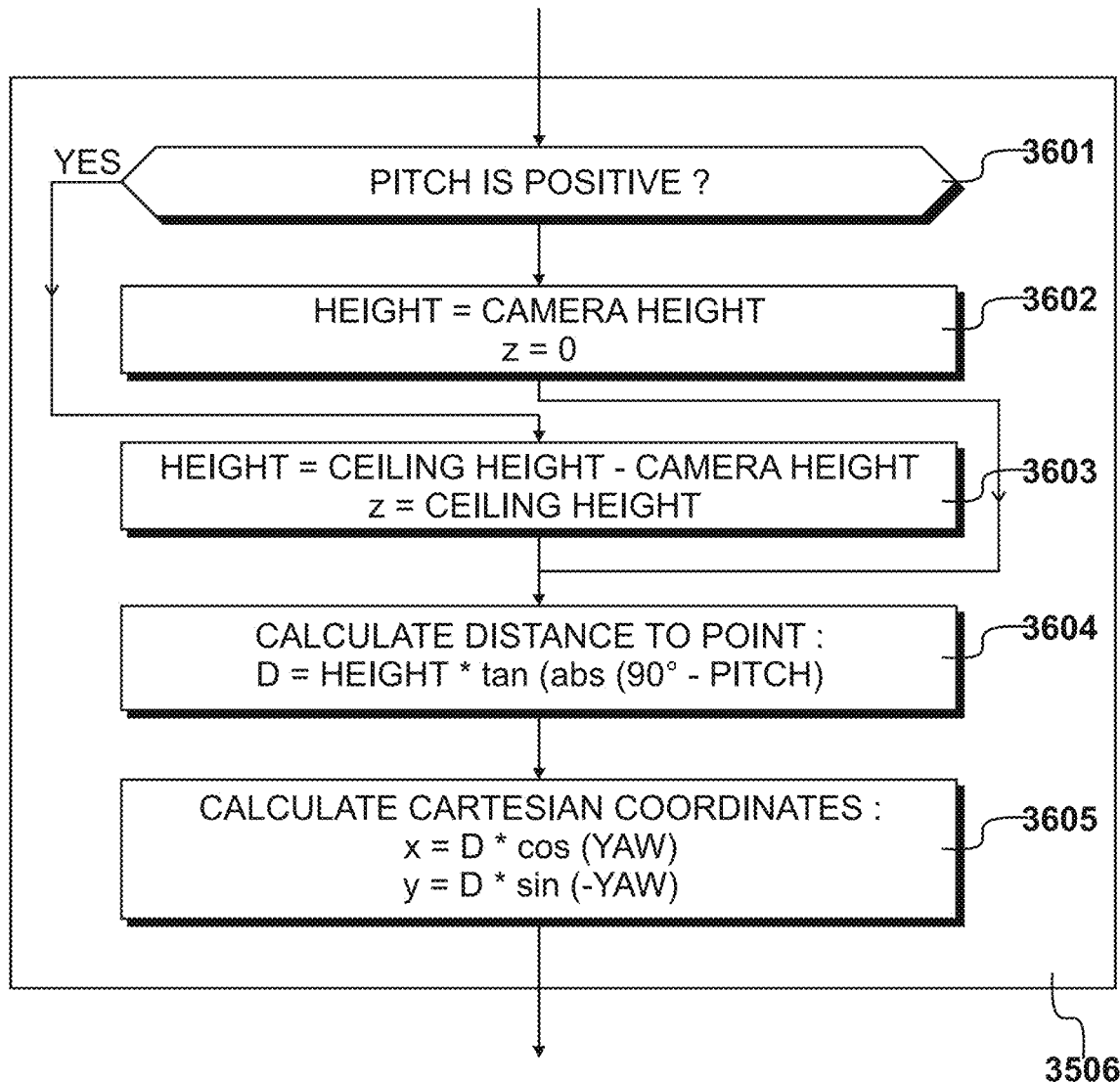
FIG. 36 details steps carried out during FIG. 35 to transform spherical coordinates into Cartesian coordinates.

FIG. 36 details step 3506 at which the spherical coordinates of a rotated end point are transformed to Cartesian coordinates. These steps are also carried out during floor plan creation process 2802 at step 4303, as will be described with reference to that Figure.

At step 3601, a question is asked as to whether the pitch angle of the spherical coordinates is positive. If this question is answered in the negative, then the viewer is looking downwards, and the Cartesian coordinates should be calculated with respect to a plane below the centre of the sphere, which in this case is the floor. Thus, at step 3602 the height used in the calculation is set to be the camera height as obtained at step 3501. In addition the third coordinate, on the z-axis, is set to be 0.

Alternatively, if the pitch is positive, then the viewer is looking upwards and the location should be calculated with respect to a plane above the centre of the sphere, in this case the ceiling. The height used in the calculation is therefore set at step 3603 to be the camera height subtracted from the ceiling height. The third coordinate on the z-axis is set to be the ceiling height.

Following the determination of the height value at either step 3602 or step 3603, then at step 3604 the distance along the plane in question is calculated by multiplying the height by the tangent of the absolute value of the pitch subtracted from 90°. This is the second version of equation 3112, which is preferred because it uses multiplication rather than division.

Once the distance has been calculated, then at step 3605 the coordinates on the x-axis and the y-axis can be calculated using equations 3110 and 3111.

Thus, at the conclusion of step 3506, three-dimensional Cartesian coordinates have been obtained for the end point, rotated by the current pair of pitch and roll values. If the ceiling height were not known, meaning that only points on the floor were to be selected, then the points could be determined in two-dimensions by omitting the value on the z-axis.

Thus, there is provided a method of identifying the orientation of an image in a spherical format where a surface represented in the image had a known orientation and was at a known distance from the camera when the image was obtained. A plurality of lines are obtained in the spherical format, each line defined by two end points in spherical coordinates, and each line intersecting with at least one other line. For each of a plurality of rotational definitions, each comprising a proposed pitch and a proposed roll value, the spherical coordinates of each end point are transformed into a Cartesian coordinate system relative to the rotational definition thereby creating rotated lines, and a cumulative deviation from a predetermined angle of the angles between intersecting rotated lines is determined. The rotational definition that has the smallest cumulative deviation is selected as the preferred rotational definition. In this example, a rotational definition is an orientation defined by pitch and roll values.

As an alternative to the method described with respect to FIG. 35, the plane within the sphere that represents the floor could be rotated by the rotational definition before the spherical coordinates are transformed into locations on the rotated plane, as an alternative to rotating the coordinates of each endpoint.

In other embodiments, other methods of transforming spherical coordinates into a Cartesian coordinate system relative to the rotational definition are envisaged.

Thus, at the end of camera pose compensation process 2801, a pose-pitch and pose-roll angle have either been estimated, or obtained from the metadata in image 2908. As described with respect to FIG. 33, the pose-pitch and pose-roll values can be stored in the image metadata; alternatively, the entire image can be rotated and pose-pitch and pose-roll values of 0 stored in the metadata. These pose-pitch and pose-roll values can then be used as described with reference to FIGS. 43 and 44, whenever transformations are made between spherical and Cartesian coordinates.

However, in other embodiments, the camera pose compensation process may be omitted. Knowing the camera pose means that locations in Cartesian coordinates on a plane can be more accurately calculated, but satisfactory results can be obtained without carrying out the camera pose compensation step.

FIG. 37

Figure 37:
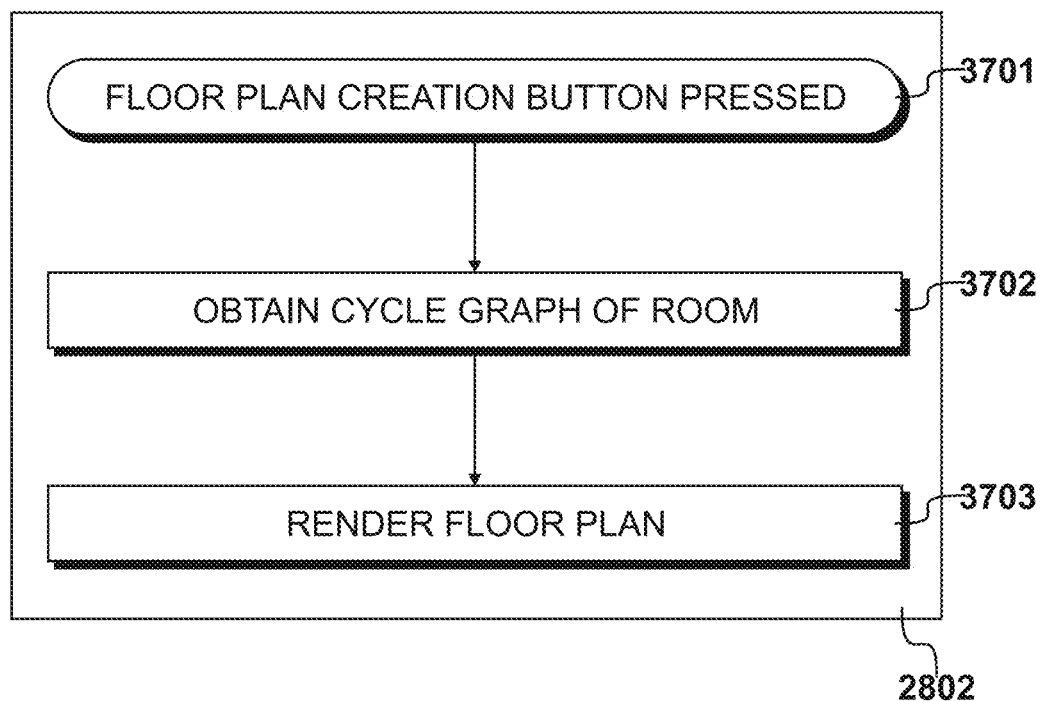
FIG. 37 details a floor plan creation process shown in FIG. 28.

FIG. 37 details floor plan creation process 2803, in which spherical coordinates of points in an image in spherical format are transformed into two-dimensional or three-dimensional Cartesian coordinates in order to produce a floor plan of the room. As previously described, it is not necessary for a virtual map to have been created to carry out this process, as a floor plan can be created for a single room.

However, the floor plan creation process can use the connection points stored in virtual map 1305 to identify how adjacent rooms should be joined together, and thereby create a floor plan of an entire building.

Process 2802 is initiated by the user selecting button 2905 on tool bar 2903 at step 3701.

A cycle graph is then obtained for the room, comprising an ordered list of vertices, each representing a point selected by a user. Each vertex in the cycle graph comprises a set of spherical coordinates and corresponding Cartesian coordinates If two planes are being considered, such as the floor and the ceiling, then each vertex comprises two sets of spherical coordinates and two sets of corresponding Cartesian coordinates.

At step 3703 this cycle graph is used to render a floor plan of the room. At this step, if cycle graphs exist for other rooms that have connection points to this room, then the cycle graphs will be rendered together as a plan of a building.

Step 3702 will be described further with reference to FIG. 42, while step 3703 will be described further with reference to FIG. 47. Before that, the user interface facilitating the selection of corner points by the user will be described with reference to the illustrations in FIGS. 39 to 41.

FIG. 38

The process of creating a floor plan as described with reference to FIG. 37 includes the creation of a cycle graph at step 3702, which is rendered into a floor plan at step 3703. The cycle graphs created for each room are stored as floor plan data 1308 in virtual map data 1304, while the rendered floor plans are stored as floor plans 1307.

Figure 38:
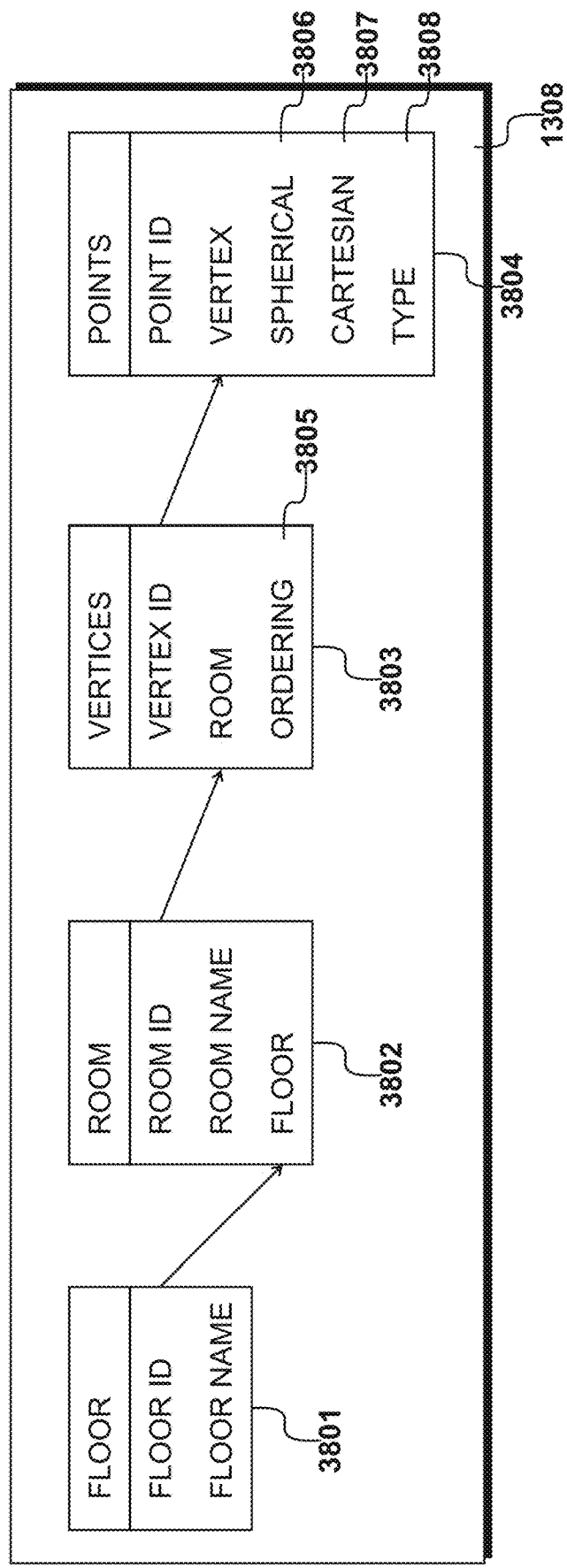
FIG. 38 shows a data structure storing a cycle graph.

FIG. 38 shows an exemplar method of storing cycle graphs in floor plan data 1308. In this example, the data is stored in a database structure. However it could be stored in an object-oriented programming structure, or any suitable structure.

Data 1308 includes a list 3801 of floors within the map, a list 3802 of rooms, a list 3803 of vertices, and a list 3804 of points. Each room belongs to a floor, and each vertex belongs to a room. Within each list of vertices for a room, an ordering field 3805 gives the position of each vertex, thereby creating a cycle graph for each room. Each entry in the points list belongs to a vertex. A point includes both spherical coordinates 3806 and Cartesian coordinates 3807 for the point. It also includes a type field 3808 indicating the type of point, for example a selected point, or an endpoint on another surface, as will be further described. A plurality of points may belong to a vertex, depending upon whether one or more surfaces is being considered.

Any method of storing an ordered list of selected points could be used.

FIG. 39

Figure 39:
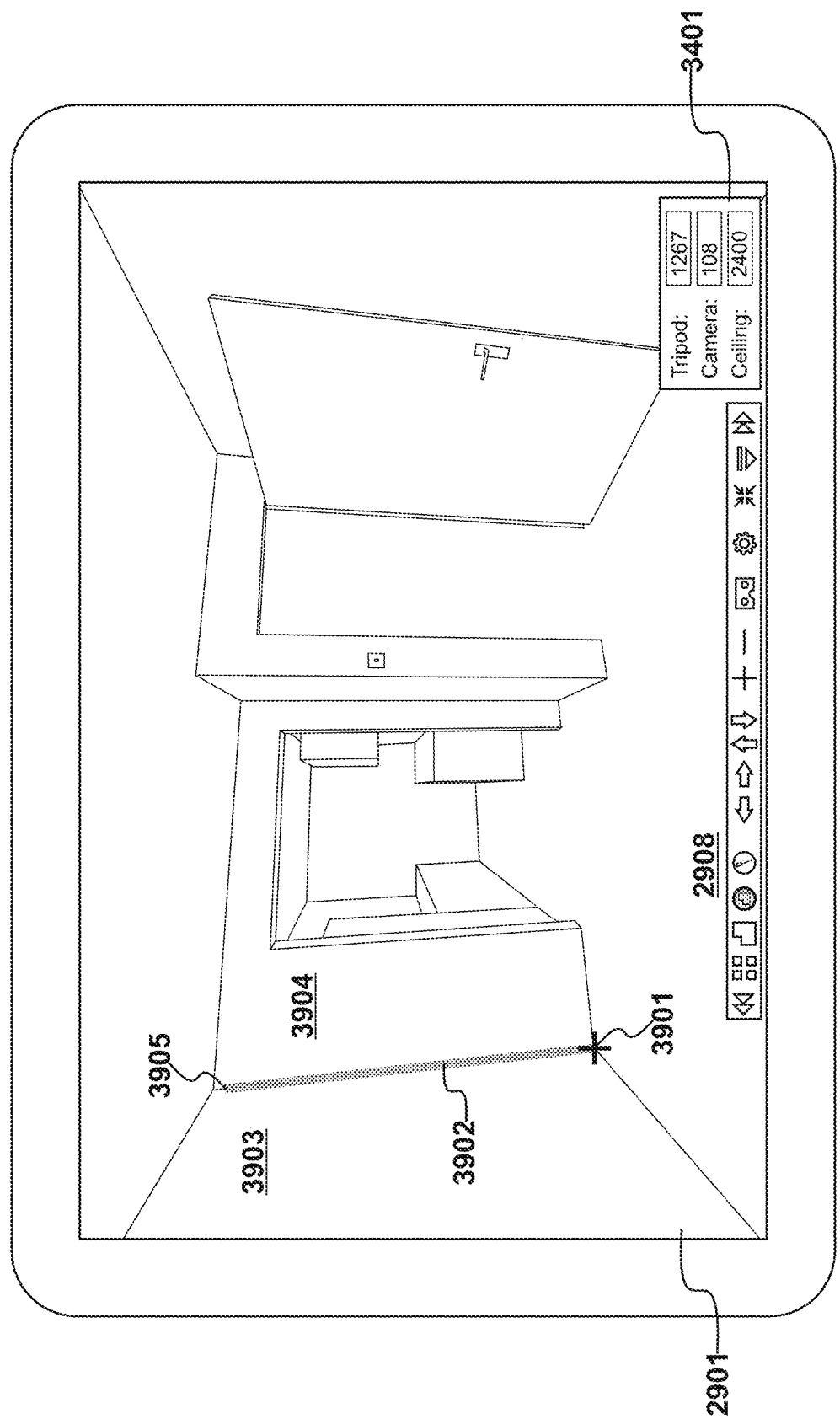
FIGS. 39 to 41 show a user interface during the steps carried out in FIG. 37.

FIG. 39 shows interface 2901, in which image 2908 is shown in the editing area. In a similar way to camera pose compensation process 2801, input boxes 3401 are displayed allowing the user to specify the heights of the tripod, the camera device, and the ceiling. It will be noted that in this case an estimated value of 2.4 m has been provided for the ceiling. It is not necessary to provide an exact ceiling measurement at this stage, if the user is selecting points on the floor. If the user has not provided an exact height, then an estimated ceiling height is used. The age of the building may be used to provide a likely height.

As a user moves cursor 3901 around editing area 2902, a cursor line 3902 is displayed, running substantially upwards from the cursor point 3901. The direction of the line is vertical as reproduced in the spherical format. Thus, as can be seen in FIG. 39, line 3902 appears to be leaning to the left but follows the intersection between walls 3903 and 3904.

This enhanced cursor is displayed whenever floor plan creation process 2803 is being used. It is achieved by transforming, in real time, the position of the cursor in spherical coordinates into Cartesian coordinates on the floor, as will be described with reference to FIG. 43. A calculation is then made of an endpoint of the cursor line that has the same Cartesian coordinates on the x- and y-axes but is on the ceiling, as will be described further with reference to FIG. 44.

As can be seen in FIG. 39, the endpoint 3905 of line 3902 does not quite reach the ceiling. This is because the estimate of 2.4 m is, in fact, incorrect. The user may provide the actual ceiling height in the input box. However, for the purposes of this example, the user does not do this, preferring to adjust the height of the ceiling after all corners of the room have been selected, as will be described with reference to FIG. 46. As a further alternative, it is not necessary to have an accurate measurement of the ceiling when creating a floor plan and therefore the user may choose not to adjust it at all.

FIG. 40

Figure 40:
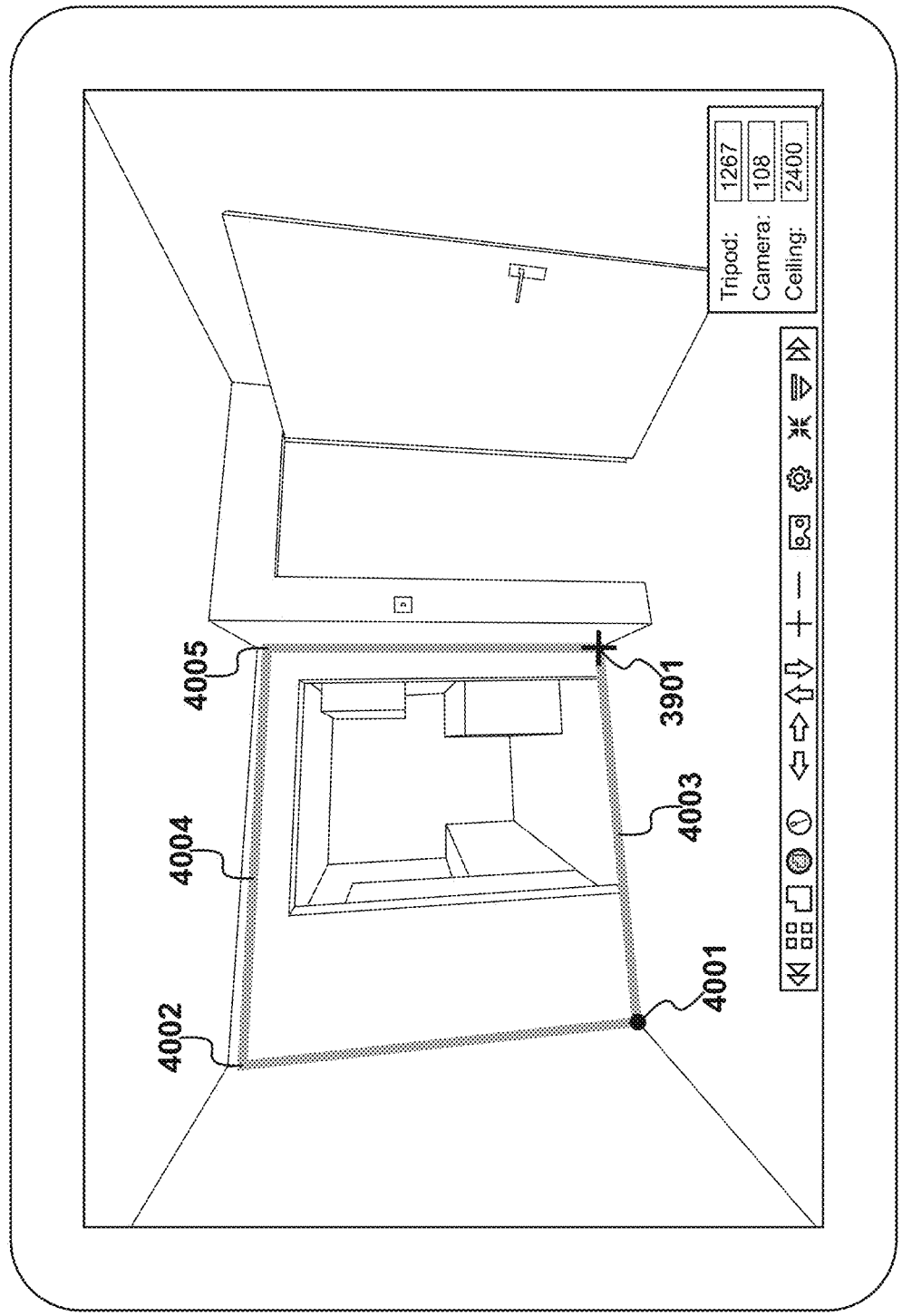

The user selects a corner of the room by moving the cursor to a corner that is visible in image 2908, and clicking. This creates a point, for example point 4001, which is stored in floor plan data 1308 as a vertex in list 3803, with both its spherical and Cartesian coordinates being stored in list 3804. Coordinates for the corresponding point 4002 on the ceiling plane are also stored in list 3804, referencing the same vertex. As can be seen in FIG. 40, the ceiling height is incorrect, as the coordinates have been calculated with respect to a plane that is 2.4 meters above the floor. The plane on which the cursor endpoints are located is referred to hereafter as the ceiling plane, as distinct from the ceiling of the room as visible in image 2908.

Once a point has been selected, its spherical coordinates 3806 and Cartesian coordinates 3807 are stored in points list 3804. The spherical coordinates are used to render the selected points, and lines between them, as the user moves the viewpoint of the viewer application. The Cartesian coordinates are stored in order to generate a floor plan, and are also used, as will be later described, to generate guidelines and constrain cursor movement.

The user then moves the cursor 3901. Lines are continuously rendered between the current cursor position and the previously-selected corner. Thus, for example, line 4003 connects point 4001 and cursor position 3901. A corresponding line 4004 joins the ceiling point 4002, and the current endpoint 4005 of the cursor line. These lines, which appear to be horizontal from the point of view of the user, can be utilised by the user to make the selection of the next corner more accurate by lining them up with intersections between the wall and the floor.

During the selection of the first and second corners, cursor movement is unconstrained.

FIG. 41

After the user has selected two corners, a wall is considered to be fully defined. It is therefore marked with a point at each corner, vertical and horizontal bounding lines, and midpoints of the horizontal lines. This can be seen for example in the selection of wall 3904. As previously described, line 4101 is drawn not on the ceiling, but drawn on the ceiling plane that is 2.4 m above the floor.

After at least one wall has been completely selected, the process constrains cursor movement, and therefore selection of points, in order to assist with accuracy. In addition, guidelines are rendered to assist the user.

Figure 41:
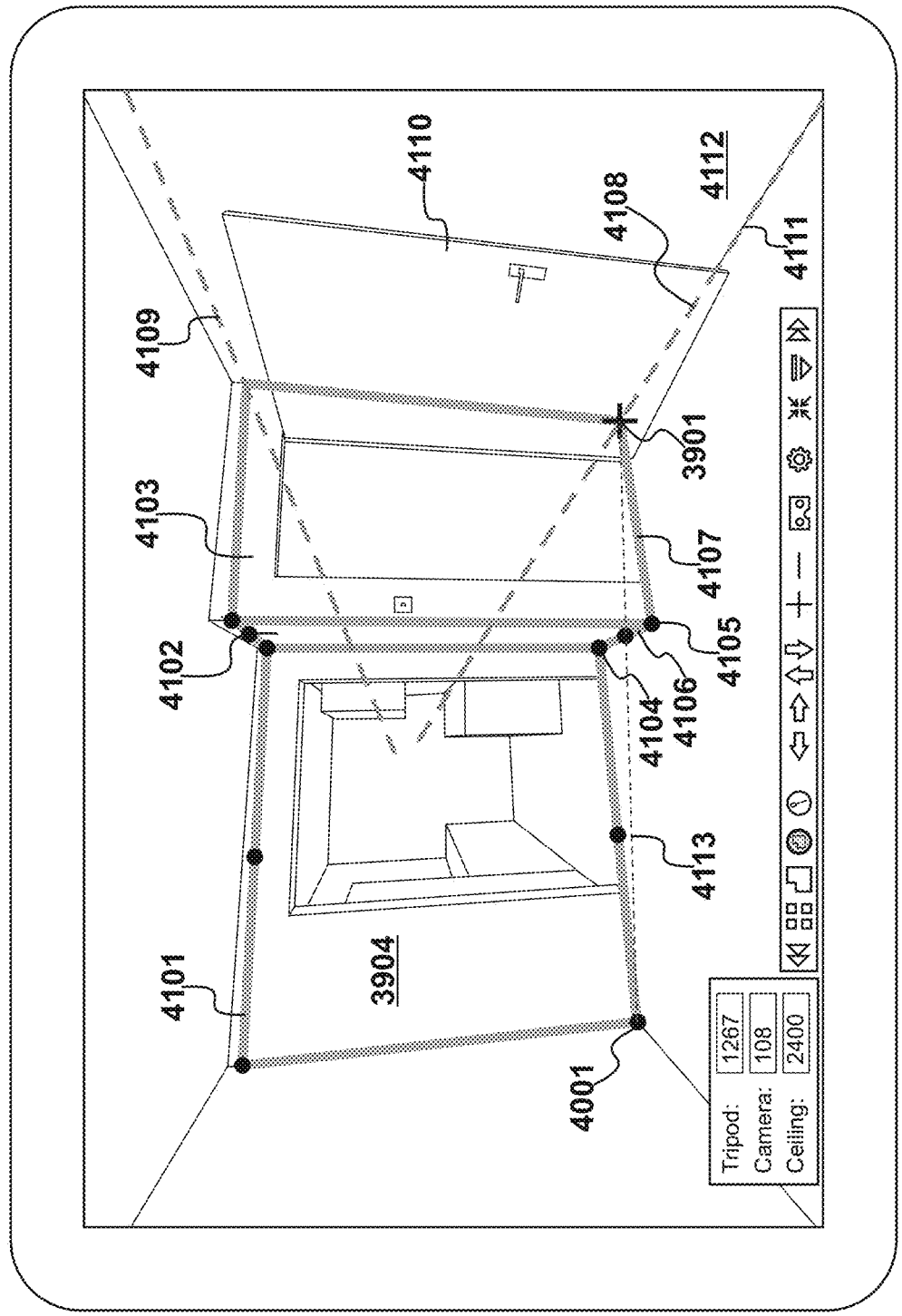

Thus, for example, in FIG. 41, wall 3904 has been fully selected, as has wall 4102. The user is currently moving cursor 3901 to select wall 4103. The movement of cursor 3901 is constrained so that the selection of wall 4103 is at one of a number of predetermined angles to wall 4102.

The Cartesian coordinates of points 4104 and 4105, defining the previous corners, are known through the transformation method described herein. In addition, the Cartesian coordinates of the cursor 3901 are known. Therefore, an angle can be calculated between the line 4106 connecting points 4104 and 4105 and the line 4107 connecting point 4105 and cursor position 3901. In order to assist the user with accurate drawing, the cursor position is constrained so that this angle is one of 90°, 120°, 135°, 150°, and 1800, which are common architectural angles. If the user is mapping an unusually-constructed space, then they may wish to turn off this constraining feature.

Guidelines are also displayed to user, for example guidelines 4108 and 4109. In the example shown in FIG. 41, guideline 4108 is at 90°, in the Cartesian coordinates system, to the line 4107. As can be seen, this guideline, along with horizontal line 4107, allows the user to move cursor 3901 to a position in the corner of the room, even though the corner is hidden behind door 4110, by lining up guideline 4108 with the intersection 4111 between the floor and wall 4112.

Guideline 4109 follows the same orientation in the Cartesian coordinates space, but on the ceiling plane.

In addition, guideline 4113 connects cursor position 3901 to the first point in the cycle graph, 4001. This guideline is useful when the user is closing the graph by selecting the final corner.

Additional guidelines may be displayed, for example guidelines at other angles other than 90°.

The user continues to select corners as in the examples shown in FIGS. 39 to 41 until all corners have been selected. The first corner should be selected as the final corner, thus closing the cycle graph.

In the example illustrated here, the user has selected points on the floor. However, points on the ceiling could be selected instead. This could be more accurate, particularly if the room contains a lot of furniture or if there are large skirting boards or other obstructions. When the cursor point moves above the level of the camera, the process switches to calculating Cartesian coordinates on the ceiling plane, instead of the floor plane. The cursor line then extends downwards to an endpoint calculated on a floor plane, which will only line up with the actual floor if the ceiling height is correct.

If the user is selecting points on the ceiling, it is necessary to have a reasonably accurate measurement for the ceiling height, otherwise the height used in the calculations (the camera height subtracted from the ceiling height) will be wrong and will cause inaccuracies in the transformed Cartesian coordinates.

FIG. 42

Figure 42:
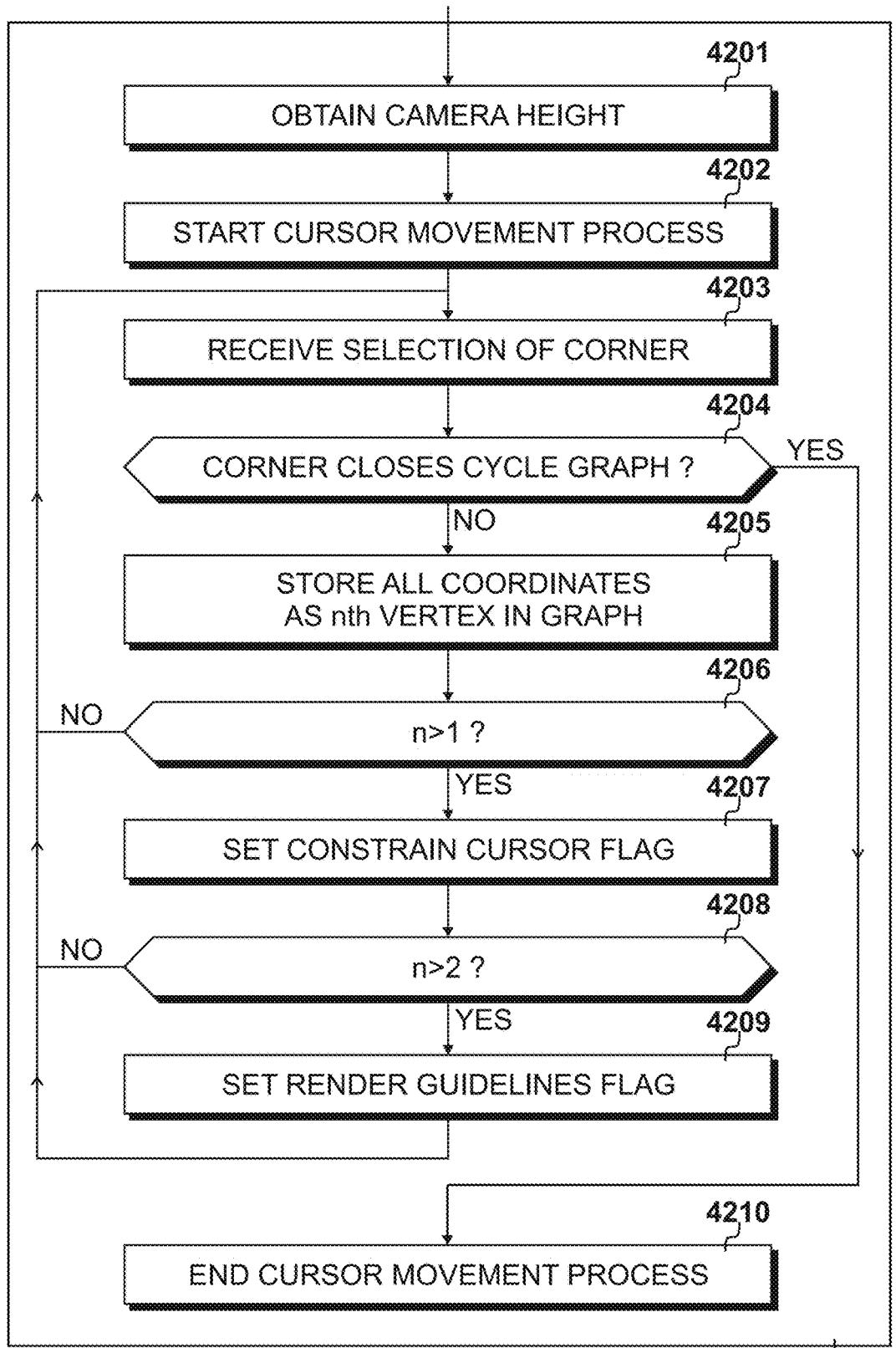
FIG. 42 details steps carried out during FIG. 37 to obtain coordinates of corners of a room in an image shown in FIG. 29.

Step 3702, at which floor plan data 1308 is obtained, is detailed in FIG. 42. At step 4201 a camera height is obtained, in the same way as at step 3501. At step 4202 cursor movement process 2803 is initiated, which will be described further with respect to FIG. 43. The cursor movement process provides a location in Cartesian coordinates for every position of the cursor.

At step 4203 a selection is received from the user of a point in the image, which the user considers to be a corner. At step 4204 a question is asked as to whether this selection closes a cycle graph, i.e. whether it has the same spherical coordinates 3806 as the vertex in list 3803 that has ordering 1 for this room. If this question is answered in the negative, then at step 4205 a vertex with ordering n is created in list 3803 for this room, and points are created in list 3804. The value of n is one more than the highest value in ordering field 3805 for this room. The points include a point having the spherical coordinates and Cartesian coordinates of the selected point, and a point having the spherical coordinates and Cartesian coordinates of the corresponding end point; i.e. the points on both the floor and the ceiling planes.

At step 4206 a question is asked as to whether n is greater than 1, i.e. whether there is at least one previous vertex in the cycle graph. If this question is answered in the affirmative, then at least two corners have now been selected, and therefore a flag is set to constrain cursor movement at 4207.

At step 4208 a further question is asked as to whether n is greater than 2, i.e. whether there are at least two previous vertices in the cycle graph. If this question is answered in the affirmatives then there are now at least three corners selected, and therefore a flag is set at step 4209 to render guidelines. At this point, and if either of the questions asked at 4206 or 4208 are answered in the negative, control is returned to step 4203 and another corner selection is received. Eventually, all corners will have been selected, the question asked at step 4204 will be answered in the affirmative to the effect that the cycle graph is closed.

At this point, cursor movement process 2803 is stopped at step 4210, and normal cursor display is resumed.

Thus, at the end of step 3701, a cycle graph has been constructed by floor plan data 1308. Each vertex in the graph comprises spherical coordinates showing the actual display location of the point, corresponding Cartesian coordinates on a plane, spherical coordinates of the opposite point on an opposite plane, and corresponding Cartesian coordinates of the opposite point. As previously described, either the coordinates of the floor plane or the ceiling may not match the actual floor or ceiling in the image if the ceiling height is wrong.

FIG. 43

Figure 43:
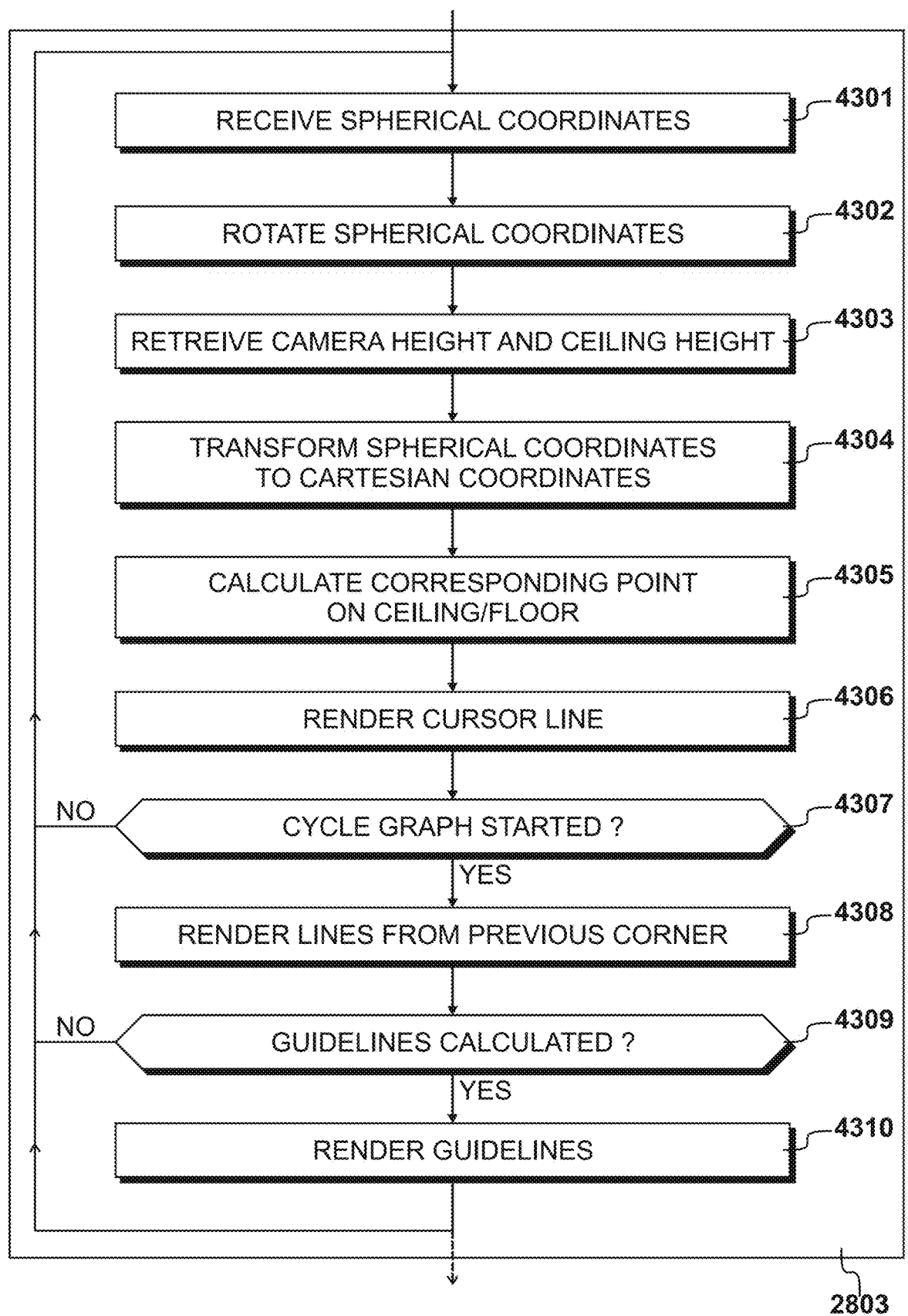
FIG. 43 details a cursor movement process shown in FIG. 28.

FIG. 43 details cursor movement process 2803. This process runs while corner selection step 3701 is running, and overrides the standard cursor display of the 360° viewer. While cursor movement process 2803 is running, it calculates Cartesian coordinates corresponding to the spherical coordinates of the cursor, in real time, and displays a line that is vertical within the Cartesian coordinate system to a corresponding point on another plane within the sphere. Thus, if the user is selecting points on the floor, the cursor line will extend upwards towards an end point on a ceiling plane, whereas if the user is selecting points on the ceiling, the cursor line will extend downwards towards an endpoint on a floor plane. The cursor process also renders the lines and guidelines that are visible to the user during the corner selection step.

The separation of the floor plan creation process 2802 and the cursor movement process 2803 described herein is only an example of how this may be implemented, and they may in fact be the same process, or a collection of smaller processes. In addition, cursor movement process 2803 is not necessary for the creation of a floor plan. If system memory is limited, the cursor movement process may be switched off. In this case, when the user selected a point in the image it would be at that point transformed into Cartesian coordinates, rather than the cursor position being transformed in real time.

At step 4301 spherical coordinates within image 2908 are received by cursor movement process 2803. These would be provided by the usual cursor process of the spherical image viewer. At step 4302 the spherical coordinates are rotated by the pose-pitch and pose-roll values stored for image 2908, as described with respect to FIG. 33. The image may have already been rotated, or camera pose compensation may have been omitted, in which case the pose-pitch and pose-roll values are both zero and no rotation takes place. At step 4303 the camera height calculated at step 4201 and the ceiling height are retrieved from memory.

At step 4304 the spherical coordinates, as rotated at step 4302, are transformed to Cartesian coordinates. This is done in the same way as at step 3506 detailed with respect to FIG. 36. At step 4305 the corresponding point on the ceiling plane or floor plane, depending on whether the cursor is currently on the floor or on the ceiling respectively, is calculated, as will be described further with reference to FIG. 44. At step 4306 a cursor line is rendered on the display between the cursor point and its corresponding point. The cursor line is rendered within the spherical viewer, and therefore joins the unrotated spherical coordinates of the cursor position and its endpoint.

At step 4307 a question is asked as to whether the cycle graph has already been started, and if this question is answered in the affirmative then at step 4308 lines are rendered, both on the floor plane and the ceiling plane, from the spherical coordinates of the previous corner to the unrotated spherical coordinates of the current cursor position, with the same happening on the other plane (the ceiling or the floor) from the spherical coordinates of the point on the opposite plane to the current cursor line endpoint.

At step 4309 a question is asked as to whether guidelines should be calculated, i.e. whether the flag to render guidelines was set at 4209. If this question is answered in the affirmative then guidelines are rendered at step 4310, as will be described with reference to FIG. 45.

At this point, and if either of the questions asked at step 4307 or step 4309 is answered in the negative, then control is returned to step 4301 and the next set of spherical coordinates are received. This process continues until cursor movement process 2803 is stopped at step 4210 of floor plan creation process 2802.

The process for constraining cursor movement is not detailed herein; the steps to implement this include calculating, in the Cartesian coordinate system, the angle between the line connecting to previous points and the line from the previous point to the current cursor position, and if that angle is within a certain distance from one of the predetermined angles, snapping the cursor to the nearest point on the line does have that angle. This position will then be transformed back into spherical coordinates, rotated by necessary by the pose-pitch and pose-roll. An additional snap feature can be provided to close the cycle graph, such that the cursor position is snapped to the spherical coordinates of the first vertex in the graph, if it is close to those coordinates.

FIG. 44

Figure 44:
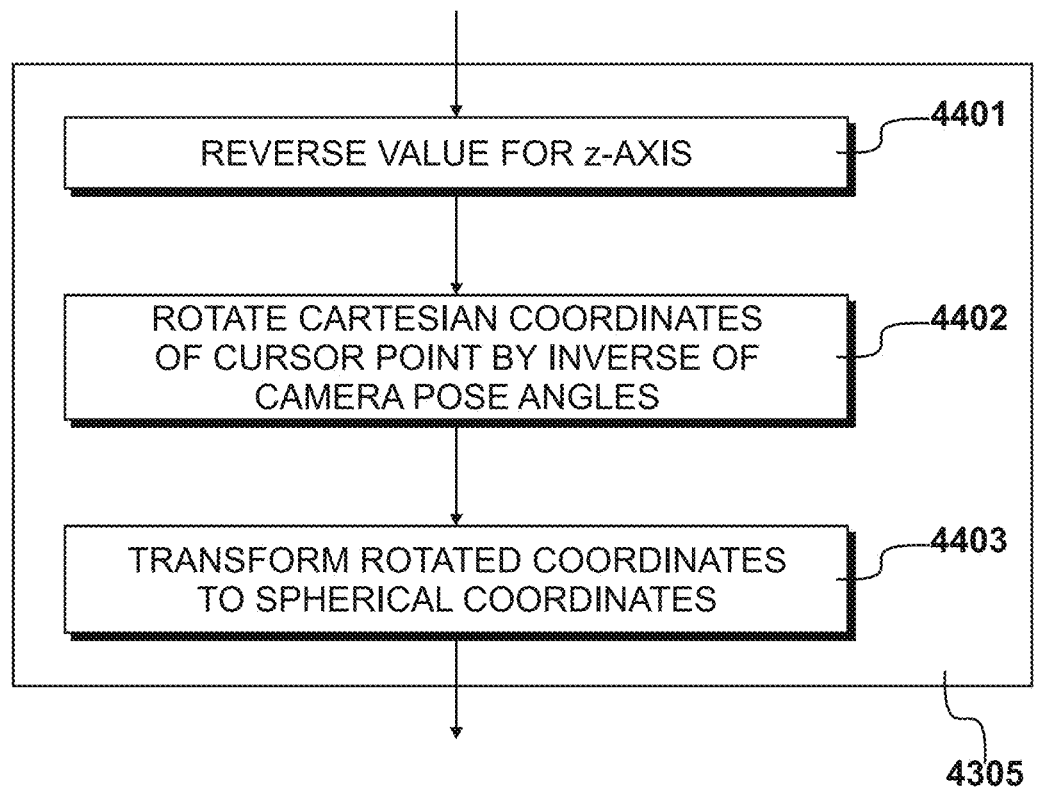
FIG. 44 details steps carried out during FIG. 43 to calculate a point on an opposite plane to the cursor.

FIG. 44 details step 4305, at which the point corresponding to the cursor point on the opposite plane is calculated. As previously described, if the pitch of the cursor point is negative, then the Cartesian coordinates are calculated with respect to the floor, and the corresponding endpoint is calculated with respect to the ceiling plane. The opposite is true if the pitch is positive. Therefore, after step 4304 the spherical coordinates of the cursor point have been transformed into three-dimensional Cartesian coordinates, where the value on the z-axis is 0 for the floor, and the current ceiling height for the ceiling plane.

In order to find the point on the opposite plane (floor or ceiling respectively) that has the same coordinates on the x-axis and the y-axis, it is therefore necessary only to change the value of the z-axis, swapping 0 for the ceiling height and vice versa as required. This is done at step 4401.

At step 4402 the Cartesian coordinates obtained at step 4401 are rotated by the inverse of the camera pose angles stored in the metadata for the image, before these rotated Cartesian coordinates are transformed back to spherical coordinates at step 4403. Thus, both Cartesian coordinates and spherical coordinates have been obtained for the end point of the cursor line.

It should be noted that it is the unrotated Cartesian coordinates obtained at step 4401 that are stored in the cycle graph, as these are stored for the purposes of displaying the endpoint within the spherical format.

If the camera pose angles for the image were both 0, then the spherical coordinates of the end point could be found by merely modifying the pitch of the spherical coordinates of the cursor point, by an amount dependent on the ratio between the ceiling height and the camera height. However, this would not work if any camera pose compensation were required, and therefore it is preferred to rotate the Cartesian coordinates and then transform them into spherical coordinates.

The transformation of the three-dimensional Cartesian coordinates into spherical coordinates may be carried out by any known method.

FIG. 45

Figure 45:
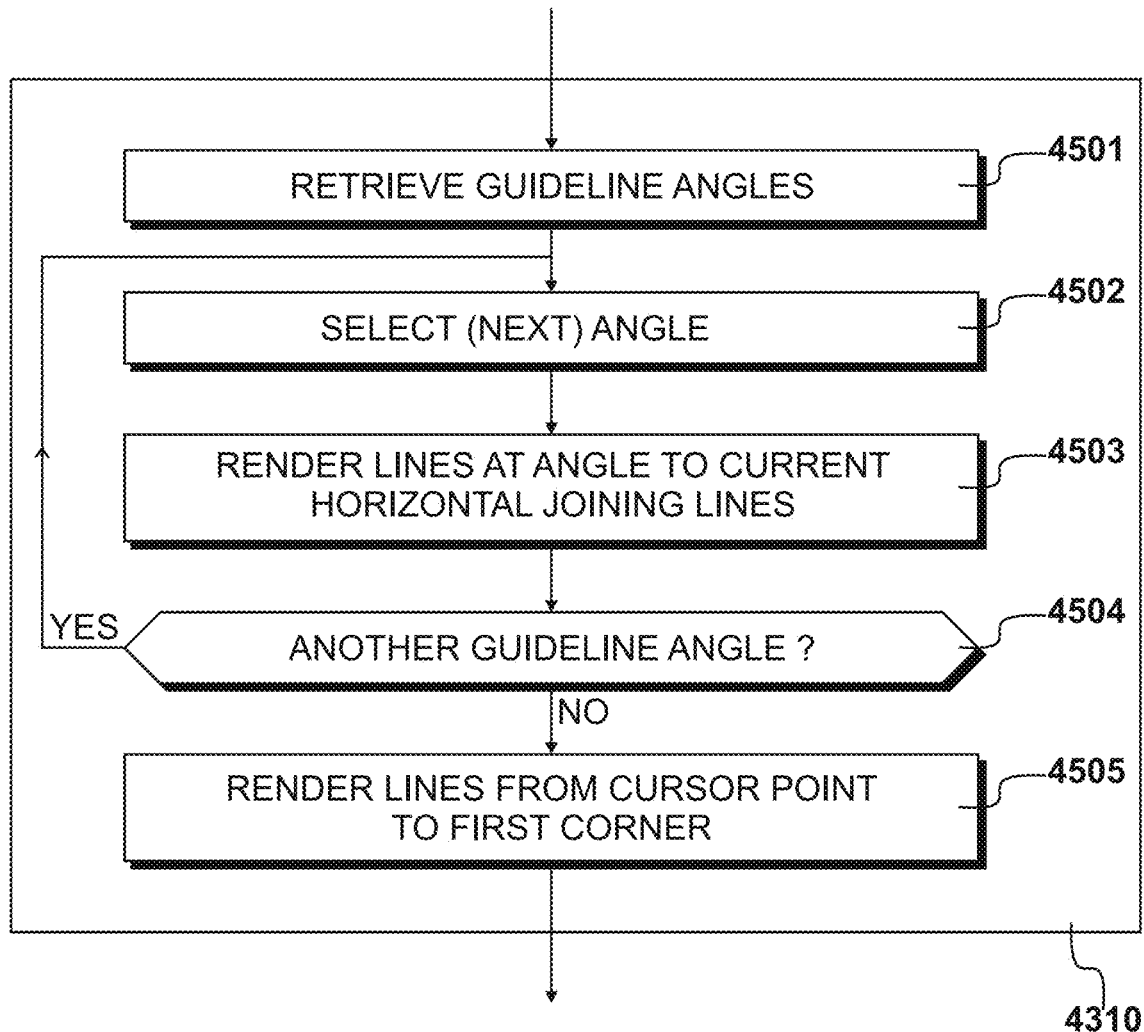
FIG. 45 details steps carried out during FIG. 43 to render guidelines.

FIG. 45 details step 4310 at which guidelines are rendered for the current cursor point. This is carried out if the guidelines flag is set, which happens when there are at least two selected points stored in the cycle graph. It is possible to render guidelines if there is only one point selected, but it is preferred to only display guidelines while cursor movement is constrained.

At step 4501 the predetermined guideline angles are retrieved. In this embodiment, this is a single angle of 90°, but more guideline angles could be used.

At step 4502 the first angle is selected, and at step 4503 lines are rendered on the display, which are at the selected angle in Cartesian coordinates to the horizontal lines joining the previous selected corner to the current cursor position. The lines are calculated in Cartesian coordinates, and transformed to spherical coordinates for display, following a suitable rotation if camera pose angles have been stored for the image. At step 4504 a question is asked as to whether there is another guideline angle to consider and if so control is returned to step 4502. Alternatively, all the guidelines have been drawn. At step 4505, a final guideline is rendered, which joins the cursor position to the position of the first corner. This is simply a line joining the two positions in spherical coordinates.

FIG. 46

Figure 46:
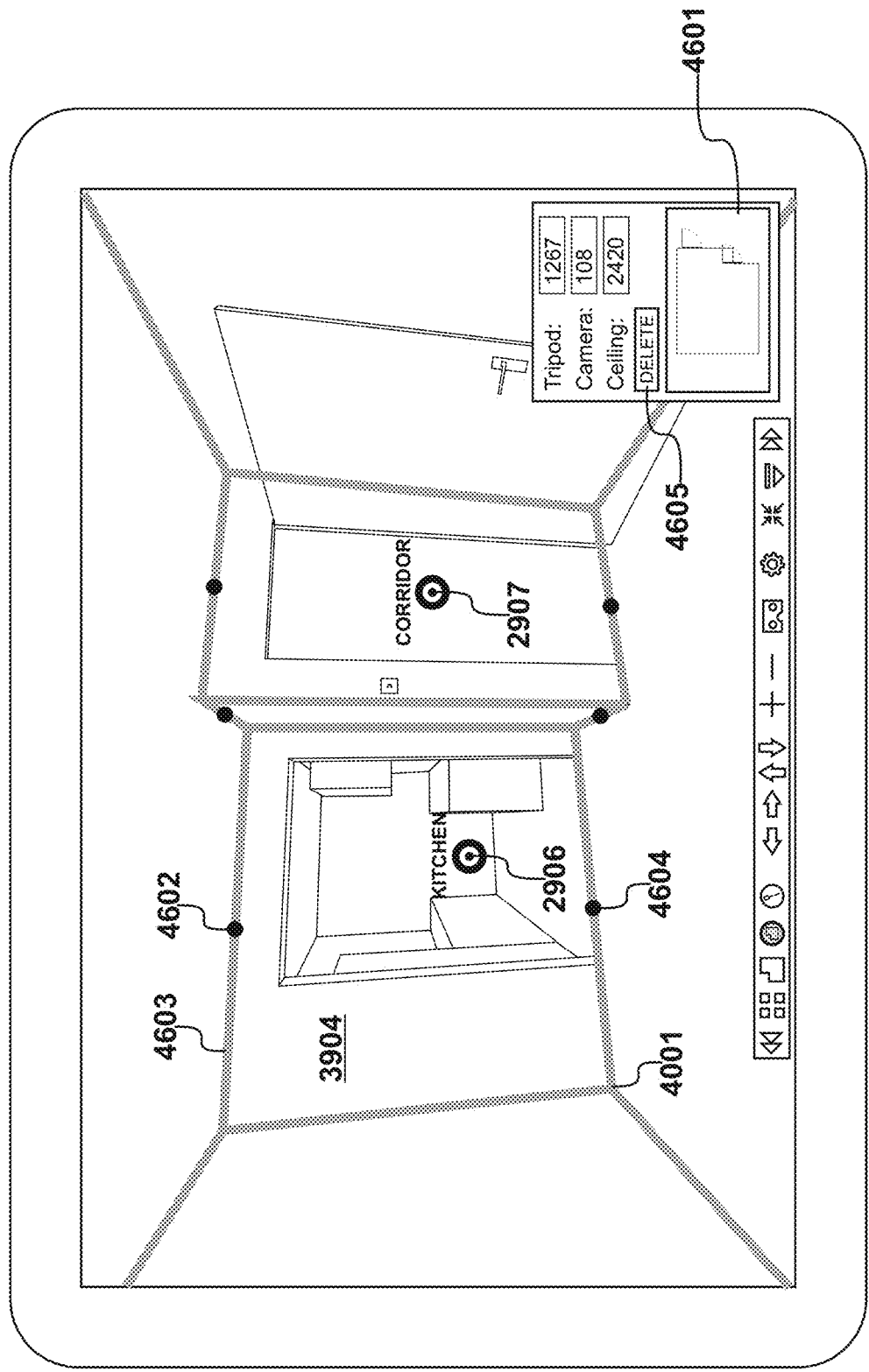
FIG. 46 shows a user interface during the steps carried out in FIG. 37.

At the end of step 3702, as detailed in FIG. 42, cursor movement process 2803 is stopped. A floor plan is then created at step 3703 from the floor plan data 1308 obtained at step 3702. This step will be detailed further with reference to FIG. 47. The floor plan is then displayed to the user, as shown in FIG. 46.

In this example, all the corners have been selected, with the cycle graph being joined at point 4001. The selection of the walls is therefore visible in editing area 2902. The connection points 2906 and 2907 are also visible. The floor plan created by rendering the cycle graph is shown at 4601. It will be seen that the positions of the hotspots have been transformed into doorways in the floor plan.

Following the selection of corner points, the display in editing area 2902 changes to show only the lines connecting the points, along with a midpoint of each line. This is because it is not possible to move any of the corner points but it is possible to alter the height of the lines. Thus, the user has chosen to select a midpoint, for example midpoint 4602, and move it upwards so that line 4603 follows the intersection between the ceiling and wall 3904. This has the effect of raising the ceiling height for all wall selections, as can be seen in FIG. 46. The change in ceiling height is reflected in the input box. It is also possible to adjust the level of the floor using the lower midpoint markers, for example point 4604.

While the adjustment of the height does not affect the rendered two-dimensional floor plan, the user may wish to adjust the height to check that the corners line up on the ceiling as well as the floor. In addition, it may be required to render a three-dimensional floor plan, in which case it would be preferred if the height of the walls were accurate.

When the user moves the horizontal lines using one of the midpoints, this moves the corresponding corner points upwards or downwards, and therefore the spherical and Cartesian coordinates of the points are altered in the points list 3804 of floor plan data 1308. For example, if the user moves the ceiling plane upwards within the spherical format, then all the ceiling points also move upwards and therefore their spherical coordinates change. These replace the spherical coordinates 3807 for the point in floor plan data 1308, are rotated according to the camera pose compensation, are transformed to Cartesian coordinates, and replace Cartesian coordinates 3807 for the point. A similar process occurs if the floor plane is moved using one of the lower midpoints, such as midpoint 4604.

If the user wishes to create the floor plan again, then the cycle graph can be removed by pressing DELETE button 4605. This deletes all vertices for the room from list 3803, along with corresponding points in list 3804, and returns the process to step 3702 so that the user can restart the process of selecting corners.

If the user clicks on button 2905 then the floor plan creation process 2802 is terminated.

FIG. 47

Figure 47:
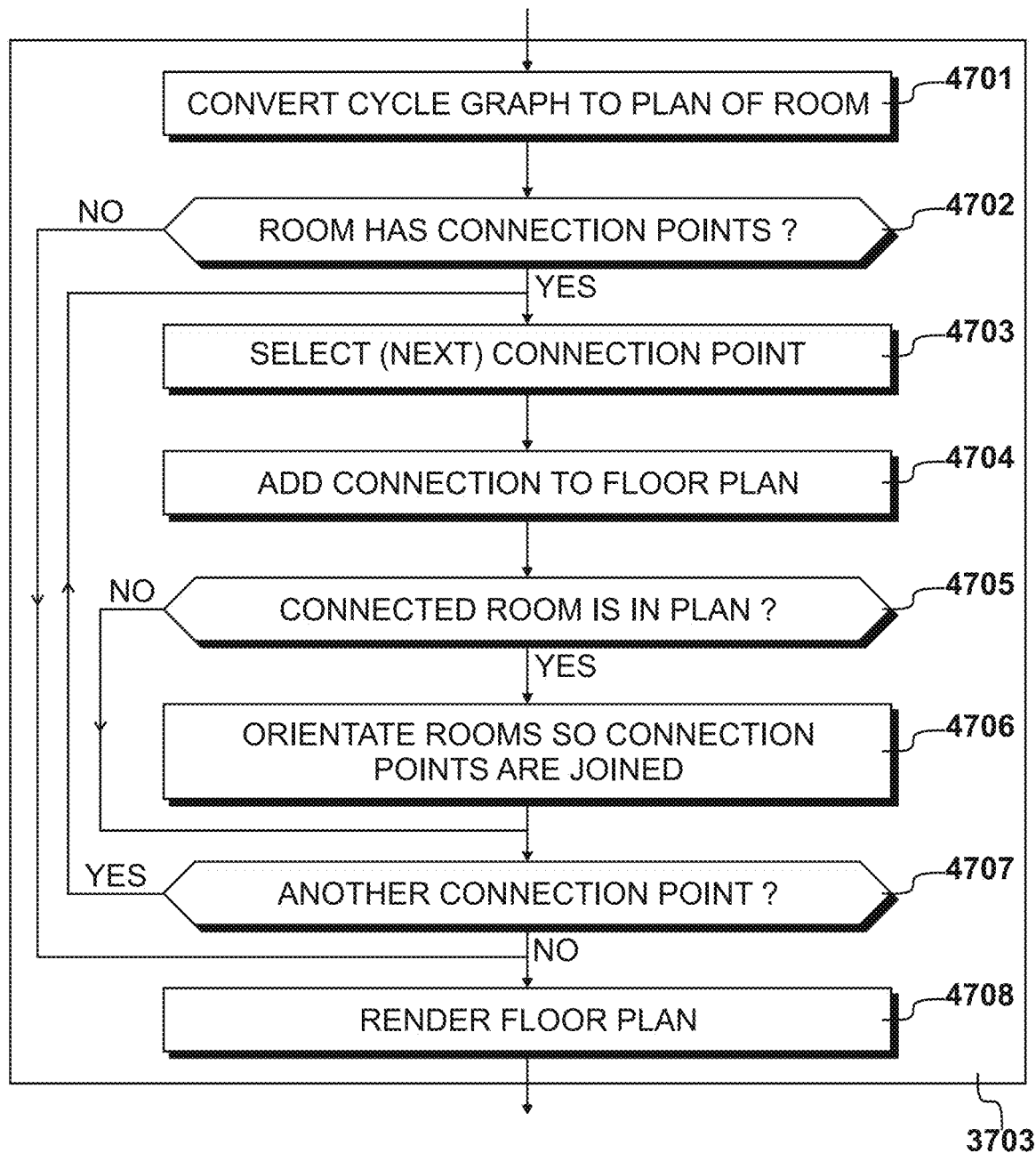
FIG. 47 details steps carried out during FIG. 37 to render a floor plan.

FIG. 47 details step 3703, at which the cycle graph obtained during step 3701 is rendered into a floor plan. At step 4701 the floor plan data 1308 is converted to a plan of the room, by plotting, on the x and y-axis of the floor plan, the Cartesian coordinates 3807 of all the points for the vertices in the room. At step 4702 a question is asked whether the room has connection points stored in virtual map data 1305. If this question is answered in the affirmative then at step 4703 the first connection point in the room is selected and it is added to the floor plan of the room. When making a floor plan, connection points can only be in walls. (This is in contrast to the potential for placing connection points in the middle of a room that was noted with respect to the process for creating a virtual map, for example connection point 212). Because each connection point must be in a wall, its horizontal location within the wall can be calculated and therefore added to the floor plan at step 4704.

At step 4705 a question is asked as to whether the room that the connection point leads to is already in the floor plan of the building, i.e. whether there are vertices in list 3803 referring to this room. If this question is answered in the affirmative, then at step 4706 the current room and the connected room are orientated so that the connection points are joined. At this point, and if the question asked at step 4705 is answered in the negative, then a question is asked at step 4707 as to whether there is another connection point for the room in the virtual map data 1305. If this question is answered in the affirmative then control is returned to step 4703 and the next connection point is selected.

If all the connection points have been considered, then the floor plan is rendered at step 4708. If there are no other rooms in the virtual map, or if there are other rooms but they do not yet have cycle graphs, then the floor plan will be of a single room. If there are other cycle graphs, then a floor plan of all the rooms will be created, oriented so that rooms are connected at connection points.

Thus there is provided a method of creating a floor plan from a spherical image. A spherical format is created of an image obtained by a camera, the spherical format having a centre that corresponds to the position from which the image was obtained by the camera. A first surface represented in the image had a first orientation and was at a first distance from the camera when the image was obtained. A plurality of selected points in the spherical format are obtained, and a plane is identified that has the first orientation and that is at the first distance from the centre of the sphere. A plurality of locations in a Cartesian coordinate system are calculated, being where lines from the centre of the sphere to these points intersect with this plane. A floor plan is rendered using these locations.

FIG. 48

Figure 48:
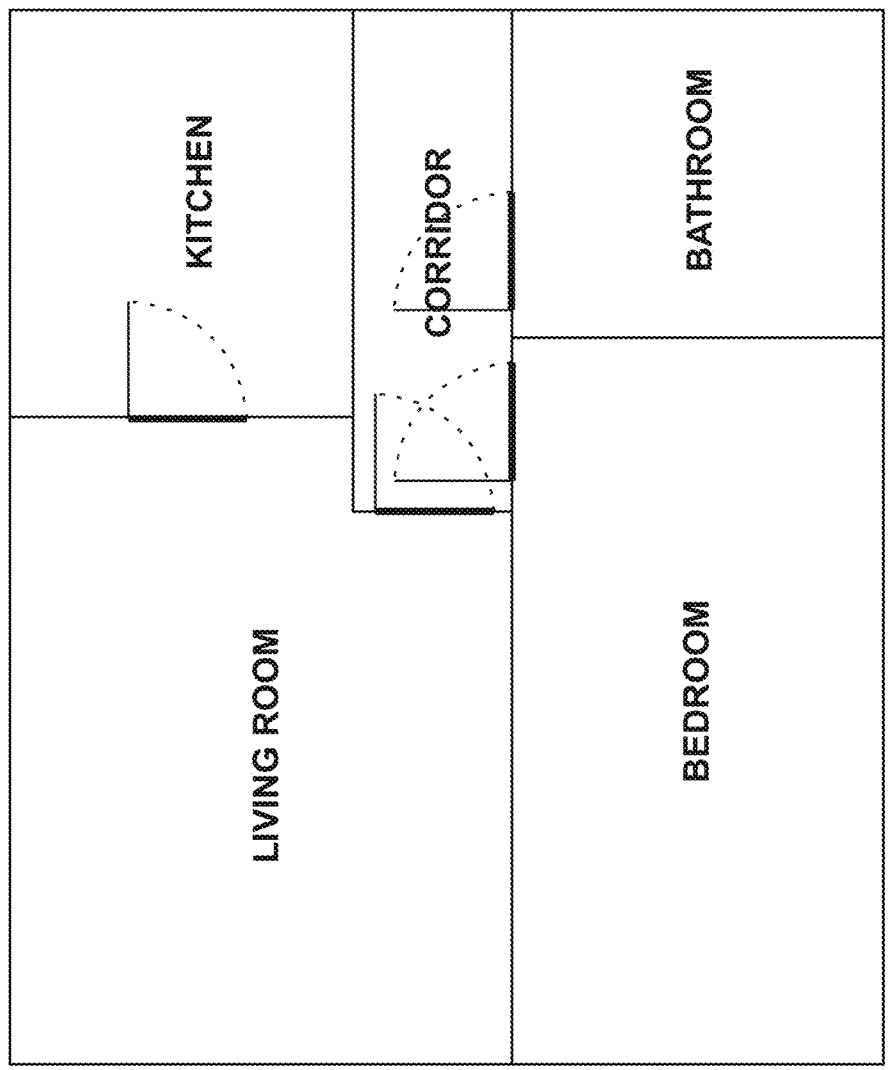
FIG. 48 shows a floor plan of a building produced by the steps of FIG. 37.

Therefore, it is possible to create a floor plan of an entire building by creating cycle graphs for each room in a virtual map. An example of such a floor plan 4801 is shown in FIG. 48, where five rooms have been mapped, and have been automatically orientated to connect at their connection points.

As previously discussed, it is possible for the cycle graphs for each room to be produced automatically, by performing an edge tracing process to identify corners. In this case, the entire building plan shown in FIG. 48 could be produced automatically, possibly at server 107, as soon as the user has completed creating a virtual map. In addition, floor plans of individual rooms could be automatically created, possibly at server 107, as soon as the user uploads an image, with the floor plan for the building being created on the fly as the user creates connection points as shown in FIG. 14.

After the floor plan has been rendered at step 4708, it may be displayed to a user for editing. For example, the user may wish to fine tune the floor plan by moving walls or connection points. This may be particularly necessary if the walls are of a greater or smaller thickness than was used during the rendering process. If the user does move any walls, then the Cartesian coordinates 3807 of points in list 3804 will be changed, and corresponding spherical coordinates 3806 calculated in a similar fashion to previously described. Thus when the user returns to viewing rooms in the viewer, the selected corners will be displayed according to the new spherical coordinates 3807.

In addition, the rendering process displays all connection points as standard doors, and the user may wish to edit one or more of these to show the actual width, door style, or orientation.

After the floor plan is rendered, and edited if necessary, it is saved in the virtual map in floor plans 1307. This may be instead of or in addition to any floor plans generated by more conventional but time-consuming means.

The invention claimed is:

1. A method of creating a floor plan from a spherical image, comprising the steps of, at a processor:
   creating a spherical format of an image obtained by a camera, wherein said spherical format has a centre that corresponds to the position from which said image was obtained by the camera, and wherein a first surface represented in said image had a first orientation and was at a first distance from the camera when the image was obtained;
   displaying said spherical format to a user on a display;
   receiving manual input indicating a plurality of selected points in said spherical format, each defined by spherical coordinates consisting of a yaw angle and a pitch angle defining a line from said centre;
   obtaining said first orientation and said first distance;

identifying a plane having said first orientation that is at said first distance from said centre;

for each of said selected points, identifying a location in a Cartesian coordinate system where the line from the centre of said sphere to said point intersects with said first plane, wherein two of the axes of said Cartesian coordinate system are parallel to said first plane;

rendering a floor plan using said locations, said floor plan representing the positions of said selected points on said first surface; and storing, in an ordered list, said spherical coordinates and the corresponding location in said Cartesian coordinate system for each selected point;

wherein said step of obtaining a plurality of selected points comprises the steps of:

after a selected point is obtained, displaying an element at its spherical coordinates on said display; and if there is at least one previous point in said ordered list, displaying a line from the spherical coordinates of said selected point to the spherical coordinates of the previous selected point in said ordered list.

2. A method according to claim 1, wherein said step of identifying said location for each selected point comprises:

calculating a relative distance from the centre of said plane to the intersection of said plane with said line, said relative distance being relative to said first distance; and using said relative distance to calculate relative coordinates in said Cartesian coordinate system;

wherein either:

a) said relative distance is modified by said first distance before said relative coordinates are calculated, and said relative coordinates are equal to said location; or b) said relative coordinates are modified by said first distance to produce said location.

3. A method according to claim 2, wherein:

said step of calculating said relative distance comprises calculating the tangent of either the absolute value of the pitch angle, or the absolute value of the pitch angle subtracted from 90°; and said step of calculating relative coordinates comprises calculating:

a) the cosine of the yaw angle, multiplied by said relative distance; and b) the sine of the opposite of the yaw angle, multiplied by said relative distance.

4. A method according to claim 1, wherein said step of obtaining selected points further comprises the steps of:

if there are at least two previous points in said ordered list, constraining selection of the next point to have two-dimensional Cartesian coordinates that are on one of a plurality of lines on said plane, wherein each said line is at one of a plurality of predetermined angles to a line on said plane connecting the two-dimensional Cartesian coordinates of the previous two points.

5. A method according to claim 1, further including the step of displaying on said display a cursor moveable in response to user input, and said step of obtaining selected points further comprises the steps of:

receiving a position in said spherical format of said cursor and calculating a location in said Cartesian coordinate system; and if there is at least one point in said ordered list:

calculating a guideline that is defined by a vector on said plane, and is at a predetermined angle to a line on said plane connecting the locations in said Cartesian coordinate system of the cursor and of said previous point;

transforming the vector of said guideline to said spherical format; and displaying said guideline on said display.

6. A method according to claim 1, further comprising the steps of:

identifying a second plane having said first orientation that is at a second distance from said first plane; and for any selected point:

identifying a location in said Cartesian coordinate system defining an end point on said second plane that is at the shortest distance from said selected point;

transforming said location into spherical coordinates defining said end point; and displaying a line on said display from the spherical coordinates of said selected point to the spherical coordinates of said end point.

7. A method according to claim 6, wherein a second surface represented in said image had said first orientation and was at a third distance from said first surface when the image was obtained, and wherein said method further includes the steps of, after at least one selected point has been obtained:

receiving manual input changing said second distance; and for each point in said ordered list:

receiving new spherical coordinates of each corresponding end point;

recalculating said location in said Cartesian coordinate system for each end point, and redisplaying the line connecting the spherical coordinates of said selected point to the new spherical coordinates of its corresponding end point;

such that a user is able to manually adjust said second distance to match the third distance as seen in the image.

8. A method according to claim 1, wherein said first image represents a room having a floor and a ceiling, and said first surface is either said floor or said ceiling.

9. A method according to claim 8, wherein either:

a) said first surface is said floor, and said first distance is obtained by identifying the height of the camera from the floor when the image was obtained; or b) said first surface is said ceiling, and said first distance is obtained by:

identifying the height of the camera from the floor of the room when the image was obtained, identifying the height of said ceiling from said floor, and calculating the difference between the two heights.

10. A method according to claim 1, wherein said step of obtaining a plurality of selected points comprises the steps of:

automatically tracing edges within said image by identifying discontinuities in said image;

identifying intersections between said traced edges; and selecting a plurality of said intersections as said selected points.

11. Apparatus for creating a floor plan from a spherical image, comprising a processor, a memory, a display and a manual input device, wherein said processor is configured to:

create a spherical format of an image obtained by a camera, wherein said spherical format has a centre that corresponds to the position from which said image was obtained by the camera, and wherein a first surface represented in said image had a first orientation and was at a first distance from the camera when the image was obtained;

output, to said display, data representing said spherical format; and receive, from said manual input device, data representing a plurality of selected points in said spherical format, each defined by spherical coordinates consisting of a yaw angle and a pitch angle defining a line from said centre;

obtain said first orientation and said first distance;

identify a plane having said first orientation that is at said first distance from said centre;

for each of said selected points, identify a location in a Cartesian coordinate system where the line from the centre of said sphere to said point intersects with said first plane, wherein two of the axes of said Cartesian coordinate system are parallel to said first plane;

render a floor plan using said locations, said floor plan representing the positions of said selected points on said first surface;

and store, in an ordered list, said spherical coordinates and the corresponding locations in said Cartesian coordinate system for each selected point;

wherein said step of obtaining selected points comprises the steps of:

after a selected point is obtained, outputting to said display data representing an element at the spherical coordinates of said point; and if there is at least one previous point in said ordered list, outputting to said display data representing a line from the spherical coordinates of said selected point to the spherical coordinates of the previous selected point in said ordered list.

12. Apparatus according to claim 11, wherein for each selected point, said processor is configured to identify said location by:

calculating a relative distance from said centre of the plane to the intersection of said plane with said line, said relative distance being relative to said first distance; and using said relative distance to calculate relative coordinates in said Cartesian coordinate system;

wherein either:
a) said relative distance is modified by said first distance before said relative coordinates are calculated, and said relative coordinates are equal to said location; or
b) said relative coordinates are modified by said first distance to produce said location.

13. Apparatus according to claim 12, wherein said processor is configured to:

calculate said relative distance by calculating the tangent of either the absolute value of the pitch angle, or the absolute value of the pitch angle subtracted from 90°; and calculate relative coordinates by calculating:
a) the cosine of the yaw angle, multiplied by said relative distance; and
b) the sine of the opposite of the yaw angle, multiplied by said relative distance.

14. Apparatus according to claim 11, wherein said processor is further configured to obtain selected points by:

if there are at least two previous points in said ordered list, constraining selection of the next point to have two-dimensional Cartesian coordinates that are on one of a plurality of lines on said plane, wherein each said line is at one of a plurality of predetermined angles to a line on said plane connecting the two-dimensional Cartesian coordinates of the previous two points.

15. Apparatus according to claim 11, wherein said processor is further configured to output to said display data representing a cursor, and said processor is further configured to obtaining selected points by:

receiving, from said manual input device, data representing a position in said spherical format of said cursor, and calculating a corresponding location in said Cartesian coordinate system; and if there is at least one point in said ordered list:

calculating a guideline that is defined by a vector on said plane, and is at a predetermined angle to a line on said plane connecting the locations in said Cartesian coordinate system of the cursor and of said previous point;

transforming the vector of said guideline to said spherical format; and outputting, to said display, data representing said guideline.

16. Apparatus according to claim 11, wherein said processor is further configured to:

identify a second plane having said first orientation that is at a second distance from said first plane; and for any selected point:

identify a location in said Cartesian coordinate system defining an end point on said second plane that is at the shortest distance from said selected point;

transform said location into spherical coordinates defining said end point; and output, to said display, data representing a line on said display from the spherical coordinates of said selected point to the spherical coordinates of said end point.

17. Apparatus according to claim 16, wherein a second surface represented in said image had said first orientation and was at a third distance from said first surface when the image was obtained, and wherein said processor is further configured to, after at least one selected point has been obtained:

receive, from said manual input device, data representing a change in said second distance; and for each point in said ordered list:

receive new spherical coordinates of each corresponding end point;

recalculate said location in said Cartesian coordinate system for each end point, and output, to said display, data representing a line connecting the spherical coordinates of said selected point to the new spherical coordinates of its corresponding end point.

18. Apparatus according to claim 11, wherein the physical space represented by said image is a room having a floor and a ceiling, and either:

a) said first surface is said floor, and said processor is configured to obtain said first distance by identifying the height of the camera from the floor when the image was obtained; or b) said first surface is said ceiling, and said processor is configured to obtain said first distance by:

identifying the height of the camera from the floor of the room when the image was obtained, identifying the height of said ceiling from said floor, and calculating the difference between the two heights.

19. Apparatus according to claim 11, wherein said processor is configured to obtain said plurality of selected points by:

automatically tracing edges within said image by identifying discontinuities in said image;

identifying intersections between said traced edges; and selecting a plurality of said intersections as said selected points.

20. A non-transitory computer-readable medium with computer executable instructions stored thereon, wherein said instructions configure a processor to perform the method of:

creating a spherical format of an image obtained by a camera, wherein said spherical format has a centre that corresponds to the position from which said image was obtained by the camera, and wherein a first surface represented in said image had a first orientation and was at a first distance from the camera when the image was obtained;

displaying said spherical format to a user on a display;

receiving manual input indicating a plurality of selected points in said spherical format, each defined by spherical coordinates consisting of a yaw angle and a pitch angle defining a line from said centre;

obtaining said first orientation and said first distance;

identifying a plane having said first orientation that is at said first distance from said centre;

for each of said selected points, identifying a location in a Cartesian coordinate system where the line from the centre of said sphere to said point intersects with said first plane, wherein two of the axes of said Cartesian coordinate system are parallel to said first plane;

rendering a floor plan using said locations, said floor plan representing the positions of said selected points on said first surface; and storing, in an ordered list, said spherical coordinates and the corresponding location in said Cartesian coordinate system for each selected point;

wherein said step of obtaining a plurality of selected points comprises the steps of:

after a selected point is obtained, displaying an element at its spherical coordinates on said display; and if there is at least one previous point in said ordered list, displaying a line from the spherical coordinates of said selected point to the spherical coordinates of the previous selected point in said ordered list.

21. A method according to claim 1, further comprising creating a floor plan of adjacent physical spaces, comprising the steps of:

obtaining a first image and a second image, each of said images representing a physical space, said physical spaces being connected at a physical connection point;

generating a first spherical format of said first image, and generating a second spherical format of said second image;

obtaining spherical coordinates of a first position in said first image corresponding to the location of said physical connection point;

obtaining spherical coordinates of a second position in said second image corresponding to the location of said physical connection point;

creating a first floor plan from said first image, said first floor plan including an indication of said first position;

creating a second floor plan from said second image, said second floor plan including an indication of said second position;

orientating said first and second floor plans so that the first position and the second position are adjacent to each other, thereby creating a floor plan of said adjacent physical spaces.

* * * * *